United States Patent
Lincoln et al.

(10) Patent No.: US 10,756,946 B2
(45) Date of Patent: *Aug. 25, 2020

(54) DORMANT MODE MEASUREMENT OPTIMIZATION

(71) Applicant: Telefonaktiebolaget LM Ericsson (publ), Stockholm (SE)

(72) Inventors: Bo Lincoln, Lund (SE); Robert Baldemair, Solna (SE); Martin Hessler, Linköping (SE); Eleftherios Karipidis, Stockholm (SE); Torgny Palenius, Barsebäck (SE); Eliane Semaan, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/300,604

(22) PCT Filed: May 12, 2017

(86) PCT No.: PCT/SE2017/050489
§ 371 (c)(1),
(2) Date: Nov. 12, 2018

(87) PCT Pub. No.: WO2017/196247
PCT Pub. Date: Nov. 16, 2017

(65) Prior Publication Data
US 2019/0158345 A1    May 23, 2019

Related U.S. Application Data

(63) Continuation of application No. 15/154,403, filed on May 13, 2016, now Pat. No. 10,367,677.

(51) Int. Cl.
*H04W 52/02* (2009.01)
*H04L 12/24* (2006.01)
(Continued)

(52) U.S. Cl.
CPC ....... *H04L 41/0233* (2013.01); *H04B 7/0617* (2013.01); *H04B 7/0695* (2013.01);
(Continued)

(58) Field of Classification Search
CPC ... H04W 76/048; H04W 16/02; H04W 4/005; H04W 72/048; H04W 72/06; H04W 76/046; H04W 52/02; H04W 52/0229
See application file for complete search history.

(56) References Cited

U.S. PATENT DOCUMENTS 8,983,557 B1    3/2015 Sun et al.
9,780,856 B2   10/2017 Cai
(Continued)

FOREIGN PATENT DOCUMENTS

CN    103716081 A    4/2014
JP    H09247063 A    9/1997
(Continued)

OTHER PUBLICATIONS

Unknown, Author, "MIMO/beamforming for 5G new radio interface for over-6GHz: system architecture and design aspects", Samsung, 3GPP TSG RAN WG1 #84bis, R1-162183, Busan, Korea, Apr. 11-15, 2016, 1-7.
(Continued)

*Primary Examiner* — Faruk Hamza
*Assistant Examiner* — Aixa A Guadalupe Cruz
(74) *Attorney, Agent, or Firm* — Murphy, Bilak & Homiller, PLLC

(57) ABSTRACT

Methods performed by a wireless device operating in a dormant mode comprise performing a measurement on each of a plurality of resources from a predetermined set of resources or demodulating and decoding information from each of a plurality of resources from a predetermined set of resources, such as a set of beams. The methods further
(Continued)

include evaluating the measurement or the demodulated and decoded information for each of the plurality of resources against a predetermined criterion, and then discontinuing the performing and evaluating of measurements, or discontinuing the demodulating and decoding and evaluation of information, in response to determining that the predetermined criterion is met, such that one or more resources in the predetermined set of resources are neither measured nor demodulated and decoded. The methods further comprise deactivating receiver circuitry, further in response to determining that the predetermined criterion is met.

14 Claims, 16 Drawing Sheets

(51) Int. Cl.
  H04B 7/06 (2006.01)
  H04W 24/10 (2009.01)
  H04J 11/00 (2006.01)
  H04W 28/02 (2009.01)
  H04W 16/28 (2009.01)
(52) U.S. Cl.
  CPC ....... *H04J 11/0056* (2013.01); *H04J 11/0059* (2013.01); *H04J 11/0079* (2013.01); *H04L 41/0816* (2013.01); *H04W 24/10* (2013.01); *H04W 52/0229* (2013.01); *H04W 52/0245* (2013.01); *H04W 52/0274* (2013.01); *H04B 7/0626* (2013.01); *H04W 16/28* (2013.01); *H04W 28/0221* (2013.01); *Y02D 30/30* (2018.01); *Y02D 70/12* (2018.01); *Y02D 70/1224* (2018.01); *Y02D 70/1226* (2018.01); *Y02D 70/1242* (2018.01); *Y02D 70/1262* (2018.01); *Y02D 70/142* (2018.01); *Y02D 70/144* (2018.01); *Y02D 70/164* (2018.01); *Y02D 70/21* (2018.01); *Y02D 70/24* (2018.01); *Y02D 70/25* (2018.01); *Y02D 70/26* (2018.01); *Y02D 70/444* (2018.01)

(56) References Cited

U.S. PATENT DOCUMENTS

| | | | |
|---|---|---|---|
| 10,014,918 | B2 | 7/2018 | Capar et al. |
| 2004/0160925 | A1 | 8/2004 | Heo et al. |
| 2008/0160918 | A1 | 7/2008 | Jeong et al. |
| 2009/0093222 | A1 | 4/2009 | Sarkar |
| 2009/0185632 | A1 | 7/2009 | Cai et al. |
| 2009/0323541 | A1 | 12/2009 | Sägfors et al. |
| 2010/0005363 | A1 | 1/2010 | Eroz et al. |
| 2010/0067496 | A1 | 3/2010 | Choi |
| 2010/0080112 | A1 | 4/2010 | Bertrand et al. |
| 2011/0111766 | A1 | 5/2011 | Yang et al. |
| 2012/0114021 | A1 | 5/2012 | Chung et al. |
| 2012/0140743 | A1 | 6/2012 | Pelletier et al. |
| 2012/0263460 | A1 | 10/2012 | Movassaghi et al. |
| 2013/0114391 | A1 | 5/2013 | Jang et al. |
| 2013/0229931 | A1 | 9/2013 | Kim |
| 2014/0146788 | A1 | 5/2014 | Wallentin et al. |
| 2014/0185481 | A1 | 7/2014 | Seol et al. |
| 2014/0294111 | A1 | 10/2014 | Zhang et al. |
| 2014/0341310 | A1 | 11/2014 | Rahman et al. |
| 2015/0373667 | A1 | 12/2015 | Rajurkar et al. |
| 2016/0050643 | A1 | 2/2016 | Pudney et al. |
| 2016/0073344 | A1 | 3/2016 | Vutukuri et al. |
| 2016/0087765 | A1 | 3/2016 | Guey et al. |
| 2016/0142922 | A1 | 5/2016 | Chen et al. |
| 2016/0157148 | A1 | 6/2016 | Kato et al. |
| 2017/0086141 | A1 | 3/2017 | Gal |
| 2017/0325164 | A1* | 11/2017 | Lee ...................... H04W 76/27 |
| 2017/0331577 | A1 | 11/2017 | Parkvall et al. |

FOREIGN PATENT DOCUMENTS

| | | |
|---|---|---|
| JP | 2005311857 A | 11/2005 |
| KR | 20110091535 A | 8/2011 |
| KR | 101312876 B1 | 9/2013 |
| KR | 20150143769 A | 12/2015 |
| KR | 20160027969 A | 3/2016 |
| RU | 2330387 C2 | 7/2008 |
| RU | 2012135692 A | 2/2014 |
| WO | 2007060494 A1 | 5/2007 |
| WO | 2009123955 A1 | 10/2009 |
| WO | 2013015726 A1 | 1/2013 |
| WO | 2014175656 A1 | 10/2014 |
| WO | 2016055102 A1 | 4/2016 |
| WO | 2016064048 A1 | 4/2016 |
| WO | 2017196249 A1 | 11/2017 |
| WO | 2017197063 A1 | 11/2017 |

OTHER PUBLICATIONS

Unknown, Author, "PDSCH Transmissions for Low Cost UEs", Samsung, 3GPP TSG RAN WG1 #82bis, R1-155431, Malmo, Sweden, Oct. 5-9, 2015, 1-4.

Unknown, Author, "Performance and complexity of Turbo, LDPC and Polar codes", Nokia, Alcatel-Lucent Shanghai Bell, 3GPP TSG-RAN WG1 #84bis, R1-162897, Busan, Korea, Apr. 11-15, 2016, 1-5.

Unknown, Author, "RRM requirements for New Radio Access Technology", Ericsson, 3GPP TSG-RAN WG4 Meeting # 78bis, R4-161726, San Jose del Cabo, Mexico, Apr. 11-15, 2016, 1-5.

Unknown, Author, "Solution for selection of a network slice instance", Ericsson, SA WG2 Meeting #114, S2-161480, Sophia Antipolis, Apr. 11-15, 2016, 1-4.

Unknown, Author, "Solution: PDU Sessions served by different Network Slices", Motorola Mobility, Lenovo, SA WG2 Meeting #114, S2-161574, Apr. 11-15, 2016, 1-4.

Unknown, Author, "Support for Beam Based Common Control Plane in 5G New Radio", Nokia, Alcatel-Lucent Shanghai Bell, 3GPP TSG-RAN WG1 #84bis, R1-162895, Busan, Korea, Apr. 11-15, 2016, 1-4.

Unknown, Author, "UL scheduling for Rel-14 eLAA", CATT, 3GPP TSG RAN WG1 Meeting #84bis, R1-162260, Busan, Korea, Apr. 11-15, 2016, 1-3.

Unknown, Author, "Uplink latency reduction with prescheduling", HTC, 3GPP TSG RAN WG1 Meeting #84bis, R1-162530, Busan, Korea, Apr. 11-15, 2016, 1-2.

Unknown, Author, "Waveform for NR", Ericsson, 3GPP TSG-RAN WG1 #84bis, R1-163222, Busan, South Korea, Apr. 11-15, 2016, 1-5.

Wang, Xinhua, "Joint Antenna Selection and Beamforming Algorithms for Physical Layer Multicasting with Massive Antennas", MDPI, Algorithms 2016, vol. 9, Issue 2, 2016, 1-9.

Wiemann, Henning, et al., "A Novel Multi-Flop ARQ Concept", Vehicular Technology Conference, 2005, VTC 2005, IEEE 61st (vol. 5), Spring 2005, 1-5.

Yilmaz, Osman N. C., et al., "Analysis of Ultra-Reliable and Low-Latency 5G Communication for a Factory Automation Use Case", ICC Workshop on 5G Enablers and Applications, Spring 2015, 1-6.

Yilmaz, Osman N. C., et al., "Smart Mobility Management for D2D Communications in 5G Networks", IEEE WCNC 2014, Istanbul, Turkey, Apr. 6-9, 2014, 1-5.

Unknown, Author, "Initial considerations on system access in NR", 3GPP TSG RAN WG1 Meeting #84 R1-163237, Busan, South Korea, Apr. 11-15, 2016, pp. 1-3.

Unknown, Author, "NR C-DRX Operations with Beam Management", 3GPP TSG-RAN WG2 2017 RAN2#97 Meeting R2-1701994, Athens, Greece, Feb. 13-17, 2017, pp. 1-5.

Sattiraju, Raja, "Reliability Modeling, Analysis and Prediction of Wireless Mobile Communications", Chair for Wireless Communication and Navigation, University of Kaiserslautern, Kaiserslautern, Germany, 2014, pp. 1-6.

(56) References Cited

OTHER PUBLICATIONS

Schotten, Hans D, et al., "Availability Indication as Key Enabler for Ultra-Reliable Communication in 5G", 2014, pp. 1-5.
Unknown, Author, "Mobile and wireless communications Enablers for the Twenty-twenty Information Society-II", Deliverable D4.1 Draft air interface harmonization and user plane design Version: v1.0, May 4, 2016, pp. 1-129.
Li, Zhe, "Performance Analysis of Network Assisted Neighbor Discovery Algorithms", KTH Electrical Engineering, Degree Project in Automatic Control, Second Level, Stockholm, Sweden, XR-EE-RT 2012:026, 2012, 1-64.
Lu, Qianxi, et al., "Clustering Schemes for D2D Communications Under Partial/No Network Coverage", 79th IEEE VTC Spring, May 18-21, 2014, 1-6.
Luby, Michael G., et al., "Improved Low-Density Parity-Check Codes Using Irregular Graphs", IEEE Transactions on Information Theory, vol. 47, No. 2, Feb. 2001, 585-598.
Marsch, Patrick, et al., "Preliminary Views and Initial Considerations on 5G RAN Architecture and Functional Design", 5G PPP, METIS II, White Paper, Mar. 8, 2016, 1-27.
Medbo, J., et al., "Channel Modelling for the Fifth Generation Mobile Communications", Antennas and Propagation (EuCAP), 2014 8th European Conference on. IEEE, 2014, 1-5.
Meinilä, Juha, et al., "D5.3: Winner+ Final Channel Models", Winner +, Celtic Telecommunication Solutions, Project No. CELTIC/CP5-026, Project Title: Wireless World Initiative New Radio—Winner-+, Version 1.0, Jun. 30, 2010, 1-107.
Mollén, Christopher, et al., "Out-of-Band Radiation Measure for MIMO Arrays with Beamformed Transmission", Submitted to ICC 2016, Kuala Lumpur, Malaysia, 2016, 1-6.
Motoyama, Shusaburo, "Flexible Polling-based Scheduling with QoS Capability for Wireless Body Sensor Vetwork", 8th IEEE International Workshop on Performance and Management of Wireless and Mobile Networks, P2MNET 2012, Clearwater, Florida, 2012, 745-752.
Nagpal, Vinayak, "Quantize-Map-and-Forward Relaying: Coding and System Design", Forty-Eighth Annual Allerton Conference, Allerton House, UIUC, Illinois, USA, Sep. 29-Oct. 1, 2010, 443-450.
Nazer, Bobak, et al., "Compute-and-Forward: Harnessing Interference through Structured Codes", IEEE Trans Info Theory, vol. 57, Oct. 2011, 6463-6486.
Nurmela, Vuokko, et al., "METIS Channel Models", METIS, Seventh Framework Programme, Document No. ICT-317669-METIS/D1.4, Project Name: Mobile and wireless communications Enablers for the Twenty-twenty Information Society (METIS), Jul. 14, 2015, 1-223.
Popovski, Petar, "Ultra-Reliable Communication in 5G Wireless Systems", 1st International Conference on 5G for Ubiquitous Connectivity, Levi, Finland, Nov. 2014, 1-6.
Pradini, Aidilla, et al., "Near-Optimal Practical Power Control Schemes for D2D Communications in Cellular Networks", European Conference on Networks and Communications (EuCNC), Bologna, Italy, Jun. 23-26, 2014, 1-5.
Rangan, Sundeep, et al., "Millimeter Wave Cellular Wireless Networks: Potentials and Challenges", Proceedings of the IEEE, vol. 102, Issue 3, Feb. 5, 2014, 366-384.
Rosowski, Thomas, et al., "Description of the spectrum needs and usage principles", METIS, Seventh Framework Programme, Document No. ICT-317669-METIS/D5.3, Project Name: Mobile and wireless communications Enablers for the Twenty-twenty Information Society (METIS), Aug. 29, 2014, 1-106.
Sachs, Joachim, et al., "Virtual Radio—A Framework for Configurable Radio Networks", Proceedings of the 4th Annual International Conference on Wireless Internet (WICON '08), Maui, Hawaii, USA, Nov. 17-19, 2008, 1-7.
Sahlin, Henrik, et al., "Random Access Preamble Format for Systems with Many Antennas", International Workshop on Emerging Technologies for 5G Wireless Cellular Networks, IEEE GLOBECOM 2014, Austin, TX, USA, Dec. 8, 2014, 1-6.
Ström, Erik G., et al., "5G Ultra—Reliable Vehicular Communication", http://arxiv.org/abs/1510.01288, Version 1.1, Oct. 3, 2015, 1-13.
Sun, Shu, et al., "Millimeter Wave Multi-beam Antenna Combining for 5G Cellular Link Improvement in New York City", 2014 IEEE International Conference on Communications (ICC),, Jun. 2014, 5468-5473.
Sun, Wanlu, et al., "Resource Sharing and Power Allocation for D2D-based Safety-Critical V2X Communications", IEEE ICC 2015, London, UK, Jun. 8-12, 2015, 1-7.
Svensson, Stefan, "Challenges of Wireless Communication in Industrial Systems", ABB Corporate Research, 1-18.
Tal, I., et al., "List Decoding of Polar Codes", Proceedings of IEEE Symp. Inf. Theory, 2011, 1-5.
Thorpe, J., "Low-Density Parity-Check (LDPC) Codes Constructed from Protographs", IPN Progress Report 42-154, Aug. 15, 2003, 1-7.
Unknown, Author, "5G—Key Component of the Networked Society", RWS-150009, 3GPP Ran Workshop on 5G, Phoenix, Arizona, USA, Sep. 17-18, 2015, 1-55.
Unknown, "5G Automotive Vision", 5G-Infrastructure-Association, https://5g-ppp.eu/white-papers/, Oct. 20, 2015, 1-67.
Unknown, "5G Radio Access", Ericsson White Paper, Uen 284 23/3204 Rev B, Apr. 2016, 1-10.
Unknown, "5G Systems", Ericsson White Paper, Uen 284 23/3244, Jan. 2015, 1-14.
Unknown, Author, "Active Mode Mobility in NR: SINR drops in higher frequencies", 3GPP TSG-RAN WG2 #93bis, R2-162762, Dubrovnik, Croatia, Ericsson, Apr. 11-15, 2016, 1-4.
Unknown, Author, "Active Transmission/Reception Time Reduction for DL Control Signaling", Samsung, 3GPP TSG RAN WG1 #80, R1-150349, Athens, Greece, Feb. 9-13, 2015, 1-4.
Unknown, "Carrier aggregation in LTE-Advanced", Ericsson, TSG-RAN WG1 #53bis, R1-082468, Warsaw, Poland, Jun. 30-Jul. 4, 2008, 1-6.
Unknown, Author, "Channel coding for new radio interface", Intel Corporation, 3GPP TSG RAN WG1 Meeting #84bis, R1-162387, Busan, South Korea, Apr. 11-15, 2016, 1-4.
Unknown, Author, "Control details for UL scheduling in LAA", Qualcomm Incorporated, 3GPP TSG RAN WG1 #84bis, R1-163022, Busan, Korea, Apr. 11-15, 2016, 1-6.
Unknown, "Council Recommendation of Jul. 12, 1999 on the limitation of exposure of the general public to electromagnetic fields (0 Hz to 300 GHz)", Official Journal of the European Communities, L199, Jul. 30, 1999, 59-70.
Unknown, Author, "Deliverable D4.1 Draft air interface harmonization and user plane design", METIS II, Mobile and wireless communications Enablers for the Twenty-twenty Information Society-II, May 4, 2016, 1-129.
Unknown, Author, "Design aspects of control signaling for V2V communication", Intel Corporation, 3GPP TSG RAN WG1 Meeting #84, R1-160701, St Julian's, Malta, Feb. 15-19, 2016, 1-8.
Unknown, Author, "Details on NR impact to support unlicensed operation", Ericsson, 3GPP TSG-RAN WG2 #93bis, R2-162751, Dubrovnik, Croatia, Apr. 11-15, 2016, 1-3.
Unknown, "Electronic Code of Federal Regulations, Title 47: Telecommunication, Chapter 1, Subchapter A, Part 2—Frequency Allocations and Radio Treaty Matters; General Rules and Regulations", eCFR—Code of Federal Regulations, http://www.ecfr.gov/cgi-bin/text-idx?SID=088e5625b9e603b91aa3601b . . . , Jun. 20, 2016, 1-217.
Unknown, "ETSI TR 102 889-2 V1.1.1 (Aug. 2011)", Electromagnetic compatibility and Radio spectrum Matters (ERM); System Reference Doc; Short Range Devices(SRD); Part 2: Technical characteristics for SRD equipment for wireless industrial applications using technologies different from Ultra-Wide Band(UWB), Aug. 2011, 1-37.
Unknown, Author, "Flexible air interface of NR", 3GPP TSG-RAN2 Meeting #93-bis, R2-162660, Dubrovnik, Croatia, Apr. 11-15, 2016, 1-5.
Unknown, "FlexWare Flexible Wireless Automation in Real-Time Environments", Seventh Framework Programme, PNR 224350,

(56) References Cited

OTHER PUBLICATIONS

Work Package 1 ystem Architecture, Task 1.1 System Requirements Analysis, Deliverable D1.1, FP7-224350, 2008, 1-197.
Unknown, "Frame structure design of new RAT", ZTE, 3GPP TSG RAN WG1 Meeting #84bis, R1-162228, Busan, Korea, Apr. 11-15, 2016, 1-5.
Unknown, "Guidelines for evaluation of radio interface", International Telecommunication Union; ITU-R, Radiocommunication Sector of ITU; Rep. ITU-R M.2135-1; M Series, Mobile, radiodetermination, amateur and related satellites services, Dec. 2009, 1-72.
Unknown, "ICNIRP Guidelines for Limiting Exposure to Time-Varying Electric, Magnetic and Electromagnetic Fields (up to 300 GHz)", International Commission on Non-Ionizing Radiation Protection, ICNIRP Publication, 1998, 1-34.
Unkown, "IMT Vision—Framework and overall objectives of the future development of IMT for 2020 and beyond", International Telecommunication Union; ITU-R Radiocommunication Sector of ITU; Recommendation ITU-R M.2083-0; M series, Mobile, radiodetermination, amateur and related satellite services, Sep. 2015, 1-21.
Unknown, Author, "Initial considerations on system access in NR", Ericsson, 3GPP TSG RAN WG1 Meeting #84, R1-163237, Busan, South Korea, Apr. 11-15, 2016, 1-3.
Unknown, Author, "NR C-DRX Operations with Beam Management", Samsung, 3GPP TSG.RAN WG2 2017 RAN2 #97 Meeting, R2-1701994, Athens, Greece, Feb. 13-17, 2017, 1-5.
Unknown, "Overview of 5G frame structure", Huall'ei, HiSilicon; 3GPP TSG RAN WG I Meeting #84bis, R1-162157, Busan, Korea, Apr. 11-15, 2016, 1-6.
3GPP, "3GPP TR 22.885 V1.0.0 (Sep. 2015)", 3rd Generation Partnership Project; Technical Specification Group Services and System Aspects; Study on LTE Support for V2X Services (Release 14), Sep. 2015, 1-42.
3GPP, "3GPP TR 23.882 V8.0.0 (Sep. 2008)", 3rd Generation Partnership Project; Technical Specification Group Services and System Aspects; 3GPP System Architecture Evolution: Report on Technical Options and Conclusions (Release 8), Sep. 2008, 1-234.
3GPP, "3GPP TR 25.912 V13.0.0 (Dec. 2015)", 3rd Generation Partnership Project; Technical Specification Group Radio Access Network; Feasibility study for evolved Universal Terrestrial Radio Access (UTRA) and Universal Terrestrial Radio Access Network (UTRAN) (Release 13), Dec. 2015, 1-64.
3GPP, "3GPP TR 25.913 V9.0.0 (Dec. 2009)", 3rd Generation Partnership Project; Technical Specification Group Radio Access Network; Requirements for Evolved UTRA (E-UTRA) and Evolved UTRAN (E-UTRAN) (Release 9), Dec. 2009, 1-18.
3GPP, "3GPP TR 36.876 V13.0.0 (Sep. 2015)", 3rd Generation Partnership Project; Technical Specification Group Radio Access Network; Study on further enhancements of small cell high layer aspects for LTE (Release 13) The present, Sep. 2015, 1-8.
3GPP, "3GPP TR 36.878 V13.0.0 (Jan. 2016)", 3rd Generation Partnership Project; Technical Specification Group Radio Access Network; Study on performance enhancements for high speed scenario in LTE (Release 13), Jan. 2016, 1-92.
3GPP, "3GPP TR 36.913 V13.0.0 (Dec. 2015)", 3rd Generation Partnership Project; Technical Specification Group Radio Access Network; Requirements for further advancements for Evolved Universal Terrestrial Radio Access (E-UTRA) (LTE-Advanced) (Release 13), Dec. 2015, 1-15.
3GPP, "3GPP TR 37.857 V13.0.0 (Sep. 2015)", 3rd Generation Partnership Project; Technical Specification Group Radio Access Network; Study on indoor positioning enhancements for UTRA and LTE (Release 13) The present, Sep. 2015, 1-82.
3GPP, "3GPP TS 22.011 V14.2.0 (Mar. 2016)", 3rd Generation Partnership Project; Technical Specification Group Services and System Aspects; Service accessibility (Release 14), Mar. 2016, 1-30.
3GPP, "3GPP TS 22.168 V9.0.0 (Jun. 2008)", Group Services and System Aspects; Earthquake and Tsunami Warning System (ETWS) requirements; Stage 1 (Release 9), Jun. 2008, 1-12.
3GPP, "3GPP TS 22.268 V13.0.0 (Dec. 2015)", 3rd Generation Partnership Project; Technical Specification Group Services and System Aspects; Public Warning System (PWS) requirements (Release 13), Dec. 2015, 1-16.
3GPP, "3GPP TS 23.251 V13.1.0 (Mar. 2015)", 3rd Generation Partnership Project; Technical Specification Group Services and System Aspects; Network Sharing; Architecture and functional description (Release 13), Mar. 2015, 1-39.
3GPP, "3GPP TS 36.300 V12.7.0 (Sep. 2015)", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), Sep. 2015, 1-254.
3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.7.0, Sep. 2015, 1-453.
3GPP, "3rd Generation Partnership Project; Technical Specification Group Radio Access Network; Scenarios and requirements for small cell enhancements for E-UTRA and E-UTRAN (Release 13)", 3GPP TR 36.932 V13.0.0, Dec. 2015, 1-14.
3GPP, "3rd Generation Partnership Project; Technical Specification Group Services and System Aspects; Feasibility study for Proximity Services (ProSe) (Release 12)", 3GPP TR 22.803 V12.2.0, Jun. 2013, 1-45.
3GPP, "3rd Generation Partnership Project; Technical Specification Group Services and System Aspects; Study on Architecture for Next Generation System (Release 14)", 3GPP TR 23.799 V0.4.0, Apr. 2016, 1-96.
3GPP, "ETSI TS 136 213 V13.1.1 (May 2016)", LTE; Evolved Universal Terrestrial Radio Access (E-UTRA); Physical layer procedures (3GPP TS 36.213 version 13.1.1 Release 13), May 2016, 1-363.
Abrardo, Andrea, et al., "Network Coding Schemes for Device-to-Device Communications Based Relaying for Cellular Coverage Extension", IEEE Signal Processing Advancements for Wireless Communications (SPAWC), Stockholm, Jun. 2015, 1-9.
Arikan, Erdal, "Channel polarization: a method for constructing capacity-achieving codes for symmetric binary-input memoryless channels", IEEE Transactions on Information Theory, vol. 55, Jul. 2009, 3051-3073.
Ashraf, S. A., et al., "Control Channel Design Trade-offs for Ultra-Reliable and Low-Latency Communication System", Globecom, Dec. 2015, 1-6.
Astely, David, et al., "LTE Release 12 and Beyond", IEEE Communications Magazine, vol. 51, No. 7, Jul. 2013, 154-160.
Athley, Fredrik, et al., "Providing Extreme Mobile Broadband Using Higher Frequency Bands, Beamforming, and Carrier Aggregation", 2015 IEEE 26th International Symposium on Personal, Indoor and Mobile Radio Communications—(PIMRC): Mobile and Wireless Networks, 1370-1374.
Atsan, Emre, et al., "Towards integrating Quantize-Map-Forward relaying into LTE", 2012 IEEE Information Theory Workshop, 212-216.
Aydin, Osman, et al., "Final Report on Network-Level Solutions", METIS, Seventh Framework Programme, Document No. ICT-317669-METIS/D4.3, Project Name: Mobile and wireless communications Enablers for the Twenty-twenty Information Society (METIS), Mar. 1, 2015, pp. 1-148.
Aydin, Osman, et al., "Final report on trade-off investigations", METIS, Seventh Framework Programme, Document No. ICT-317669-METIS/D4.2, Project Name: Mobile and wireless communications Enablers for the Twenty-twenty Information Society (METIS), Version 1, Aug. 29, 2014, 1-96.
Belleschi, Marco, et al., "Benchmarking Practical RRM Algorithms for D2D Communications in LTE Advanced", Wireless Personal Communications, vol. 82, Issue 2, May 2015, 883-910.
Colombi, D., et al., "Implications of EMF Exposure Limits on Output Power Levels for 5G Devices above 6 GHz", IEEE Antennas and Wireless Propagation Letters (vol. 14), Feb. 4, 2015, 1247-1249.

(56) References Cited

OTHER PUBLICATIONS

Da Silva, Icaro, et al., "Tight integration of LTE and new 5G air interface to fulfill 5G requirements", Workshop on 5G Architecture, VTC Spring 2014, Glasgow, Spring 2014, 1-5.

Da Silva Jr., José Mairton B., et al., "Performance Analysis of Network-Assisted Two-Hop D2D Communications", 10th IEEE Broadband Wireless Access Workshop, Austin, TX, USA, Dec. 2014, 1-8.

Duarte, Melissa, et aL, "Quantize-Map-Forward (QMF) Relaying: An Experimental Study", Proceedings of the fourteenth ACM international symposium on Mobile ad hoc networking and computing (MobiHoc '13), 2013, 227-236.

El Hattachi, Rachid, et al., "NGMN 5G White Paper", A Deliverable by the NGMN Alliance, Version 1.0, Feb. 17, 2015, 1-125.

Felström, Alberto Jiménez, et al., "Time-Varying Periodic Convolutional Codes With Low-Density Parity-Check Matrix", IEEE Transactions on Information Theory, vol. 45, No. 6, Sep. 1999, 2181-2191.

Fodor, Gabor, et al., "A Comparative Study of Power Control Approaches for Device-to-Device Communications", IEEE International Conference on Communications (ICC), Budapest, Hungary, Jun. 2013, 1-7.

Fodor, G., et al., "Device-to-Device Communications for National Security and Public Safety", IEEE Access, vol. 2, Dec. 18, 2014, 1510-1520.

Furuskar, A., et al., "5G Use Cases", Media Delivery Use Cases, 1-18.

Garg, Nikhil, "Fair Use and Innovation in Unlicensed Wireless Spectrum", WISE, IEEE, Jul. 31, 2015.

Giard, Pascal, et al., "Unrolled Polar Decoders, Part I: Hardware Architectures", 1-10.

Gunnarsson, Fredrik, et al., "Particle Filtering for Network-Based Positioning Terrestrial Radio Networks", Data Fusion and Target Tracking Conference, Liverpool, UK, Apr. 2014, 1-7.

Gustavsson, Ulf, et al., "On the Impact of Hardware Impairments on Massive MIMO", IEEE Globecom 2014, Austin, Texas, USA, 2014, 1-7.

Hemachandra, Kasun T., et al., "Sum-Rate Analysis for Full-Duplex Underlay Device-to-Device Networks", IEEE Wireless Communications and Networking Conference (WCNC), Istanbul, Turkey, Apr. 6-9, 2014, 1-6.

Imran, Muhammad Ali, et al., "Deliverable D6.4 Final Integrated Concept", Energy Aware Radio and network Technologies (EARTH) INFSO-ICT-247733 EARTH https://bscw.ictearth.eu/pub/bscw.cgi/d49431/EARTH_WP6_D6.4.pdf., Jun. 2012, 1-95.

Inomata, Minoru, et al., "ICNIRP Publication", IEICE Communications Express, vol. 4, No. 5, May 29, 2015, 149-154.

Jacobsson, Sven, et al., "One-Bit Massive MIMO: Channel Estimation and High-Order Modulations", IEEE ICC2015 Communications Workshop, London, UK, 2015, 1-6.

Johansson, Niklas A., et al., "Radio Access for Ultra-Reliable and Low-Latency 5G Communications", IEEE ICC 2015—Workshop on 5G & Beyond—Enabling Technologies and Applications, Jun. 8-12, 2015, 1184-1189.

Kleinrock, Leonard, et al., "Packet Switching in Radio Channels: Part I-Carrier Sense Multiple-Access Modes and Their Throughput-Delay Characteristics", IEEE Transactions on Communications, vol. COM-23, No. 12, Dec. 1975, 1400-1416.

Korada, Satish Babu, "Polar Codes for Channel and Source Coding", Ph.D. thesis, E'cole Polytechnique Federale de Lausanne (EPFL), Jul. 15, 2009, 1-181.

Kusume, Katsutoshi, et al., "Updated scenarios, requirements and KPIs for 5G mobile and wireless system with recommendations for future investigations", Metis, Seventh Framework Programme, Document No. ICT-317669-METIS/D1.5,Project Name: Mobile and wireless communications Enablers for the Twenty-twenty Information Society (METIS), Apr. 30, 2015, 1-57.

Li, Gen, et al., "5G Spectrum: Is China ready?", IEEE Communications Magazine, Jul. 2015, 58-65.

Li, Gen, et al., "Coordination context-based spectrum sharing for 5G millimeter-wave networks", 2014 9th International Conference on Cognitive Radio Oriented Wireless Networks (CROWNCOM), Oulu, Finland, Jun. 2014, 32-38.

Unknown, Author, "Initial considerations on system access in NR", 3GPPTSGRANWGI Meeting #84, R1-163237, Susan, South Korea, Apr. 11-15, 2016, 1-3.

Unknown, Author, "NR C-DRX Operations with Beam Management", 3GPP TSG.RAN WG2 2017 RAN2 #97 Meeting, R2-1701994, Athens, Greece, Feb. 13-17, 2017, 1-5.

Unknown, Author, "Consideration on higher layer procedures in 5G NR", 3GPP TSG-RAN WG2 Meeting #93bis, R2-162568, Dubrovnik, Croatia, Apr. 11-15, 2016, pp. 1-3.

Unknown, Author, "Initial views on frame structure for NR access technology", 3GPP TSG RAN WG1 Meeting #84bis, R1-163112, Busan, Korea, Apr. 11-15, 2016, pp. 1-7.

Unknown, Author, "Overview of new radio access technology requirements and designs", 3GPP TSG TAN WG1 Meeting #84bis, R1-162379, Busan, Korea, Apr. 11-15, 2016, pp. 1-4.

Unknown, Author, "Preliminary view on Initial Access in 5G", 3GPP TSG-RAN WG2 Meeting #93bis, R2-162300, Dubrovnik, Croatia, Apr. 15-15, 2016, pp. 1-3.

Unknown, Author, "Tight integration of the New Radio interface (NR) and LTE: Control Plane design", 3GPP TSG-RAN WG2 #93bis, Tdoc R2-162753, Dubrovnik, Croatia, Apr. 11-15, 2016, pp. 1-5.

Unknown, Author, "Channel interleaver correction for eMTC", 3GPP TSG RAN WG1 Meeting #84bis, R1-163349, Busan, Korea, Apr. 11-15, 2016, 1-2.

Unknown, Author, "Handling of inactive UEs", 3GPP TSG-RAN WG3 #91bis R3-160845 Bangalore, India, Apr. 11-15, 2016, 1-4.

Unknown, Author, "NB-IoT—NPRACHh Sequences", 3GPP TSG RAN WG1 NB-IoT Ad-Hoc Meeting, R1-161834, Sophia Antipolis, France, Mar. 22-24, 2016, 1-6.

Unknown, Author, "Discussion on MTC Idle states", 3GPP TSG-WG #69-bis, R2-102033, Beijing, Apr. 12-16, 2010, 1-4.

\* cited by examiner (a)

(b)

DORMANT MODE MEASUREMENT OPTIMIZATION

TECHNICAL FIELD

The present disclosure is generally related to the performing of measurements for radio resource management, and is more particularly related to methods and apparatus for performing measurements in dormant mode.

BACKGROUND

In any cellular system, it is of very high importance that battery powered, mobile nodes (hereafter referred to as "user equipments," or "UEs") can spend most of their time in a low activity state to preserve energy. Typically, a cellular system will have one or more defined "active" modes, where the UE is controlled by the network and is instructed to attach to a certain cell, do certain measurements etc. The system will generally also have one or more "idle" or "dormant" modes, where the UE typically listens only to certain signals from the network and makes its own decisions regarding which cell or cells to listen to, and when to report back status updates.

Most UEs in most cellular systems today spend a majority of their time in dormant mode, and therefore it is of utmost importance that the UEs can consume as little power as possible in dormant mode.

In a cellular system like as the $5^{th}$-generation radio access network (RAN) currently being defined by the $3^{rd}$-Generation Partnership (3GPP) and often referred to as "New Radio" or "NR," beamforming can be used for the transmission of cell information signals. "Beamforming" here refers to a (usually) highly directional transmission of the signal energy for a given signal or set of signals, e.g., with 3-dB beam-widths of less, often substantially less, than 90 degrees in the horizontal plane, for downlink transmissions. While conventional transmissions are shaped to some degree, e.g., to avoid transmitting excessive energy in a vertical direction and/or to direct the majority of the signal energy to a particular cell sector, the beamformed transmissions discussed herein are intentionally shaped to a greater extent, so that, for example, any given downlink beam provides useful signal strengths only within a small fraction of the area that is generally served by the transmitting node. Accordingly, to serve the entire area, the transmitting node may make use of multiple, and perhaps very many, beams, which may be time-multiplexed, frequency-multiplexed, or both.

Beamforming cell information signals or broadcast signals, such as so-called mobility reference symbols, rather than transmitting them over an entire cell, may be done for several reasons. One reason is to increase the effective antenna gain of the transmitter, e.g., to compensate for higher path loss in high frequency bands or to enable extended coverage at traditional frequencies. Another reason is to obtain a rough spatial positioning of a UE, based on the directionality of the beam.

Typically, the beamformed cell information signals will be time multiplexed between beams so that high output power can be used for each beam.

SUMMARY

With beamformed cell information signals, there is a multiplication factor introduced with respect to the number of signals that a UE in dormant mode must search for and measure. In a conventional system where cell information is not beam-formed, there is typically one signal to measure for each "cell"—for the same kind of "cell" where cell information is beamformed, there can be several tens of signals or beams, such as beams carrying mobility reference signals, to search for. This can increase the power consumption for a UE in dormant mode, especially if the signals are time multiplexed, as search for such beams requires the UE receiver to be on over long durations of time.

Embodiments disclosed herein to address these problems include methods performed by a UE or other wireless device that is operating in a dormant mode, where operating in the dormant mode comprises intermittently activating receiver circuitry to monitor and/or measure signals. These methods comprise, while the wireless device is in this dormant mode, and while the receiver circuitry is activated, performing a measurement on each of a plurality of resources from a predetermined set of resources or demodulating and decoding information from each of a plurality of resources from a predetermined set of resources, where the resources in the predetermined set of resources are each defined by one or more of a beam, a timing, and a frequency. In some embodiments, the resources in this predetermined set of resources are each defined as a beam. The methods further include evaluating the measurement or the demodulated and decoded information for each of the plurality of resources against a predetermined criterion, and then discontinuing the performing and evaluating of measurements, or discontinuing the demodulating and decoding and evaluation of information, in response to determining that the predetermined criterion is met, such that one or more resources in the predetermined set of resources are neither measured nor demodulated and decoded. The methods further comprise deactivating the activated receiver circuitry, further in response to determining that the predetermined criterion is met.

In some embodiments, the predetermined criterion comprises one or more of the following: that a received power level, or a measured signal-to-interference-plus-noise ratio (SINR), or a signal-to-noise ratio (SNR) is above a predetermined threshold, for one or for a predetermined number of resources; that cell information can be correctly decoded from one or for a predetermined number of resources; and that decoded information from one or for a predetermined number of resources instructs a change in operation for the wireless device.

In some embodiments, the discontinuing is performed in response to determining that the predetermined criterion is met for one of the resources. In some embodiments, the method further comprises, prior to said performing or demodulating and decoding, and prior to said evaluating, discontinuing, and deactivating, determining a priority order for the predetermined set of resources, from highest to lowest, wherein said performing or demodulating and decoding is according to the priority order, from highest to lowest. This determining the priority order for the predetermined set of resources may be based on one or more of any of the following, for example: radio resource timing for one or more of the resources; and measured signal qualities or measurement properties from previous measurements of one or more of the resources. In some embodiments, determining the priority order for the predetermined set of resources is based on information regarding likelihood of usefulness for one or more of the resources, the information being received from other sources or cell neighbour lists.

Other embodiments disclosed herein include wireless devices adapted to carry out a method according to any of those summarized above, as well as corresponding computer program products and computer-readable media.

DETAILED DESCRIPTION

Figure 1:
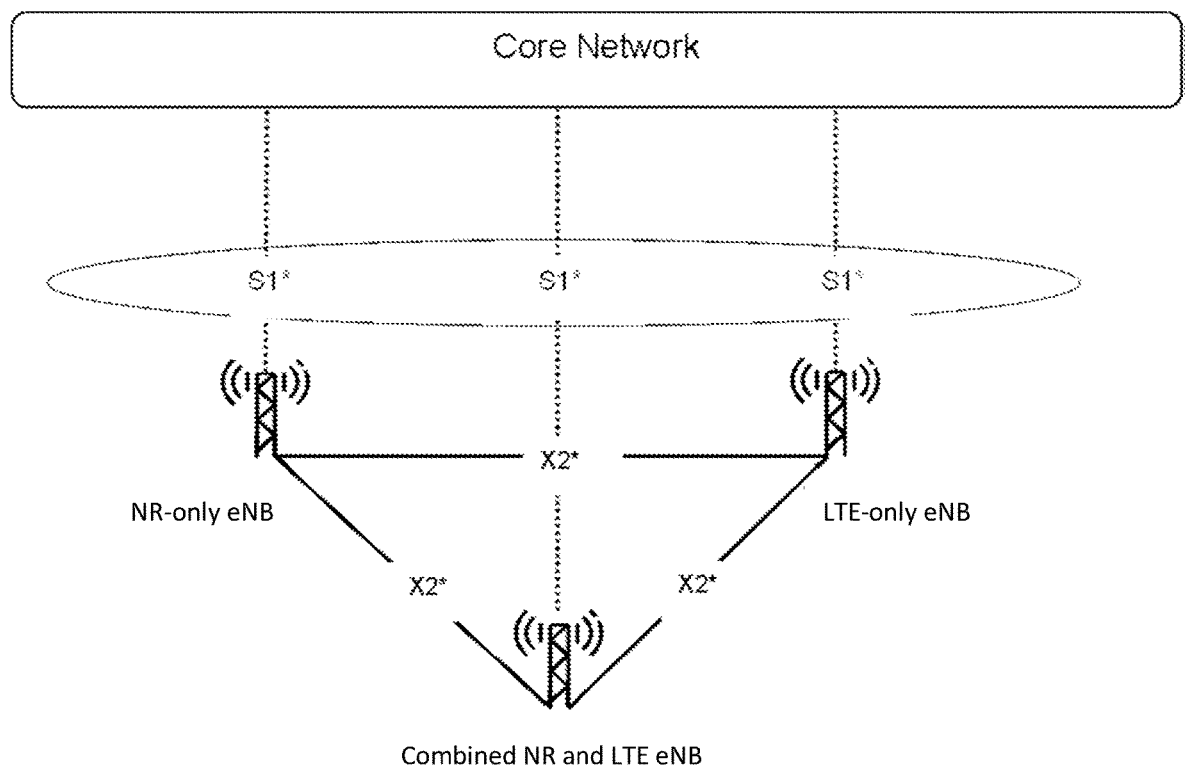
FIG. 1 illustrates a high-level logical architecture for NR and LTE.

As discussed above, beamforming of cell information signals creates potential problems with respect to power consumption for wireless devices, or UEs, operating in dormant mode. In a conventional system where cell information is not beam-formed, there is typically one signal to measure for each cell, where "cell" refers to the geographical area covered by the signals transmitted by a cellular network access point—for the same kind of cell where cell information is beamformed, there can be several tens of signals or beams, such as beams carrying mobility reference signals, to search for. This can increase the power consumption for a UE in dormant mode, especially if the signals are time multiplexed, as search for such beams requires the UE receiver to be on over long durations of time.

The techniques and apparatus described herein address these problems by reducing or limiting the power consumption in dormant mode in a cellular system using beamformed cell information signals, e.g., in a system like 3GPP's NR system. The techniques and apparatus described herein do this by restricting the measurement and cell search sequence in the UE, based on the signal quality of the beamformed cell information signals that have already been measured. For each measurement instance, the UE can focus its search on previously known strong signals and simultaneously search for new cells on that carrier. If the previously known strong signals are verified to be strong enough, the measurement sequence can be stopped, so that the UE need not search for every possible cell information signal. Likewise, if one or a predetermined number of cell information signals are received and determined to be strong enough, the measurement sequence can be stopped, again so that the UE does not search for every cell information signal in a predetermined set of signals among which the search is performed.

An advantage of several of the embodiments described herein is that the measurement durations for a UE in dormant mode can be drastically reduced in those circumstances where the UE can quickly determine that it has "good enough" signal quality for one or more cell information signals, where "good enough" means that the signal quality meets one or more predetermined criteria.

Details of these techniques and apparatus, including a detailed description of several specific embodiments, are provided below. First, however, descriptions of several concepts, system/network architectures, and detailed designs for several aspects of a wireless communications network targeted to address the requirements and use cases for fifth-generation networks (referred to as "5G") are presented, to provide context for the disclosure of the dormant mode operations that follow. It should be appreciated, however, that an actual 5G network may include none, some, or all of the detailed features described below. It will further be appreciated that the techniques and apparatus described herein for performing measurements in dormant mode are not limited to so-called 5G networks, but may be used in and/or adapted for other wireless networks.

In the discussion that follows, the wireless communications network, which includes wireless devices, radio access networks, and core networks, is referred to as "NR." It should be understood that the term "NR" is used herein as simply a label, for convenience. Implementations of wireless devices, radio network equipment, network nodes, and networks that include some or all of the features detailed herein may, of course, be referred to by any of various names. In future development of specifications for 5G, for example, other terms may be used—it will be understood that some or all of the features described here may be directly applicable to these specifications. Likewise, while the various technologies and features described herein are targeted to a "5G" wireless communications network, specific implementations of wireless devices, radio network equipment, network nodes, and networks that include some or all of the features detailed herein may or may not be referred to by the term "5G."

NR targets new use cases, e.g. for factory automation, as well as Extreme Mobile Broadband (MBB), and may be deployed in a wide range of spectrum bands, calling for high degree of flexibility. Licensed spectrum remains a cornerstone for NR wireless access but unlicensed spectrum (stand-alone as well as license-assisted) and various forms of shared spectrum (e.g. the 3.5 GHz band in the US) are natively supported. A wide range of frequency bands are supported, from below 1 GHz to almost 100 GHz. It is of principal interest to ensure that NR can be deployed in a variety of frequency bands, some targeting coverage at lower frequency regions below 6 GHz, some providing a balance of coverage, outdoor-to-indoor penetration and wide bandwidth up to 30 GHz, and finally some bands above 30 GHz that will handle wide bandwidth use cases, but possibly at a disadvantage to coverage and deployment complexity. Both FDD and dynamic TDD, where the scheduler assigns the transmission direction dynamically, are part of NR.

However, it is understood that most practical deployments of NR will likely be in unpaired spectrum, which calls for the importance of TDD.

Ultra-lean design, where transmissions are self-contained with reference signals transmitted along with the data, minimizes broadcasting of signals. Terminals make no assumptions on the content of a subframe unless they are scheduled to do so. The consequence is significantly improved energy efficiency as signaling not directly related to user data is minimized Stand-alone deployments as well as tight interworking with LTE are supported. Such interworking is desirable for consistent user experience with NR when used at higher frequency ranges or at initial NR rollout with limited coverage. The radio-access network (RAN) architecture can handle a mix of NR-only, LTE-only, or dual-standard base stations. The eNBs ("evolved Node Bs," 3GPP terminology for a base station) are connected to each other via new interfaces that are expected to be standardized. It is envisioned that these new interfaces will be an evolution of the existing S1 and X2 interfaces to support features such as network slicing, on demand activation of signals, user plane/control plane splits in the core network (CN), and support for a new connected dormant state, as described herein. As described below, LTE-NR base stations may share at least integrated higher radio interface protocol layers, such as the Packet Data Convergence Protocol (PDCP) and Radio Resource Control (RRC) layers, as well as a common connection to the evolved packet core (EPC).

NR separates dedicated data transmissions from system access functions. The latter include system information distribution, connection establishment functionality, and paging. Broadcast of system information is minimized and not necessarily transmitted from all nodes handling user-plane data. This separation benefits beamforming, energy efficiency, and support of new deployment solutions. In particular, this design principle allows densification to increase the user-plane capacity without increasing the signaling load.

A symmetric design with OFDM in both the downlink and the uplink directions is detailed below. To handle the wide range of carrier frequencies and deployments, a scalable numerology may be used. For example, a local-area, high-frequency node uses a larger subcarrier spacing and a shorter cyclic prefix than a wide-area, low-frequency node. To support very low latency, a short subframe with fast ACK/NACK (acknowledgement/negative acknowledgement) is proposed, with the possibility for subframe aggregation for less latency-critical services. Also, contention-based access is part of NR, to facilitate fast UE initiated access. New coding schemes such as polar codes or various forms of Low-Density Parity Check (LDPC) codes may be used, instead of turbo codes, to facilitate rapid decoding of high data rates with a reasonable chip area. Long discontinuous-receive (DRX) cycles and a new UE state, RRC dormant, where the UE RAN context is maintained, allow fast transition to active mode with reduced control signaling.

Enabling full potential of multi-antenna technology is a cornerstone of the NR design. Hybrid beamforming is supported and advantages with digital beam forming are exploited. User-specific beamforming through self-contained transmission is advantageous for coverage, especially at high frequencies. For the same reason, UE transmit (TX) beamforming is proposed as an advantageous component, at least for high frequency bands. The number of antenna elements may vary, from a relatively small number of antenna elements (e.g., 2 to 8) in LTE-like deployments to many hundreds, where a large number of active or individually steerable antenna elements are used for beamforming, single-user MIMO and/or multi-user MIMO to unleash the full potential of massive MIMO. Reference signals and Medium Access Control (MAC) features are designed to allow exploiting reciprocity-based schemes. Multi-point connectivity, where a terminal is simultaneously connected to two or more transmission points, can be used to provide diversity/robustness, by transmitting the same data from multiple points.

NR includes a beam-based mobility concept to efficiently support high-gain beam forming. This concept is transparent to both inter- and intra-eNB beam handover. When the link beams are relatively narrow, the mobility beams should be tracking UEs with high accuracy to maintain good user experience and avoid link failure. The mobility concept follows the ultra-lean design principle by defining a set of network-configurable downlink mobility reference signals that are transmitted on demand, when mobility measurements from the UE are needed. Uplink measurement based mobility may also be used, with suitable base stations supporting reciprocity.

5G Mobile Broadband (MBB) services will require a range of different bandwidths. At the low end of the scale, support for massive machine connectivity with relatively low bandwidths will be driven by total energy consumption at the user equipment. In contrast, very wide bandwidths may be needed for high capacity scenarios, e.g., 4K video and future media. The NR air interface focuses on high bandwidth services, and is designed around availability of large and preferably contiguous spectrum allocations.

High-level requirements addressed by the NR system described herein include one or more of:

1) Support for higher frequency bands with wider carrier bandwidth and higher peak rates. Note that this requirement motivates a new numerology, as detailed below.
2) Support for lower latency, which requires shorter and more flexible Transmission Time Intervals (TTIs), new channel structures, etc.
3) Support for very dense deployments, energy efficient deployments and heavy use of beam forming, enabled by, for example removing legacy limitations in relation to Cell-specific Reference Signal (CRS), Physical Downlink Control Channel (PDCCH), etc.
4) Support of new use cases, services and customers such as Machine-Type Communication (MTC) scenarios including so-called vehicle-to-anything (V2X) scenarios, etc. This can include more flexible spectrum usage, support for very low latency, higher peak rates etc.

Following is a description of the NR architecture, followed by a description of the radio interface for NR. Following that is a description of a variety of technologies and features that are supported by the NR architecture and radio interface. It should be understood that while the following detailed description provides a comprehensive discussion of many aspects of a wireless communications system, where numerous advantages are obtained by combinations of many of the described features and technologies, it is not necessary for all the technologies and features described herein to be included in a system for the system to benefit from the disclosed technologies and features. For example, while details of how NR may be tightly integrated with LTE are provided, a standalone version of NR is also practical. More generally, except where a given feature is specifically described herein as depending on another feature, any combination of the many technologies and features described herein may be beneficial.

The NR architecture supports both stand-alone deployments and deployments that may be integrated with LTE or, potentially, any other communication technology. In the following discussion, there is a lot of focus on the LTE integrated case. However, it should be noted that similar architecture assumptions also apply to the NR stand-alone case or to integration with other technologies.

FIG. 1 shows the high level logical architecture for an example system supporting both NR and LTE. The logical architecture includes both NR-only and LTE-only eNBs, as well as eNBs supporting both NR and LTE. In the illustrated system, the eNBs are connected to each other with a dedicated eNB-to-eNB interface referred to here as the X2* interface, and to the core network with a dedicated eNB-to-CN interface referred to here as the S1* interface. Of course, the names of these interfaces may vary. As seen in the figure, a core network/radio access network (CN/RAN) split is evident, as was the case with the Evolved Packet Subsystem (EPS).

The S1* and X2* interfaces may be an evolution of the existing S1 and X2 interfaces, to facilitate the integration of NR with LTE. These interfaces may be enhanced to support multi-radio access technology (RAT) features for NR and LTE Dual Connectivity (DC), potentially new services (IoT or other 5G services), and features such as network slicing (where, for example, different slices and CN functions may require a different CN design), on demand activation of mobility reference signals, new multi-connectivity solutions, potentially new user plane/control plane splits in the CN, support for a new connected dormant state, etc.

Figure 2:
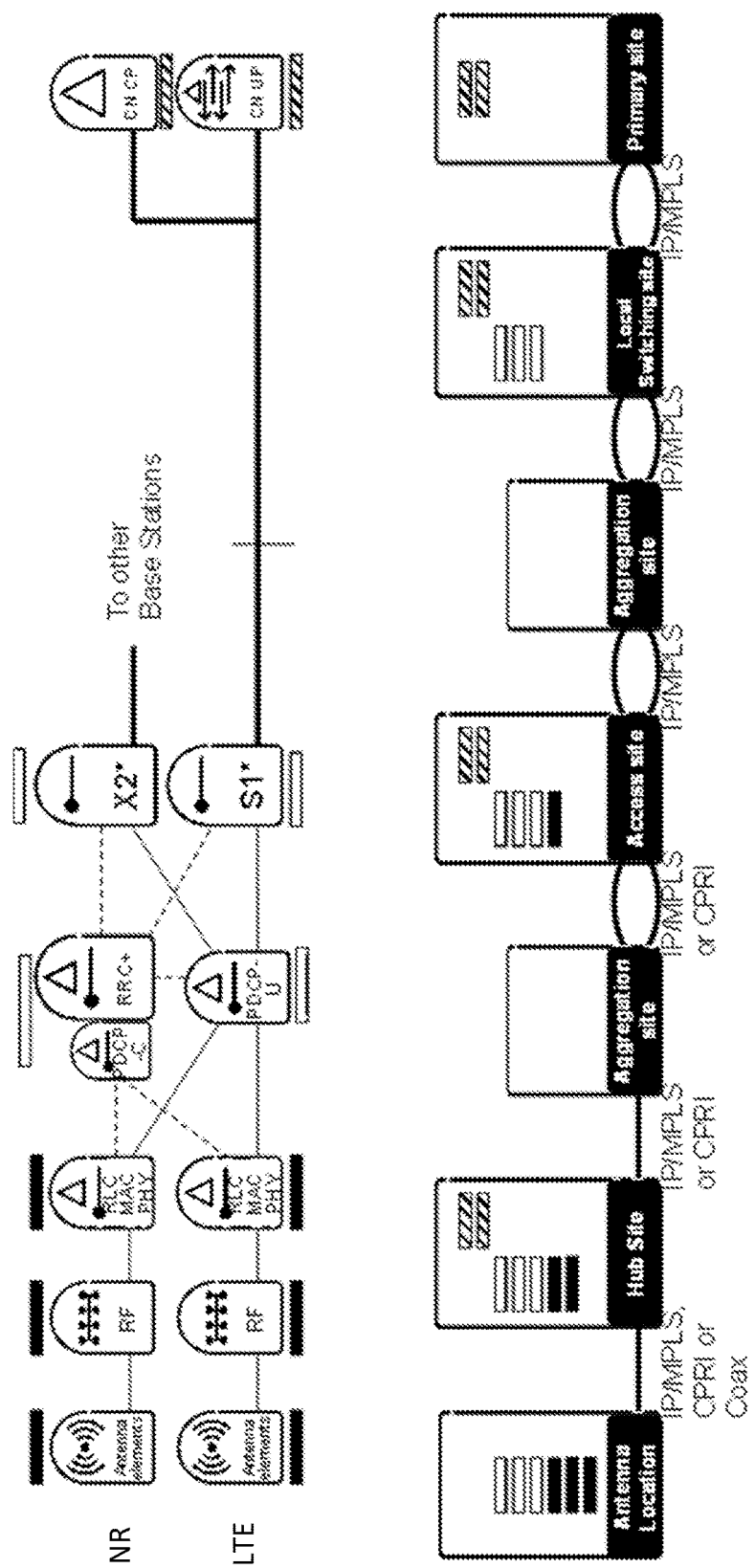
FIG. 2 shows an NR and LTE logical architecture.

FIG. 2 shows the same logical architecture as FIG. 1, but now also includes an example of an internal eNB architecture, including possible protocols splits and mapping to different sites.

Following are features of the architecture discussed herein:
  LTE and NR may share at least integrated higher radio interface protocol layers (PDCP and RRC) as well as a common S1* connection to packet core (EPC)
    The usage of LTE or NR for 5G capable UEs can be transparent to the EPC (if desired).
  The RAN/CN functional split over S1* is based on the current split used over S1.
  Note, however that this does not exclude enhancements to the S1* compared to S1, e.g., to support new features such as network slicing.
  The 5G network architecture supports flexible placement (deployment) of CN (EPC) functionality per user/flow/network slice
  Centralization of PDCP/RRC is supported. The interface between PDCP/RRC and lower layer entities need not be standardized (although it can be), but can be proprietary (vendor-specific).
    The radio interface is designed to support architecture flexibility (allowing for multiple possible functional deployments, e.g., centralized/distributed).
    The architecture also supports fully distributed PDCP/RRC (as is the case with LTE, today).
  To support NR/LTE dual connectivity with centralized PDCP and RRC, NR supports a split somewhere between the RRC/PDCP layers and the Physical layer, e.g., at the PDCP layer. Flow control may be implemented on X2*, supporting the split of PDCP and Radio Link Control (RLC) in different nodes.
    PDCP is split into a PDCP-C part, used for Signaling Radio Bearers (SRBs), and PDCP-U part, used for User Radio Bearers (URBs), which can be implemented and deployed in different places.
  The architecture supports Common Public Radio Interface (CPRI)-based splits between a Radio Unit (RU) and a Baseband Unit (BBU), but also other splits where some processing is moved to the RU/Antenna in order to lower the required front-haul bandwidth towards the BBU (e.g., when supporting very large bandwidth, many antennas).

Note that despite the above discussion, alternative RAN/CN splits are possible, while still maintaining many of the features and advantages described herein.

This section discusses the different UE states in NR and LTE, with focus on the UE sleep states, or "dormant" states. In LTE, two different sleep states are supported:
  ECM_IDLE/RRC_IDLE, where only the Core Network (CN) context is stored in the UE. In this state, the UE has no context in the RAN and is known on Tracking Area (or Tracking Area List) level. (The RAN context is created again during transition to RRC_CONNECTED.) Mobility is controlled by the UE, based on cell reselection parameters provided by the network.
  ECM_CONNECTED/RRC_CONNECTED with UE configured DRX. In this state, the UE is known on the cell level and the network controls the mobility (handovers).

Out of these two states, ECM_IDLE/RRC_IDLE is the primary UE sleep state in LTE for inactive terminals. RRC_CONNECTED with DRX is also used, however the UE is typically released to RRC_IDLE after X seconds of inactivity (where X is configured by the operator and typically ranges from 10 to 61 seconds). Reasons why it may be undesirable to keep the UE longer in RRC_CONNECTED with DRX include limitations in eNB hardware capacity or software licenses, or other aspects such as slightly higher UE battery consumption or a desire to keep down the number of Handover Failures.

Given that initiating data transmission from ECM_IDLE in LTE involves significantly more signaling compared to data transmission from "RRC_CONNECTED with DRX", the "RRC_CONNECTED with DRX" state is enhanced in NR to become the primary sleep state. The enhancement includes adding support for UE-controlled mobility within a local area, thus avoiding the need for the network to actively monitor the UE mobility. Note that this approach allows for the possibility that the LTE solution can be further evolved to create a common RRC Connected sleep state for NR and LTE.

The following are features of this NR UE sleep state, which is referred to herein as RRC_CONNECTED DORMANT (or RRC DORMANT for short):
  It supports DRX (from milliseconds to hours).
  It supports UE-controlled mobility, e.g., the UE may move around in a Tracking RAN Area (TRA) or TRA list without notifying the network (TRA (lists) span across LTE and NR).
  Transition to and from this state is fast and lightweight (depending on the scenario, whether optimized for energy saving or fast access performance), e.g., as enabled by storing and resuming the RAN context (RRC) in the UE and in the network.

When it comes to detailed solutions how this RRC DORMANT state is supported, there are different options based on different level of CN involvement. One option is as follows:

The CN is unaware of whether the UE is in RRC_CONNECTED DORMANT or RRC_CONNECTED ACTIVE (described later), meaning the S1* connection is always active when UE is in RRC_CONNECTED, regardless of sub state.

A UE in RRC DORMANT is allowed to move around within a TRA or TRA list without notifying the network.

Paging is triggered by the eNB when a packet arrives over S1*. The MME may assist the eNB by forwarding page messages when there is no X2* connectivity to all the eNBs of the paging area.

When the UE contacts the network from RRC DORMANT in a RAN node that does not have the UE context, the RAN node tries to fetch the UE context from the RAN node storing the context. If this is successful, the procedure looks like an LTE X2 handover in the CN. If the fetch fails, the UE context is re-built from the CN.

The area that the UE is allowed to move around without notifying the network may comprise a set of Tracking RAN Areas, and covers both LTE and NR RAT, thus avoiding the need to signal when switching RAT in RRC DORMANT.

In addition to the RRC DORMANT state (optimized for power saving), there is an RRC_CONNECTED ACTIVE (RRC ACTIVE) state used for actual data transmission. This state is optimized for data transmissions, but allows the UE to micro-sleep, thanks to DRX configuration, for scenarios when no data is transmitted but a very quick access is desired. This may be referred to as monitoring configuration within the RRC ACTIVE state. In this state, the UE cell or beam level mobility is controlled and known by the network.

Given a tight integration between NR and LTE, the desire to have a RAN controlled sleep state in NR drives requirements to also support a RAN-controlled sleep state in LTE for NR/LTE capable UEs. The reason for this is that to support tight NR and LTE integration, a common S1* connection is desirable for LTE and NR. If a RAN-controlled sleep state is introduced on the NR side, it would be very beneficial to have similar sleep state on the LTE side, also with an active S1* connection, so that the sleeping UE can move between NR and LTE without performing signaling to setup and tear down the S1* connection. This type of inter-RAT re-selection between LTE and NR may be quite common, especially during early deployments of NR. Accordingly, a common RAN-based sleep state called RRC_ CONNECTED DORMANT should be introduced in LTE. The UE behavior in this state is similar to what is defined for LTE RRC suspend/resume, however the paging is done by the RAN and not by the CN, since the S1* connection is not torn down when RRC is suspended.

Similarly, a common RRC_CONNECTED ACTIVE state between NR and LTE is desirable. This state is characterized in that the NR/LTE capable UE is active in either NR or LTE or both. Whether the UE is active in NR or LTE or both is a configuration aspect within the RRC ACTIVE state, and these conditions need not be regarded as different sub states, since the UE behavior is similar regardless which RAT is active. To give one example, in the case only one of the links is active, regardless of which link, the UE is configured to transmit data in one and to perform measurements in another one for dual-connectivity and mobility purposes.

Figure 3:
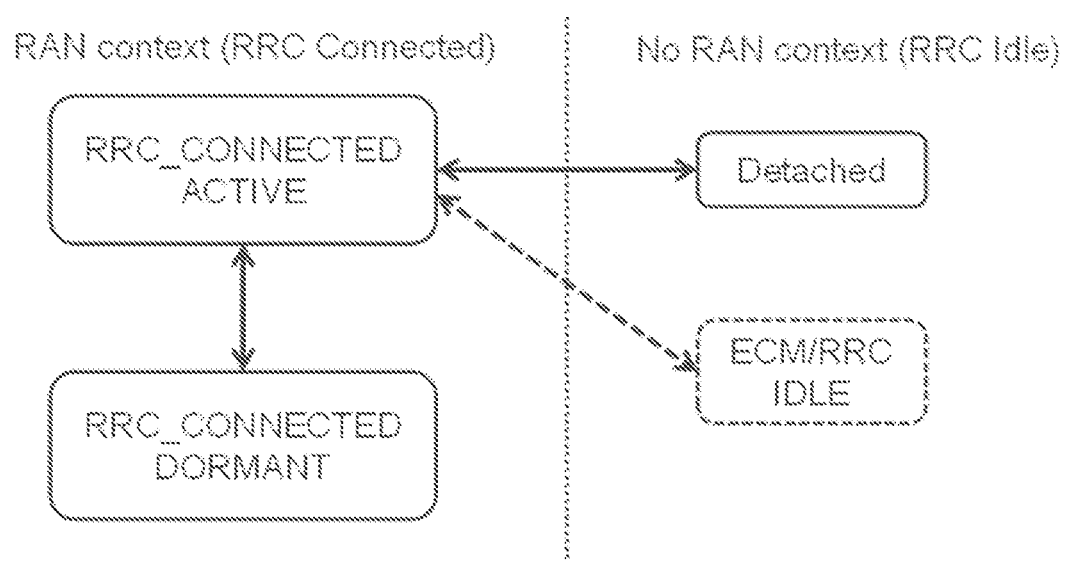
FIG. 3 illustrates LTE/NR UE states.

FIG. 3 shows the UE states in an LTE/NR system where LTE supports the common RRC_CONNECTED ACTIVE and RRC_CONNECTED DORMANT states discussed above. These states are described further below.

Detached (Non RRC configured)
  EMM_DETACHED (or EMM_NULL) state defined in Evolved Packet Subsystem (EPS) when the UE is turned off or has not yet attached to the system.
  In this state the UE does not have any Internet Protocol (IP) address and is not reachable from the network.
  Same EPS state is valid for both NR and LTE accesses.
ECM/RRC_IDLE
  This is similar to the current ECM_IDLE state in LTE. This state may be optional.
    In the event this state is kept, it is desirable for the paging cycles and Tracking RAN Areas to be aligned between RAN-based paging in RRC DORMANT and CN-based paging in ECM_IDLE, since then the UE could listen to both CN- and RAN-based paging making it possible to recover the UE if the RAN based context is lost.
RRC_CONNECTED ACTIVE (RRC state)
  UE is RRC-configured, e.g., it has one RRC connection, one S1* connection and one RAN context (including a security context), where these may be valid for both LTE and NR in the case of dual-radio UEs.
  In this state it is possible, depending on UE capabilities, to transmit and receive data from/to NR or LTE or both (RRC configurable).
  In this state, the UE is configured with at least an LTE Serving Cell or an NR serving beam and can quickly set up dual connectivity between both NR and LTE when needed. The UE monitors downlink scheduling channels of at least one RAT and can access the system via for instance scheduling requests sent in the uplink.
  Network controlled beam/node mobility: UE performs neighbouring beam/node measurements and measurement reports. In NR, the mobility is primarily based on NR signals such as TSS/MRSs and in LTE, Primary Synchronization Sequence (PSS)/Secondary Synchronization Sequence (SSS)/CRS is used. NR/LTE knows the best beam (or best beam set) of the UE and its best LTE cell(s).
  The UE may acquire system information via a Signature Sequence Index (SSI) and corresponding Access Information Table (AIT), for example, and/or via NR dedicated signaling or via LTE system information acquisition procedure.
  UE can be DRX configured in both LTE and NR to allow micro-sleeps (in NR sometimes referred as beam tracking or monitoring mode). Most likely the DRX is coordinated between RATs for UEs active in both RATs.
  The UE can be configured to perform measurements on a non-active RAT which can be used to setup dual connectivity, for mobility purposes or just use as a fallback if the coverage of the active RAT is lost.
RRC_CONNECTED DORMANT (RRC state)
  UE is RRC-configured, e.g., the UE has one RRC connection and one RAN context regardless of the access.
  UE can be monitoring NR, LTE, or both, depending on coverage or configuration. RRC connection re-activation (to enter RRC ACTIVE) can be either via NR or LTE.
  UE-controlled mobility is supported. This can be cell re-selection in the case of only LTE coverage or NR Tracking RAN Area selection in the case of NR-only coverage. Alternatively, this can be a jointly optimized cell/area reselection for overlapping NR/LTE coverage.
  UE-specific DRX may be configured by RAN. DRX is largely used in this state to allow different power saving cycles. The cycles can be independently configured per RAT, however some coordination might be required to ensure good battery life and high paging success rate. Since the NR signals have configurable periodicity there are methods that allow the UE to identify the changes and adapt its DRX cycles.

UE may acquire system information via SSI/AIT in NR or via LTE. UE monitors NR common channels (e.g., NR paging channel) to detect incoming calls/data, AIT/SSI changes, Earthquake Tsunami Warning System (ETWS) notification and Commercial Mobile Alert System (CMAS) notification. UE can request system information via a previously configured Random Access channel (RACH).

Several different types of measurements and/or signals are measured in NR, e.g., MRS, SSIs, Tracking RAN Areas Signals (TRAS), etc. Mobility events and procedures thus need to be addressed for NR.

The RRC Connection Reconfiguration message should be able to configure both the NR measurements and the existing LTE measurements for the single RRC option. The measurement configuration should include the possibility to configure the UE to measure for NR/LTE coverage e.g., to initiate DC setup or inter-RAT handover (as in the legacy).

There are two different measurement reporting mechanisms for NR, non-RRC based reporting, where the UE indicates the best of a set of candidate downlink beams through a preconfigured uplink synchronization signal (USS) sequence; and RRC-based reporting, which is similar in some respects to the event-triggered LTE measurement reporting. These two measurement reporting mechanisms are preferably deployed in parallel and used selectively, e.g., depending on the UE's mobility state.

System information as known from previous releases of the LTE standards consists of very different types of information, access information, node-specific information, system-wide information, public warning system (PWS) information, etc. Delivery of this wide range of information does not use the same realization in NR. In a system with high-gain beamforming, the cost of providing large amount of data in broadcast manner may be costly compared to point to point distribution in a dedicated beam with high link gain.

The paging solution for NR utilizes one or both of two channels: a Paging Indication Channel (PICH) and a Paging Message Channel (PMCH). The paging indication may contain one or more of the following: a paging flag, warning/alert flag, identifier (ID) list, and resource allocation. PMCH may optionally be transmitted after the PICH. When the PMCH message is sent, it may contain one or more of the following contents: ID list, and warning/alert message. Warning and broadcast messages are preferably to be transmitted over the PMCH (and not in the AIT). To allow tight integration with LTE, paging configuration (and so DRX configuration) may be Single-Frequency Network (SFN)-based.

To support paging functionality, tracking RAN areas are configured at the UE. A tracking RAN area (TRA) is defined by a set of nodes transmitting the same tracking RAN area signal (TRAS). This signal contains the Tracking RAN Area Code as well as the SFN.

Each TRA may have a specific paging and TRAS configuration which is provided to the UE via dedicated signaling, e.g., via a TRA Update Response or RRC Reconfiguration message. The TRA Update Response may, furthermore, contain paging messages.

A number of different reference signals are provided in NR, for channel estimation and mobility. Both the presence of the reference signals as well as the measurement reports are controlled by the scheduler. The presence of signals can be dynamically or semi-persistently signaled to one or a group of users.

Also, reference signals for active mode mobility (MRS) can be dynamically scheduled. A UE is then assigned with a search space for mobility transmissions. Observe that this search space is potentially monitored by one or more UEs and/or transmitted from one or more transmission points.

Scheduled reference signal transmissions (such as MRS) contain a locally unique (at least within the search space) measurement identity in the data message, and reuse some or multiple of the pilots in the transmission both for demodulation and measurement purposes, implying that it is a self-contained message.

NR uses OFDM as modulation scheme in both uplink and downlink, possibly also including a low peak-to-average power ratio (PAPR) mode (e.g., discrete Fourier transform-spread OFDM, or DFTS-OFDM) for energy-efficient low-PAPR operation and Filtered/Windowed OFDM for frequency-domain mixing of numerologies. Note that a "numerology," as that term is used herein, refers to a particular combination of OFDM subcarrier bandwidth, cyclic prefix length, and subframe length. The term subcarrier bandwidth, which refers to the bandwidth occupied by a single subcarrier, is directly related to, and is sometimes used interchangeably, with subcarrier spacing.

The modulation scheme of NR is cyclic-prefix OFDM, both for uplink and downlink, which enables a more symmetric link design. Given the large operating range of NR, sub-1 GHz to 100 GHz, multiple numerologies may be supported for the different frequency regions. OFDM is a good choice for NR, since it combines very favorably with multi-antenna schemes, another significant component in NR. In OFDM, each symbol block is very well localized in time, which makes OFDM also very attractive for short transmission bursts, important for various MTC applications. OFDM does not provide as good isolation between subcarriers as some filter-bank based schemes do; however, windowing or sub band filtering provide sufficient isolation between sub bands (e.g., not individual subcarriers but collections of subcarriers), where needed.

For some use-cases, mixing of different OFDM numerologies is beneficial. Mixing of OFDM numerologies can either be done in time-domain or frequency domain. For mixing of MBB data and extremely latency-critical MTC data on the same carrier, frequency-domain mixing of OFDM numerologies is beneficial. Frequency-domain mixing can be implemented using Filtered/Windowed OFDM. FIG. 4(a) shows a block diagram of Filtered/Windowed OFDM. In this example, the upper branch uses narrow (16.875 kHz) subcarriers 400-1100. The lower branch uses wide (67.5 kHz) subcarriers 280-410 which correspond to narrow subcarriers 1120-1640. FIG. 4(b) shows the mapping of upper and lower branches to the time-frequency plane. During the time duration of the large Inverse Fast Fourier Transform (IFFT) (2048 samples), four small IFFTs (512 samples) are performed.

Figure 5:
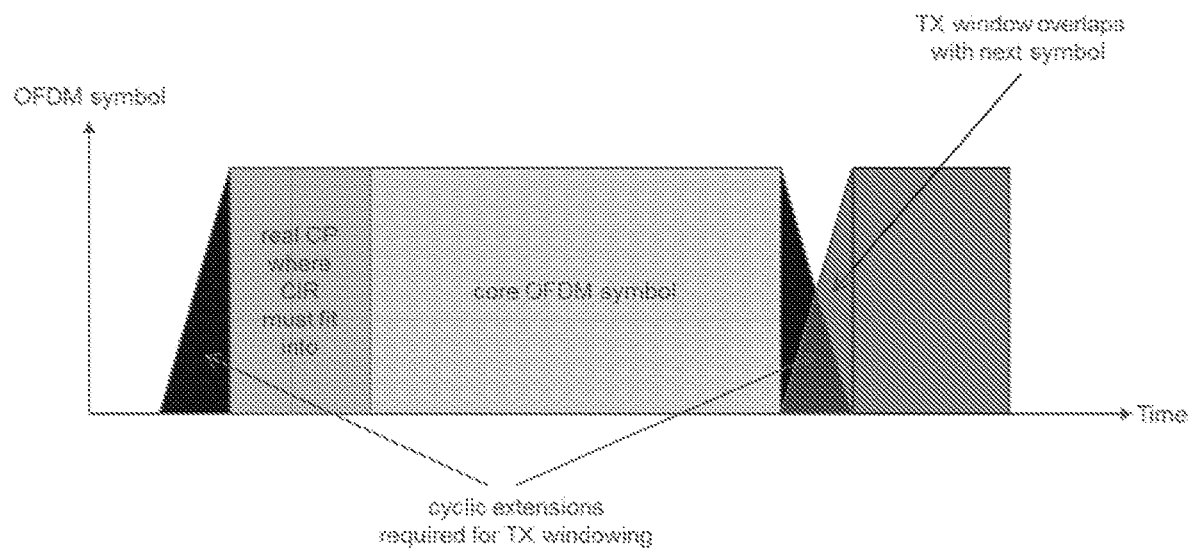
FIG. 5 shows windowing of an OFDM symbol.

In Filtered OFDM, sub bands are filtered to reduce interference towards other sub bands. In Windowed OFDM, beginning and end of OFDM symbols are multiplied with a smooth time-domain window (regular OFDM uses a rectangular window spanning the length of an OFDM symbol including cyclic prefix) reducing discontinuities at symbol transitions and thus improve spectrum roll off. This is shown in FIG. 5, which illustrates how the beginning and end of an OFDM symbol are multiplied by a smooth time-domain window.

Figure 4:
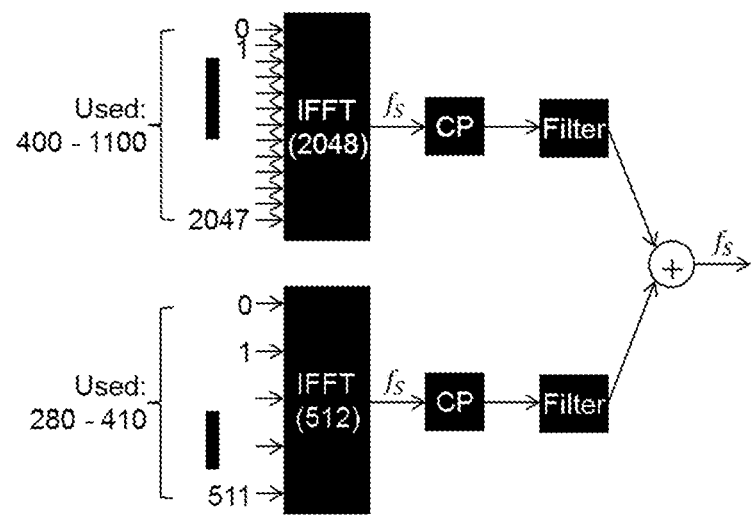
FIG. 4 includes a block diagram of filtered/windowed Orthogonal Frequency-Division Multiplexing (OFDM) processing and shows mapping of subcarriers to time-frequency plane.
Figure 4:
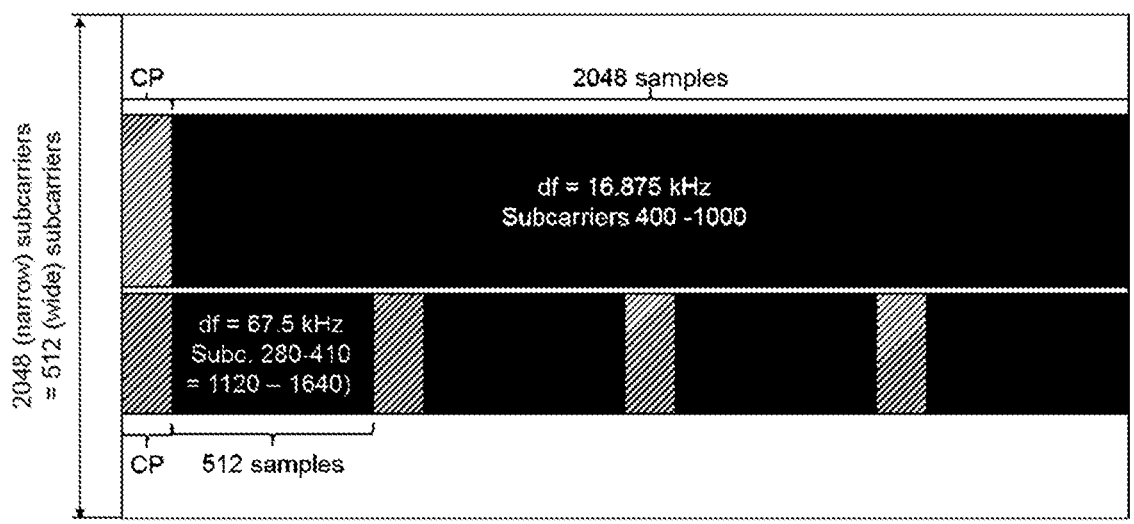

In the example frequency-domain mixing of OFDM numerologies shown in FIG. 4, the lower branch uses numerology with four times as wide subcarriers as the upper branch, e.g., 16.875 kHz and 67.5 kHz for the upper and lower branch, respectively. In this example, both branches use the same clock rate after IFFT processing and can directly be added. However, in a practical realization this may not be the case; especially if one of the numerologies spans a much narrower bandwidth than the other processing at a lower sampling rate is preferable.

While filtered OFDM is possible, windowed OFDM is preferred due to its greater flexibility.

Sub band filtering or windowing (both at the transmitter and the receiver) and guard bands are desirable to suppress inter-subcarrier interference, since subcarriers of different numerologies are not orthogonal to each other. In addition to sub band filtering or windowing, filtering across the transmission bandwidth is also desirable, to fulfill the desired out-of-band emission requirements. A guard band of 12 narrowband subcarriers enables an SNR of 20+ dB on all subcarriers, while a guard band of 72 narrowband subcarriers allows an SNR of 35+ dB on all subcarriers. To avoid unnecessary guard band losses, Filtered/Windowed OFDM may be limited to two contiguous blocks of different numerologies. To the extent that Filtered/Windowed OFDM is supported by the NR standard, every NR device—even a device only supporting a single numerology—should support transmit and receive filtering/windowing since it could operate on an NR carrier operating with mixed numerologies (given the low complexity of windowing it is reasonable to assume that every UE can implement windowing). A network node on the other hand, needs only to support Filtered/Windowed OFDM if it supports use case mixes requiring frequency-domain mixing of numerologies. Note that detailed specifications of the windowing or sub band filtering are not needed, but rather performance requirements to test the chosen implementation. Sub band filtering and windowing can also be mixed on transmitter and receiver.

OFDM may also include a low-PAPR mode such as DFTS-OFDM. OFDM is used to maximize performance while the low-PAPR mode might be used in node realizations (both eNB and UE) where low peak to average power ratio (PAPR) of the waveform is important from a hardware perspective, e.g., at very high frequencies.

At the physical layer, the minimum transmission unit is a subframe. Longer transmissions can be realized by subframe aggregation. This concept enables a variable TTI, for a given transmission the TTI corresponds to the length of the subframe or to the length of the subframe aggregate in case of subframe aggregation.

Three subcarrier bandwidths are defined to cover the operating range from below 1 GHz to 100 GHz and the large use case space.

NR supports both frequency-division duplexing (FDD) and dynamic time-division duplexing (TDD) modes. Even though not relevant for the first releases of NR, the concept is extendable to full duplex, especially at the base station, as full duplex technology becomes more mature.

Figure 6:
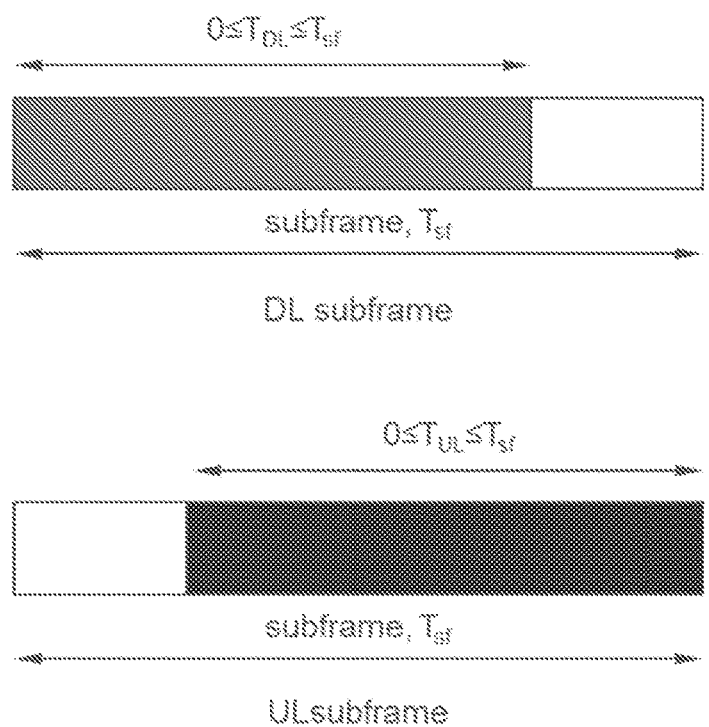
FIG. 6 illustrates basic subframe types.

The NR physical layer as described herein has no frames but only subframes. It is possible that the concept of frames can be introduced later. Two basic subframe types, one for uplink and one for downlink, are defined. These subframe types are identical for both FDD and TDD. FIG. 6 depicts the basic subframe types, where $T_{sf}$ is the subframe duration. $T_{DL}$ and $T_{UL}$ are the active transmission durations in downlink and uplink, respectively. A subframe consists of $N_{symb}$ OFDM symbols, but not all symbols in a subframe are always used for active transmission. Transmission in a downlink subframe starts at the beginning of the subframe and can extend from 0 up to at most $N_{symb}$ OFDM symbols (later start of a transmission in a downlink subframe for listen-before-talk operation is also possible). Transmission in an uplink subframe stops at the end of the subframe and can extend from 0 up to at most $N_{symb}$ OFDM symbols. The gaps—if present—are used in TDD for transmission in the reverse direction within a subframe, as explained below.

The duration of a single subframe is very short. Depending on the numerology, the duration may be a few hundred µs or even less than 100 µs, in the extreme case even less than 10 µs. Very short subframes are important for Critical Machine-Type Communication (C-MTC) devices requiring short latency, and such devices typically check for control signaling transmitted at the beginning of every downlink subframe. Given the latency critical nature, the transmission itself can also be very short, e.g., a single subframe.

For MBB devices, extremely short subframes are typically not needed. It is therefore possible to aggregate multiple subframes and schedule the subframe aggregate using a single control channel.

It is well known that robustness of an OFDM system towards phase noise and Doppler shift increases with subcarrier bandwidth. However, wider subcarriers imply shorter symbol durations which—together with a constant cyclic prefix length per symbol—result in higher overhead. The cyclic prefix should match the delay spread and is thus given by the deployment. The required cyclic prefix (in µs) is independent of the subcarrier bandwidth. The "ideal" subcarrier bandwidth keeps the cyclic prefix overhead as low as possible but is wide enough to provide sufficient robustness towards Doppler and phase noise. Since the effect of both Doppler and phase noise increase with carrier frequency the required subcarrier bandwidth in an OFDM system increases with higher carrier frequency.

Considering the wide operating range of below 1 GHz to 100 GHz it is impossible to use the same subcarrier bandwidth for the complete frequency range and keep a reasonable overhead. Instead, three subcarrier bandwidths span the carrier frequency range from below 1 to 100 GHz.

To enable subframe durations of a few 100 µs using LTE numerology (for LTE frequencies), one subframe would have to be defined as a few OFDM symbols. However, in LTE, OFDM symbol durations including cyclic prefix vary (the first OFDM symbol in a slot has a slightly larger cyclic prefix) which would lead to varying subframe durations. (Varying subframe durations are in practice likely not a significant problem and could be handled. In LTE, the varying cyclic prefix length leads to somewhat more complicated frequency error estimators.) Alternatively, a subframe could be defined as an LTE slot, leading to subframe durations of 500 µs. This, however is considered too long.

Therefore, even for LTE frequencies a new numerology is described herein. The numerology is close to the LTE numerology, to enable the same deployments as LTE, but provides subframes of 250 µs. The subcarrier bandwidth is 16.875 kHz. Based on this subcarrier bandwidth several other numerologies are derived: 67.5 kHz for around 6 to 30/40 GHz or dense deployments (even at lower frequencies) and 540 kHz for the very high frequencies. Table 1 lists the most important parameters of these numerologies, e.g., $f_s$: Clock frequency, $N_{symb}$: OFDM symbols per subframe, $N_{sf}$: samples per subframe, $N_{ofdm}$: Fast Fourier Transform (FFT) size, $N_{cp}$: cyclic prefix length in samples, $T_{sf}$: subframe duration, $T_{ofdm}$: OFDM symbol duration (excluding cyclic prefix), and $T_{cp}$: cyclic prefix duration). Table 1 is based on an FFT size of 4096 and a clock frequency of 34.56 MHz to allow the covering of large carrier bandwidths.

The proposed numerologies are not based on the LTE clock frequency (30.72 MHz) but on 16.875/15·30.72 MHz=9/8·30.72 MHz=9·3.84 MHz=34.56 MHz. This new clock relates via a (fractional) integer relation to both LTE and Wideband Code-Division Multiple-Access (WCDMA) clocks and can thus be derived from them.

Mixing of numerologies on a TDD carrier should obey the half-duplex nature of TDD—simultaneous transmission and reception capability of a transceiver cannot be assumed. The most frequent duplex switching in TDD is thus limited by the "slowest" numerology among the simultaneously used ones. One possibility is to enable duplex switching on the "fastest" numerology subframe basis when needed and accept losing currently ongoing transmission in the reverse link.

Signature sequences (SS), as discussed below, are used to indicate an entry in AIT and to establish some level of subframe synchronization for at least random access preamble transmission. SS are constructed in a similar way as the synchronization signal in LTE by concatenation of a primary signature sequence and a secondary signature sequence.

TABLE 1

| | Subcarrier bandwidth | | | | |
|---|---|---|---|---|---|
| | 16.875 kHz, normal cyclic prefix (CP) | 16.875 kHz, long CP | 67.5 kHz, normal CP | 67.5 kHz, long CP | 540 kHz, normal CP |
| Main scenario | <~6 GHz | <~6 GHz SFN transm. | ~6 to 30-40 GHz or dense depl. | Low delay in wide-area deployments | >30-40 GHz |
| $f_s$ in MHz | 69.12 = 2 × 34.56 | | 276.48 = 2 × 138.24 | | 2212 = 2 × 1105.92 |
| $N_{symb}$ | 4 | 3 | 4 | 7 | 4 (larger number is possible) |
| $N_{sf}$ | 17280 | 17280 | 17280 | 34560 | 17280 |
| $N_{ofdm}$ | 4096 | 4096 | 4096 | 4096 | 4096 |
| $N_{cp}$ | 224 | 1664 | 224 | 4 × 848, 3 × 832 | 224 |
| CP overhead in % | 5.5 | 40.6 | 5.5 | 20.5 | 5.5 |
| $T_{sf}$ in μs | 250 | 250 | 62.5 | 125 | 7.81 |
| $T_{ofdm}$ in μs | 59.26 | 59.26 | 14.82 | 14.82 | 1.85 |
| $T_{cp}$ in μs | 3.24 | 24.07 | 0.81 | 3.01 | 0.10 |
| $T_{ofdm} + T_{cp}$ in μs | 62.5 | 83.33 | 15.625 | 17.86 | 1.95 |
| Max carrier bandwidth in MHz | 60 | 60 | 250 | 250 | 2000 |

Note that numerologies for implementations may vary from those listed in Table 1. In particular, numerologies with long cyclic prefixes may be adjusted.

Table 1 shows that OFDM symbol duration and subframe duration decrease with subcarrier bandwidth, making numerologies with wider subcarriers suitable for low-latency application. The cyclic prefix length also decreases with subcarrier bandwidth, limiting the wider subcarrier configurations to dense deployments. This can be compensated by long cyclic prefix configuration, at the price of increased overhead. In other words, shorter subframes and thus latencies are more efficiently available in small cells than in large cells. In practice, however, it is expected that many latency critical applications deployed in the wide area (and thus require a cyclic prefix larger than 1 μs) don't require subframe durations smaller than 250 μs. In the rare cases where wide area deployments require smaller subframe durations, 67.5 kHz subcarrier bandwidth—with long cyclic prefix if needed—can be used. The 540 kHz numerology provides even shorter subframes.

The maximum channel bandwidths of the different numerologies are, approximately, 60 MHz, 240 MHz, and 2 GHz for 16.875 kHz, 67.5 kHz, and 540 kHz numerology, respectively (assuming an FFT size of 4096). Wider bandwidths can be achieved with carrier aggregation.

Mixing of different numerologies on the same carrier is possible, using Filtered/Windowed OFDM. One of the motivations is to achieve lower latency on a part of the carrier.

The combination of time and frequency synchronization signal (TSS) and beam reference signal (BRS) is used to obtain time/frequency/beam synchronization after initial synchronization and access by SS and Physical Random Access Channel (PRACH). This combined signal is also referred to as MRS (mobility reference signal) and is used for handover (between nodes and beams), transitions from dormant to active states (e.g., from RRC_CONNECTED DORMANT to RRC_CONNECTED ACTIVE, as discussed above), mobility, beam tracking and refinement, etc.

The MRS is constructed by concatenating TSS and BRS such that MRS is transmitted within a single DFT-precoded OFDM symbol.

Channel state information reference signals (CSI-RS) are transmitted in downlink and are primarily intended to be used by UEs to acquire channel state information (CSI). CSI-RS are grouped into sub-groups according to the possible reporting rank of the UE measurement. Each sub-group of CSI-RS represents a set of orthogonal reference signals.

Positioning reference signals (PRS) aid positioning. Already existing reference signals should be reused for PRS purposes. On top of that—if required—modifications and additions can be done to improve positioning performance.

TABLE 2

Downlink reference and synchronization signals in NR

| Signal | Purpose |
| --- | --- |
| Signature sequence (SS) | Used to synchronize time and frequency for random access. Provides index to AIT table. |
| Mobility and access reference Signal (MRS) | Concatenation of one TSS and one BRS |
| Time and frequency synchronization signal (TSS) | Used to synchronize time (OFDM symbol timing) and coarse frequency offset estimation in a beam. |
| Beam reference signal (BRS) | Used for measurements on beam candidates to enable active mode mobility. Also used for frame and subframe timing. |
| Demodulation reference signal (DMRS) for PDCCH | Demodulation reference signals for PDCCH |
| Channel state information reference signal (CSI-RS) | Used for channel state measurements to aid rank and Modulation and Coding Scheme (MCS) selection. |
| Positioning reference signal (PRS) | To aid positioning. |

Basic functions of the signature sequence (SS) are one or more of:
- to obtain the SSI, which is used to identify the relevant entry in AIT;
- to provide coarse frequency and time synchronizations for the following initial random access and relative AIT allocation;
- to provide a reference signal for initial layer selection (to select which SS transmission point for a UE to connect, based on the path-loss experienced by SS's);
- to provide a reference signal for open-loop power control of the initial PRACH transmission; and
- to provide a coarse timing reference used for assisting the UE in inter-frequency measurements and also possible beam finding procedure. The current assumption is that SS transmissions are synchronized within a ±5 ms uncertainty window unless explicitly indicated otherwise. The period of SS is supposed to be in the order of 100 ms, which however may be varied, depending on the scenarios.

It is noted that the number of the candidate sequences needs to be large enough to indicate any entry in AIT. Taking the terminal detection complexity into account, the number of SS sequences is $2^{12}$, corresponding to 12 bits for reuse 1 of the sequences, or less if less aggressive sequence reuse is required. Note that the number of bits to be carried depends on requirements. If the number of bits increases beyond what can be carried by sequence modulation, a variation of the SS format is desirable. In this case, one code-word containing the extra bits beyond what the sequences can carry can be appended. This block, following an SS transmission, is named SS block (SSB). The content in this block is flexible and contains the other relevant information bits, which need a periodicity in the order of 100 ms. For example, they can be the "AIT pointer", which indicates the time and band where the terminals can find the AIT and even the transmission format of AIT to avoid full blind detection.

The sequence design for SS can follow the TSS/BRS sequence design, since they would provide the coarse synchronization function before the initial random access.

To support the massive analog beamforming, a fixed absolute time duration, e.g., 1 millisecond, is reserved to sweep multiple analog beams.

In the process of acquiring system access information (acquiring system information and detecting a suitable SSI), the UE gets time and frequency synchronized towards one or several nodes by using SS. The latter is achieved in the case of system access information transmitted simultaneously from several nodes in an SFN (single frequency network) manner.

When the UE enters active mode, it targets to receive or transmit with a high data rate connection, in which it might need more accurate synchronization and perhaps beamforming.

Here, the mobility and access reference signal (MRS) is used. A UE might also need to change which node it is connected to e.g., from a node used to transmit system access information to another node capable of beamforming. Furthermore, the UE might also change carrier frequency or numerology to higher sub-carrier spacing and shorter cyclic prefix when moving to certain operational modes in active mode.

The MRS is constructed in order to do time and frequency offset estimations as well as estimation of best downlink transmitter and receiver beams towards an "active mode access point". Frequency accuracy and timing provided by MRS is probably not sufficient for high-order modulation reception and finer estimation may be based on demodulation reference signals (DMRS) embedded in Physical Data Channel (PDCH) and/or CSI-RS.

Figure 7:
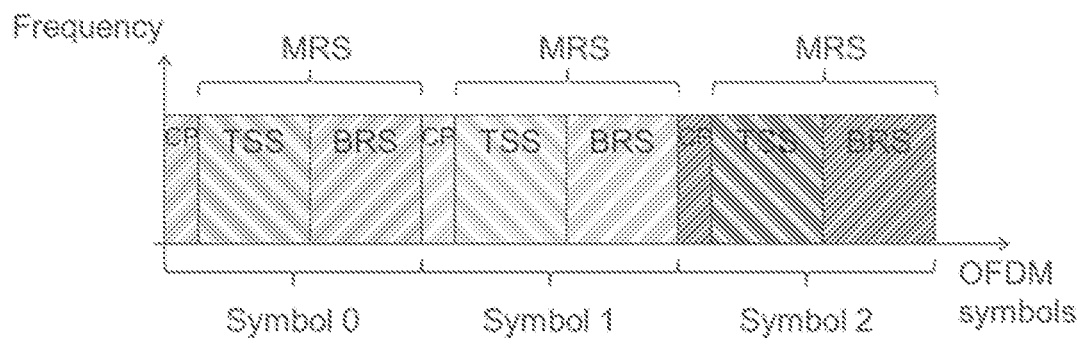
FIG. 7 illustrates an example construction of a mobility and access reference signal (MRS).
Figure 7:
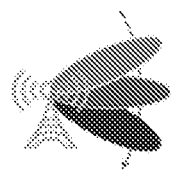

The MRS may be constructed by concatenating a time and frequency synchronization signal (TSS) and a beam reference signal (BRS) in time into one OFDM symbol, as illustrated in FIG. 7. This construction can be done as a DFT-precoded OFDM symbol with cyclic prefix. With both TSS and BRS in the same OFDM symbol, the transmitter can change its beamforming between each OFDM symbol. Compared to having separate OFDM symbols for TSS and BRS, the time required for scanning a set of beam directions is now halved. Both TSS and BRS thus have shorter time durations as compared to separate OFDM symbols for each of them. The cost for these shorter TSS and BRS is reduced energy per signal and thus reduced coverage, which can be compensated by increasing the bandwidth allocation, repeating the signal, or increasing the beamforming gain by more narrow beams. Where mixed numerology is supported, the numerology used for MRS is the same as that one used by the UE for which MRS are scheduled. In the event that multiple UEs within the same beam use different numerologies, MRS cannot be shared and MRS should be transmitted separately for each numerology.

Different beamforming configurations can be used to transmit the MRS in different OFDM symbol, e.g., in each of the three symbols shown in FIG. 7. The same MRS might also be repeated several times in the same beam in order to support analog receiver beamforming. There are only one or few TSS sequences, similar to PSS in LTE. The UE performs matched filtering with the TSS sequence to obtain OFDM symbol timing estimation; TSS should therefore possess good a-periodic auto-correlation properties. This sequence might be signaled by system information such that different AP (Access Points) can use different TSS sequences.

The MRS (as constructed by TSS+BRS) signal package is usable for all active mode mobility-related operations: first-time beam finding, triggered beam mobility update in data transmission and monitoring modes, and continuous mobility beam tracking. It may also be used for the SS design.

The TSS sequence is identical in all OFDM symbols and beam directions transmitted from a base station, while BRS uses different sequences in different OFDM symbols and beam directions. The reason for having identical TSS in all symbols is to reduce the number of TSS which a UE must search in the quite computational complex OFDM symbol synchronization. When the timing is found from TSS, the UE can continue to search within a set of BRS candidates in order to identify the OFDM symbol within a subframe as well as best downlink beam. Best downlink beam can then be reported by USS.

One choice for such sequences is the Zadoff-Chu sequences as used for PSS in LTE release 8. However, these sequences are known to have large false correlation peaks for combined timing and frequency offsets. Another choice is differential coded Golay sequences, which are very robust against frequency errors and have small false correlation peaks.

The beam reference signal (BRS) is characterized by different sequences transmitted in different transmitted beams and OFDM symbols. In this way, a beam identity can be estimated in the UE for reporting to the access node.

An identification of OFDM symbol within the subframe is desirable if the timing difference between SS and active mode transmissions is large. This might occur for numerologies with short OFDM symbols, large distance between the node transmitting system access information and the node in which the UE is supposed to transmit user data (in case these nodes are different), or for unsynchronized networks. This identification can be done if different BRS sequences are used for different OFDM symbols. However, in order to reduce computational complexity, the number of BRS sequences to search for should be low. Depending on the OFDM symbol index uncertainty, a different number of BRS sequences may be considered in the blind detection of the UE.

The BRS can be a dedicated transmission to one UE or the same BRS might be configured for a group of UEs. A channel estimate from TSS can be used in a coherent detection of BRS.

CSI-RS are transmitted in downlink and are primarily intended to be used by UEs to acquire channel state information (CSI) but can also serve other purposes. The CSI-RS may be used for one or more of (at least) the following purposes:

Effective channel estimation at the UE: Frequency selective CSI acquisition at the UE within a downlink beam, e.g., used for Precoder Matrix Indicator (PMI) and rank reporting.

Discovery signal: Reference Signal Receive Power (RSRP)-type measurement on a set of CSI-RS reference signals. Transmitted with a time density according to large scale coherence time of the relevant (downlink) channels.

Beam refinement and tracking: Get statistics about the downlink channel and PMI reporting to support beam refinement and tracking. PMI does not need to be frequency selective. Transmitted with a time density according to large scale coherence time of the relevant (downlink) channels.

For UE transmit beam-forming in uplink assuming reciprocity.

UE beam-scanning for analog receive beam-forming in downlink (similar requirements to 1) or 3) depending on use-case).

To assist fine frequency/time-synchronization for demodulation.

In some cases, not all of the above estimation purposes needs to be handled by CSI-RS. For example, frequency offset estimation can sometimes be handled by downlink-DMRS, beam-discovery is sometimes handled by BRS. Each CSI-RS transmission is scheduled and can be in the same frequency resources as a PDCH downlink-transmission or in frequency resources unrelated to the PDCH downlink-data transmissions. In general, no interdependence between CSI-RS in different transmissions can be assumed, and hence the UE should not do filtering in time. However, a UE can be explicitly or implicitly configured to assume interdependence between CSI-RS, for example, to support time-filtering of CSI-RS measurements (e.g., in 2 above) and also interdependence to other transmissions including PDCCH and PDCH. In general, all UE filtering shall be controlled by the network, including filtering of CSI in time, frequency and over diversity branches. In some transmission formats, CSI-RS is situated in a separate OFDM symbol to better support analog beam-forming both for the base station transmitter (TX) and the UE receiver (RX). For example, to support UE analog beam-scanning (item 5 above) the UE needs multiple CSI-RS transmissions to measure on in order to scan multiple analog-beam candidates.

In LTE, the UE camps in a "cell". Prior to camping, the UE performs a cell selection which is based on measurements. Camping means that the UE tunes to the cell control channels and all the services are provided from a concrete cell and the UE monitors the control channels of a specific cell.

In NR, different nodes may transmit different information. Some nodes may transmit the SSI/AIT table, while others may not transmit SSI and/or AIT, for instance. Similarly, some nodes could transmit the tracking information while others may transmit paging messages. The notion of cell becomes blurry in this context and, therefore, the concept of cell camping is no longer suitable in NR.

The relevant signals the UE may monitor while in a dormant state or mode (e.g., the RRC_CONNECTED DORMANT state discussed above) are one or more of:

SSI

Tracking RAN Area Signal—TRAS

Paging Indication Channel/Paging Message Channel.

NR camping is, therefore, related to the reception of a set of signals. The UE should camp on the "best" SSI, TRAS, and PICH/PMCH. NR camping (re-)selection rules for these signals are used, just as cell (re-)selection rules exist in LTE. However, since the degree of flexibility is higher, these rules may also be slightly more complicated.

Figure 8:
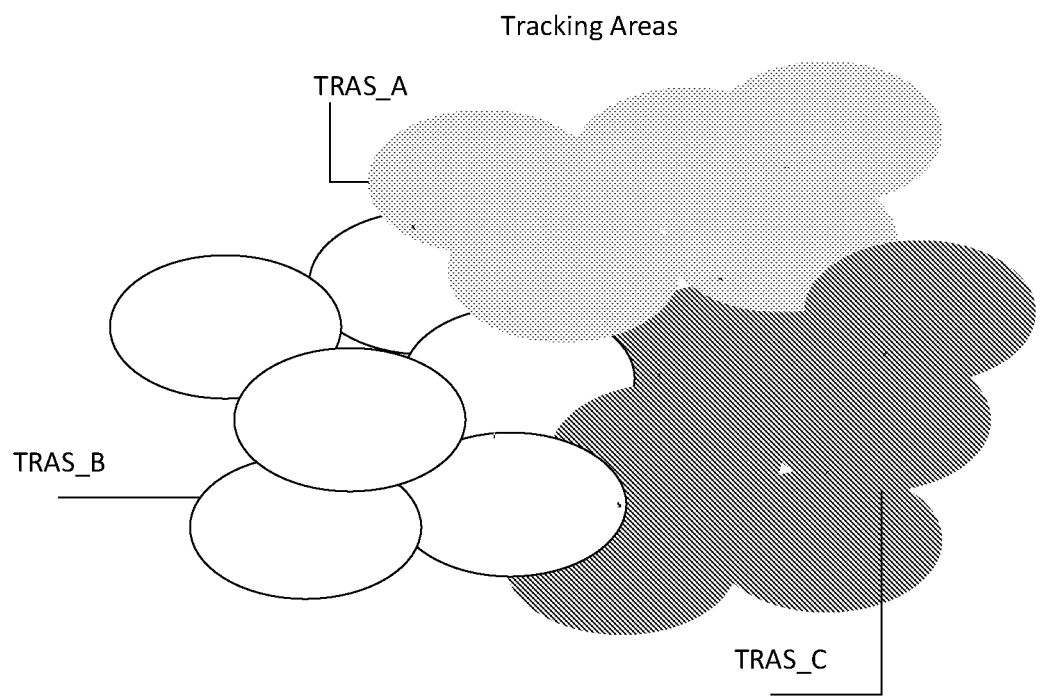
FIG. 8 shows tracking area configuration.

Location information is desirable to assist the network to locate the UE. Solutions to provide location information using the SSI/AIT are possible; however, at the cost of introducing certain constraints. Another solution is to use the SSI block. The SSI block could carry the content or part of the content described in the Tracking RAN Area Signal Index (TRASI). The SSI block is independent of the SSI. Therefore, it could qualify as an option to provide location information. Yet, another solution which provides a higher degree of flexibility is to introduce a new signal to carry such information. This signal is in this context called Tracking RAN Area Signal, TRAS. The area in which this signal is transmitted is called Tracking RAN Area, TRA. A TRA may contain one or more RAN nodes, as depicted in FIG. 8. The TRAS may be transmitted by all or a limited set of nodes within the TRA. This also means that this signal and its configuration should preferably be common for all the nodes transmitting the TRAS within the given TRA, e.g., in terms of (at least) roughly synchronized transmissions, to facilitate the procedures for the UE and aid it to reduce its energy consumption.

The Tracking RAN Area Signal (TRAS) comprises two components, a Tracking RAN Area Signal Synchronization (TRASS) and a Tracking RAN Area Signal Index (TRASI).

In dormant mode, prior to each instance of reading the TRA info, the UEs are typically in a low-power DRX state and exhibit a considerable timing and frequency uncertainty. The TRA signal should therefore also be associated with a sync field that allows the UE to obtain timing and frequency synchronization for subsequent payload reception. To avoid duplicating synchronization support overhead in yet another signal, TRASI reception can use SSI for the purposes of synchronization in deployments where SSI and TRAS are transmitted from same nodes and are configured with a suitable period. In other deployments where the SSI is not available for sync prior to reading TRASI, a separate sync signal (TRASS) is introduced for that purpose.

The SSI design has been optimized to provide UE synchronization. Since the synch requirements for TRA detection, not least the link quality operating point for the UE and the required ability to read the downlink payload information, are similar, we reuse the SS physical channel design and reserve one, or a small number, of the PSS+SSS sequence combinations to be used as the TRA sync signal. The SS detection procedure at the UE may be reused for TRA synchronization. Since TRASS constitutes a single predetermined sequence, or a small number of them, the UE search complexity is reduced.

Information about whether TRASS is configured by the network may be signaled to the UE, or the UE may detect it blindly.

The tracking area index is broadcasted. At least two components have been identified to be included in the Tracking RAN Area Signal Index (TRASI) payload:
  Tracking RAN Area code. In LTE, a Tracking Area code has 16 bits. The same space range may be used for NR.
  Timing information. As an example, a System Frame Number (SFN) length of 16 bits may be used, which would allow a 10 minutes DRX, given a radio frame length of 10 ms.

The payload is thus estimated as 20-40 bits. Since this number of bits is impractical to encode into individual signature sequences, the TRA information is transmitted as coded information payload (TRASI) with associated reference symbols (TRASS) to be used as phase reference.

The TRASI payload is transmitted using the downlink physical channel structure:
  Alternative 1 [preferred]: Use PDCCH (persistent scheduling). The UE is configured with a set of 1 or more PDCCH resources to monitor
  Alternative 2: Use PDCH (persistent scheduling). The UE is configured with a set of 1 or more PDCH resources to monitor
  Alternative 3: Use PDCCH+PDCH (standard shared channel access). The UE is configured with a set of 1 or more Paging Control Channel (PCCH) resources to monitor, which in turn contain a pointer to PDCH with the TRA info The choice between PDCCH and PDCH should be based on whether reserving resources in one or the other channel imposes fewer scheduling limitations for other signals. (For nomenclature purposes, the used PDCCH/PDCH resources may be renamed as TRASI physical or logical channel.

TRASI encoding includes a Cyclic Redundancy Check (CRC) to reliably detect the correct decoding at the UE.

The UE uses its standard SSI search/sync procedure to obtain sync for TRASI reception. The following sequence may be used to minimize the UE energy consumption:
  First look for TRASS
  If TRASS not found, look for most recent SSI
  If same SSI not found, continue to full SSI search
  In some UE implementations, the receiver wake-up time, i.e., the periods of time in which all or substantial parts of the receiver circuitry are activated, is the dominant energy consumption factor, in which case full search may always be performed.

If no TRASS is present but several SSIs are audible, the UE attempts TRASI reception at all found SSI and/or TRASS timings, one of which succeeds. All SSIs are detected and corresponding TRASI detection is attempted during the same awake period, so no receiver overhead is introduced.

If a relatively loose sync with a known tolerance within a TRA is provided, a UE searches for TRAS-related time sync in the relevant vicinity of the current timing, plus the worst-case timing drift during the DRX. The UE RX waking time thus increases proportionally with increased timing tolerance.

TRA configuration should be identical within the TRA. This means that all the nodes which transmit the TRAS should use the same configuration. The reason behind this is due to the DRX configuration. A UE in dormant mode, such as the RRC_CONNECTED DORMANT state discussed above, wakes up for a certain period of time. In that period of time, the UE is expected to monitor and perform measurements as configured by the network (or as mandated by the standard).

TRA configuration is conveyed via dedicated signaling. AIT is not the most suitable option to convey this information. The TRA configuration could be transmitted to the UE, for example, when the network commands the UE to move from an active Mode, such as RRC_CONNECTED ACTIVE state to a dormant mode, such as RRC_CONNECTED DORMANT state, or when the network transmits a TRA Update Response to the UE. TRA Update Response—could also carry paging information (see FIG. 9). This could be especially useful to minimize paging delays in situations when the network is trying to locate a UE in TRA which the UE has already exited. To be able to support this type of functionality, the UE may need to add in the TRA Update some type of ID or other information to assist the new TRA or node to identify previous TRAs or nodes which could contain the UE context, paging messages or user data.

Figure 9:
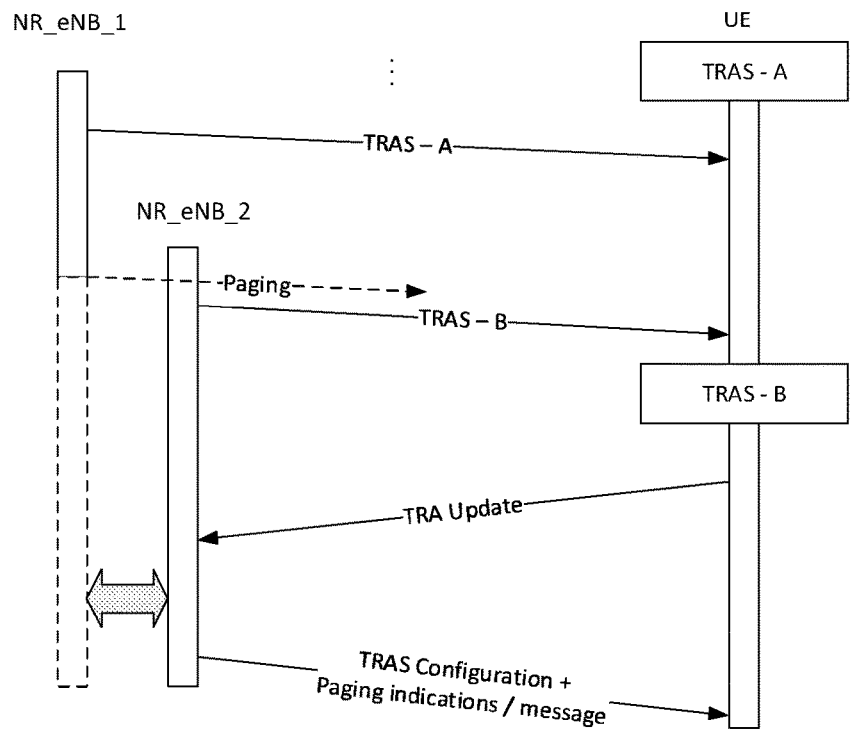
FIG. 9 is a signal flow diagram illustrating a Tracking RAN Area (TRA) update procedure.

In FIG. 9, which illustrates a TRA update procedure, a UE moves from a TRA_A to a TRA_B which is not configured in its TRA list. When the UE has exited the TRA_A, but not registered yet in TRA_B, the network starts sending paging indications over a certain node or set of nodes in TRA_A. The UE does not respond since it has exited the TRA_A and may not monitor the TRAS_A any longer. When the UE performs a TRA Update, the network provides the new TRA list and configuration, and may further include any paging indications which the UE could have been missed.

The less synchronized the network is, the higher the UE battery impact is. Keeping a tight synchronization across TRAs is therefore important but also challenging, especially in deployments with poor backhaul.

A few options are listed below:
All TRAs are loosely synchronized.
No synchronization across TRASs.
Sliding synchronization across neighbour nodes.
Loosely synchronized within the TRA & not synchronization among TRASs.

Figure 10:
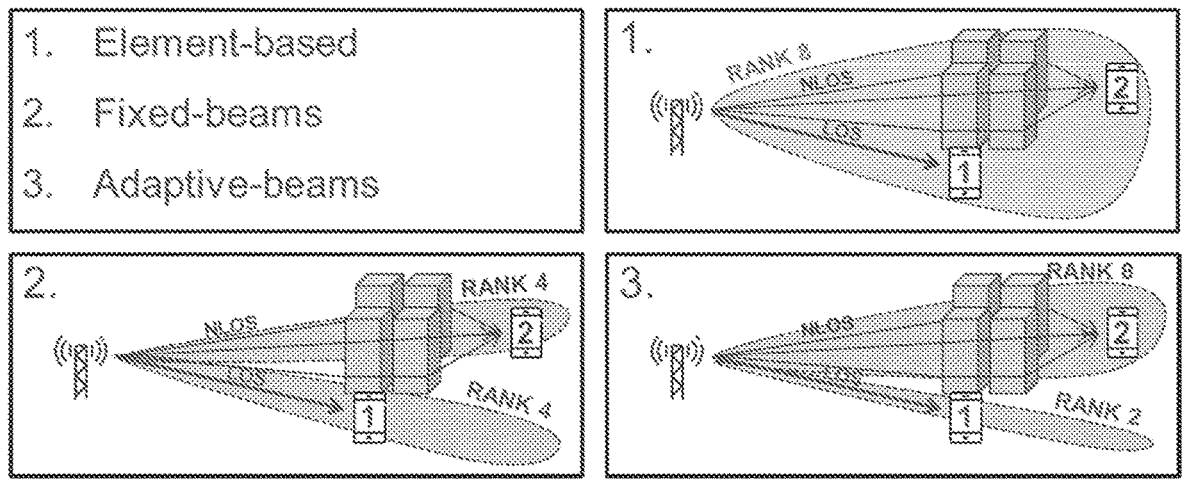
FIG. 10 shows options for beam shapes.

FIG. 10 illustrates options of beam shapes for feedback-based solutions in NR.

Transmitting in a beam implies that there is a directional, possibly narrow, propagating stream of energy. The notion of a beam is thus closely related to the spatial characteristics of the transmission. To ease the discussion, the beam concept is first explained. In particular, the notion of a high-rank beam is described.

Here, a beam is defined as a set of beam weight vectors, where each beam weight vector has a separate antenna port, and all the antenna ports have similar average spatial characteristics. All antenna ports of a beam thus cover the same geographical area. Note, however, that the fast fading characteristics of different antenna ports may be different. One antenna port is then mapped to one or several antenna elements, using a possibly dynamic mapping. The number of antenna ports of a beam is the rank of the beam.

To illustrate the beam definition, take the most common example of a rank-2 beam. Such a beam is realized using an antenna with cross-polarized elements, where all antenna elements with one polarization are combined using one beam weight vector, and all antenna elements with the other polarization are combined using the same beam weight vector. Each beam weight vector has one antenna port, and since the same beam weight vector is used for the two antenna ports, the two beam weight vectors together constitute one rank-2 beam. This can then be extended to beams of higher rank.

Note that high-rank beams may not work for the UE. Due to the irregular antenna element layout, the rich scattering at the UE and the fact that the UE antenna elements may have different characteristics, it is very challenging to construct several beam weight vectors with similar spatial characteristics. Note that this does not preclude spatial multiplexing in the uplink: this can be achieved using several rank-1 beams.

It is very important to note that the beam shapes can be quite flexible. Hence, "beam-based transmission" is not the same as "fixed-beam transmission", although using a fixed grid of beams may be a suitable implementation in many cases. The working assumption is that each beam has between 1 and 8 ports, and each beam is associated with a CSI-RS with a rank ranging from 1 to 8.

From UE's point of view, no major difference to element-based feedback is foreseen other than the CSI-RS configuration; namely, that for beam-based transmission, the CSI-RS allocations need to be more flexible. Even though the configuration is flexible this does not preclude that the UE may do filtering and interpolation, but this is under strict network control.

In beam-based transmission, communication occurs through beams, where the number of beams may be much smaller than the number of antenna elements. Since the beams are still adjustable, the antenna system as a whole retains all its degrees of freedom. However, a single UE is not capable of supporting all these of freedom using instantaneous feedback. Note that this is in contrast to element-based transmission, where the UE sees all the degrees of freedom of the antenna, and is capable of reporting based on this knowledge.

From the network's point of view, multiple simultaneous beams can be generated, either using analog beamforming or digital domain processing. It is assumed that as long as the formed beams are of similar width as the angular spread of the channel, the overhead to maintain the UE beam associations are reasonable: the best beam for any single UE does not then vary with the fast fading. When the beam is narrower than the angular spread of the channel, the best beam for any single UE varies over time, leading to that the best beam association needs to be frequently updated. In some cases, the antenna patterns are fixed; see FIG. 10, option 2. In some cases, the beams are adapted to the UEs channel characteristics; see FIG. 10, option 3, where user 2 with a rich channel receives data through a wide high-rank beam and the line-of-sight user 1 a narrow rank-2 beam.

Beam-based transmission is applicable in both FDD and TDD, for any frequency band, and antenna size.

Beam-based uplink reception implies that the baseband does not have individual access to all antenna elements. In this case, some sort of spatial preprocessing or preliminary beamforming may be applied. This preprocessing can be performed in the analog domain, in the digital domain, or in a hybrid of the two. In general, the spatial preprocessing can be quite flexible. It needs to be time-varying to adapt the coverage area of the antenna to where the users are.

Both phase and amplitude tapering can be considered.

In the downlink, the individual antenna elements are never exposed to the UE. The UE only sees a number of linear combinations of the signals transmitted from different antenna elements. The number of linear combinations that is exposed is determined by the rank of the transmission. Data is received at the UE through such a linear combination (the beam) and downlink quality is measured and reported per beam.

One possible scenario is that the UE is equipped with multiple arrays, each array consisting of a (small) number of elements. The different arrays cover different spatial directions. The array can be configured to have different angular coverage (pointing direction and beam width).

The UE transmits reference signals (RSs) through a number of beams, either sequentially or simultaneously. Sequential transmission can be used also with analog TX beamforming, and the detection at the eNB is easier. On the other hand, if RSs are transmitted over several beams in parallel, more beams can be probed in a shorter time. The RS is probably Reciprocity Refernce Signal (RRS), as different RSs should be transmitted through different beams, so that the eNB can identify each transmission. The shape of each beam is decided by the UE, but the number of beams is between the UE and the eNB. The eNB measures the quality of each received RS, and determines the most suitable UE transmit beam. The decision is then sent to the UE over dPDCH, together with a channel quality information (CQI) value and a scheduling grant.

As mentioned above, it may not be possible to form a high-rank beam at the UE. To enable uplink multiple-input multiple-output (MIMO), several rank-1 beams may be used.

At the eNB, beam-based transmission typically means that the number of elements seen by the baseband is much lower than the number of elements used to form the beams. This implies that the (angular) coverage of simultaneous individual beams is less than by the elements.

At the UE, beam-based transmission for feedback purposes may be used to improve link budget for RSs but perhaps not to reduce the angular coverage, such that the number of beams may still be equal to the number of elements.

For an ongoing transmission, there is a possibility to reduce the angular coverage, as is done on the eNB side, but this may imply that, after some time, the channel is not fully utilized. To prevent this, sounding, with wide or possibly full angular coverage, is required.

For NR, the active mobility management solution described above is configured to manage mobility between beams, as opposed to the traditional cell mobility in Long-Term Evolution (LTE). Beam-oriented transmission and mobility introduce numerous features that differ from LTE cell mobility. Using large planar antenna arrays at access nodes, with the number of elements in the hundreds, fairly regular grid-of-beams coverage patterns with hundreds of candidate beams per node may be created. The beam widths of the individual beams in elevation and azimuth are determined by the number of element rows and columns in the array.

As illustrated in simulation studies, the coverage area of an individual beam from a large planar array may be small, down to the order of some tens of meters in width. Channel quality degradation outside the current serving beam area is rapid, which may necessitate frequent beam switching to reap the full potential of the antenna array with low overhead. Static mobility signals in all beams are not feasible, so MRS need to be turned on only in relevant beams and only when needed. The relevant beams are selected based on the UE position and prior beam coverage statistics for the different candidate beams, based on a self-organizing network (SON) database. The SON data may also be used to trigger mobility measurement sessions when the serving beam quality degrades, without the need for continuous neighbour beam quality comparisons.

Evaluations indicate also that sudden beam loss is possible due to shadow fading, e.g., when turning a street corner. The active mode mobility (AMM) solution includes features that assist in avoiding or rapidly recovering from a sudden link quality reduction or out-of-synch condition.

The AMM solution includes both lower-layer procedures (mobility trigger, measurements, beam selection, RS design, and robustness) and RRC topics (beam identity management, inter-node handover, and other higher-layer aspects). The AMM solution supports both beam switches within one node and between different nodes using primarily measurements on MRS. Note that the procedures described in this section can be used to change beams within one node using measurements on CSI-RS. Or to be more precise: beam-switches using CSI-RS can be used for cases when the data plane does not have to be re-routed, and no resynchronization needs to be done. On these cases, the CSI-RS-based procedure is much leaner, and is also completely transparent to the UE.

Furthermore, the AMM solution distinguishes between link beams and mobility beams. Link beams are the beams used for data transmission, whereas mobility beams are used for mobility purposes.

The NR system should provide seamless service experience to users that are moving, and is designed to support seamless mobility with minimal use of resources. As mentioned above, there is a dormant mode (referred to above as RRC_CONNECTED DORMANT state) and an active mode (referred to above as RRC_CONNECTED ACTIVE state) in NR, which means that the mobility includes the dormant mode mobility and active mode mobility. The mobility in dormant mode (location update and paging) is discussed in detail below. In this section, only the intra-NR active mode mobility is treated. A description of reference signals used for mobility procedures was presented above.

There are some specific needs that the mobility solution should preferably fulfill, which include one or more of:

- The mobility solutions shall support movement between beams without any packet loss. (In LTE, packet forwarding is used—some temporary extra delay is OK but loss of packets is not.)
- The mobility solution shall support multi-connectivity, where coordination features usable for nodes connected both via excellent backhaul (e.g., dedicated fiber) as well as via relaxed backhaul (e.g., latency of 10 ms and above, wired, wireless).
- The mobility solutions should work for both analog beamforming and digital beamforming.
- Mobility and UE measurements shall work for both synchronized and unsynchronized access nodes.
- The mobility solutions shall support radio link failure detection and recovery actions by the UE. The mobility solutions shall support movement between NR and all existing RATs with a tighter integration between NR and LTE with short inter-RAT handover interruption time.

Desirable design principles for active mode mobility include one or more of:

- A mobility framework built of configurable functions shall be used.
- Mobility solutions shall have the flexibility that the downlink and uplink mobility can be triggered and executed independent to each other.
- For active mode, mobility solutions shall be network controlled as a general rule, network configured UE control can be used to the extent there are proven large gains.
- Mobility-related signalling shall follow the ultra-lean principle. Preferably it shall occur on-demand, to minimize measurement signal transmission. The signaling overhead and measurement overhead related to mobility should be minimized.
- The mobility solutions shall always maintain a good-enough link between the terminal and the network (which is different from "always be on the best").
- The mobility solutions should work independently of the "transmission modes".

Multi-antenna transmission already plays an important role for current generations of mobile communication and takes on further importance in NR to provide high data rate coverage. The challenges facing active mode mobility in NR are related to supporting the high-gain beam forming. When the link beams are relatively narrow, the mobility beams should be tracking UEs with high accuracy to maintain good user experience and avoid link failure.

The downlink mobility concept of NR is beam-based. In deployments with large antenna arrays and many possible candidate beam configurations, all beams cannot transmit reference and measurement signals in an always-on, static manner. Instead, the connected access nodes select a relevant set of mobility beams to transmit when required. Each mobility beam carries a unique Mobility Reference signal (MRS). The UE is then instructed to measure on each MRS and report to the system. From a UE point of view, this procedure is independent of on how many access nodes are involved. As a consequence, the UE does not have to care about which access node is transmitting which beams; sometimes this is referred to as the UE being node-agnostic and the mobility being UE-centric. For mobility to work efficiently, the involved access nodes need to maintain beam neighbour lists, exchange beam information, and coordinate MRS usage.

Tracking a moving UE is achieved by the UE measuring and reporting relevant candidate beams' quality, whereby the system can select beams for data transmission based on the measurements and proprietary criteria. The term beam switching is, in this context, used to describe the event when the access nodes update the parameters, e.g., transmission point and direction of the beam. Thus, both intra- and inter-access node beam hand-overs can be seen as a beam switches. As a consequence, hand-over in NR is executed between beams rather than cells as in traditional cellular systems.

The beam type discussed in this section is mainly the mobility beam, which is the entity to update during mobility. Besides the mobility beam, there is also a 'geo-fence' beam which is introduced to ease inter-node mobility in some deployments.

The following sections describes downlink mobility: choosing which beam/node to use for downlink transmission. One section describes downlink measurement-based mobility and one section describes uplink measurement-based. So far, it is assumed that the same beam/node is used for uplink communication. However, in some cases, it can be advantageous to use different beams/nodes for downlink and uplink communication. This is called uplink/downlink decoupling. In that case, a separate procedure may be used to select the best uplink beam/node. Uplink measurements are used to select the uplink beam/node, and the procedures described above are used with minimum changes.

Figure 11:
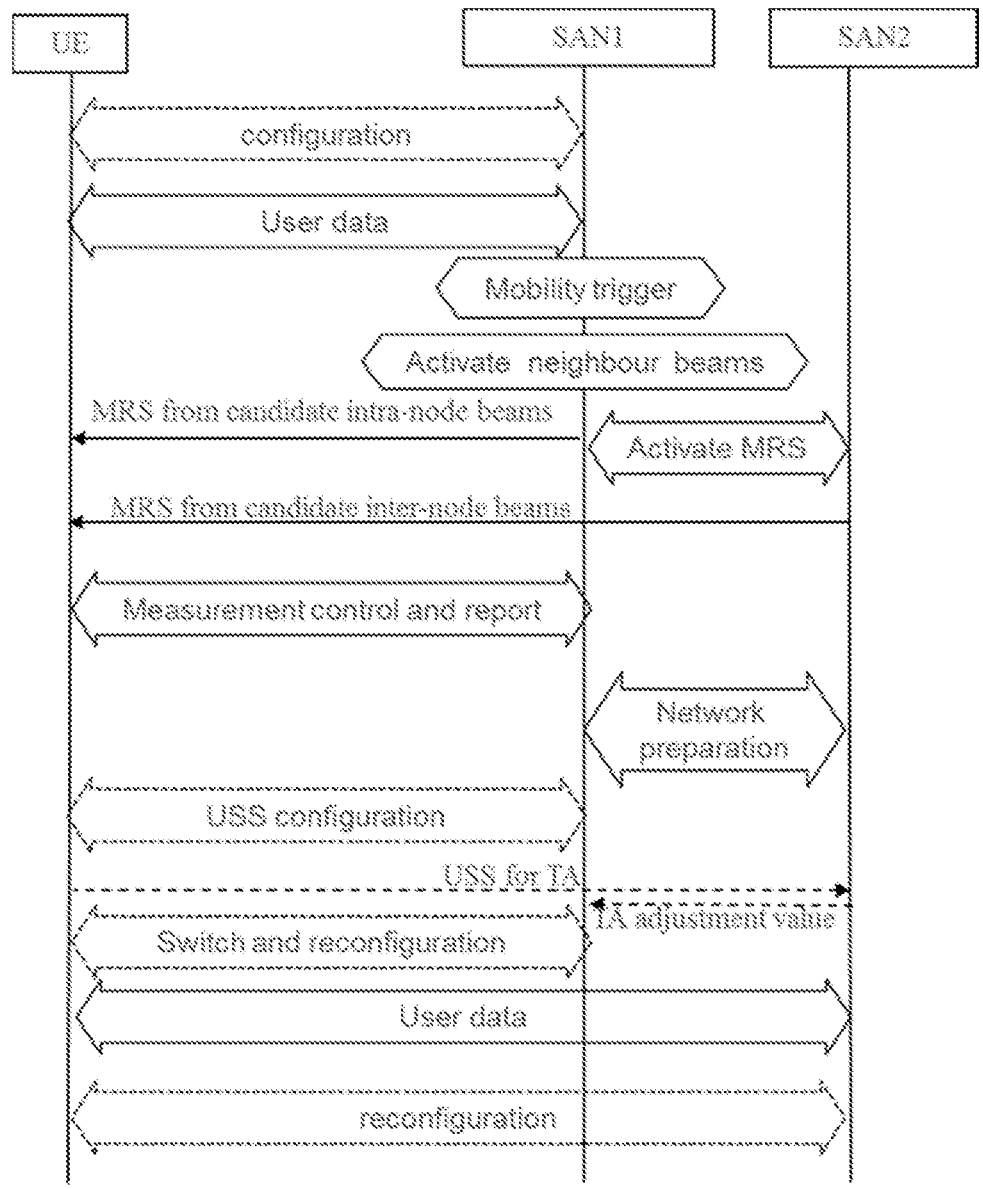
FIG. 11 is a signaling flow diagram illustrating an active-mode mobility procedure.

Several detailed studies of mobility solution options have been carried out, and all these formulations follow a common mobility framework, which can be summarized at a high level as in FIG. 11, which illustrates a generic active mode mobility (downlink measurement based) procedure. After it is decided to trigger a beam switch, a set of candidate beams are selected for activation and measurement. These beams may originate both in the serving access node and in potential target access nodes. Measurements are based on Mobility Reference Signal (MRS) transmissions in mobility beams. The network decides the target beam after UE reports the result of the measurements to the network and optionally informs the UE of the selected target beam. (Alternatively, the UE may have been proactively configured to autonomously select the candidate beam with the best measurement result, and subsequently transmit the measurement report to the target beam.) The procedure includes one or more of:

UE side:
  Measurement configuration. UE receives the mobility configuration from network about which MRSs to measure (or the UE could also do a full blind search without a configured list), when to measure, how to measure, and how to report. The measurement configuration can be performed earlier (and continuously updated.)
  Measurement. UE performs mobility measurements after UE receives measurement activation which is instructed to start measuring on some or all of the entries in the measurement configuration.
  Measurement report. UE sends mobility measurement reports to the network
  Mobility execution.
    UE may receive a request to transmit USS in the uplink for timing advance (TA) measurement and send the USS. The requirement to send USS can be part of measurement configuration.
    UE may receive a command (reconfiguration) to perform beam switch, which may include a new beam ID and a TA adjust command. The switch command can also be first informed, and TA can be measured and adjusted in target node.
    Or, if the downlink sync and uplink TA remain valid, and the additional configuration (new DMRS, security, etc.) is not required or can be informed via target node, the UE may not receive a switch command.
Network side:
  Measurement configuration. Network sends mobility measurement configuration to UE.
  Mobility trigger. Network determines whether to trigger beam switching procedure.
  Mobility measurement. Network decides to execute mobility measurement procedure which includes:
    Neighbour selection: Network selects candidate beams.
    Measurement configuration. Network sends measurement configuration to UE if it is not configured in step 1.
    Measurement activation. Network activates MRS in relevant beams and sends a measurement activation command to UE.
    Measurement report. Network receives measurement report from UE.
  Mobility execution.
    Network may send a USS request command (reconfiguration) to UE to transmit USS for TA measurement.
    The target node may measure the TA value and send the value to the node communicating with the UE who will send TA configuration to the UE.
    Network may send beam switching (reconfiguration) command to UE.
  Network can send measurement configuration to UE either before triggering beam switching procedure (step 1) or after (during step 3).

The outlined sequence is configurable with suitable settings to serve as a common framework for all active mode mobility-related operations: first-time beam finding, triggered beam mobility update in data transmission and monitoring modes, and continuous mobility beam tracking.

A configuration of the generic downlink active mode mobility procedure where the UE moves from Serving Access Node 1 (SAN1) to SAN2, as shown in FIG. 11, is described in the following section The network may send a mobility measurement configuration to the UE. This configuration is transmitted in an RRC message and may contain information related to measurement events—"what" (e.g., which MRS indices) to measure, "when" and "how" to measure (e.g., start time or criterion and filtering duration), or "when" and "how" to send a measurement report (e.g., report time slot, report best beam IDs or also their powers, etc.). The list may be useful if only a small number of MRS are turned on and can be measured on. But sending the list can be optional for the Network, NW, and UE can perform measurements blindly, e.g., detecting all audible MRS signals. Another example of configurability could be inter-node measurements where longer filtering may be required to avoid ping-pong effects. For intra-node beam measurements, a short filter is used.

A measurement configuration may be sent by the network at any time. Typically, once the UE receives the configuration, it starts performing measurements. However, this procedure could be further enhanced by transmitting an activation command in the downlink control information (DCI) field. Thus, the RRC message would only configure the measurement but may not necessary initiate the UE to start performing such measurements.

The UE sends measurement reports based on the configuration provided by the network. Measurement reports are typically RRC messages sent to the network. However, in certain cases, some type of reports could be sent over MAC. For the Layer 3 based report, different number of beams can be reported concurrently, allowing to find the preferred beam in a short time, however it requires more signaling overhead, and it is not easy to integrate beam switching with the scheduler. For Layer 2 based reporting, there is less overhead, and it is easy to integrate with scheduler, however, a fixed maximum number of beam measurements can be concurrently reported.

The MRS transmission and measurements are triggered based on the observed link beam/node quality when data transmission is ongoing, mobility beam quality in the absence of data, or reports sent by the UE. Other triggers such as load balancing may also trigger mobility measurement execution.

There are different trigger metrics and different conditions. The metric to reflect beam quality is either RSRP or SINR. The condition can be one or more of:
  a1) comparison to one absolute value
  a2) comparison to multiple different relative values to a reference table according to position
  a3) comparison to values of other beams, or
  a4) degradation rate of the link beam quality. Practical trigger mechanisms that react to changes in the current quality metric have also been demonstrated.

The observed beam can be one or more of the:
  b1) current serving link beam (DMRS or CSI-RS),
  b2) current serving link beam plus its 'sector' beam,
  b3) current serving mobility beam (MRS).

The different types of switching (e.g., intra-node or inter-node) may have different thresholds. For example, when link quality is worse than threshold 1, intra-node beam switch is triggered. When link quality is worse than threshold 2, inter-node beam evaluation and switching is triggered. If excellent backhaul (e.g., dedicated fiber) is present and there is no problem with ping-pong effects, both intra-node and inter-node can use the same parameters.

When the network decides that a serving beam/node identity need to be changed/updated/modified, the network prepares the mobility procedure. This may imply some communication with other nodes in the network.

There are several options for reporting the MRS measurement results to the network:
  c1) If the UE reports all measurements to the serving node, the serving node determines the node to switch to and signals to the UE. This approach relies on the existing serving link for all signaling during the mobility procedure. TA towards the new serving beam is estimated in conjunction with the switch command.
  c2) If the UE reports the measurements back to the individual nodes where the different MRS came from, the reporting itself requires a previous USS transmission and TA estimation—it is then seen as part of the measurement procedure. Once the Network has decided the new serving node and signaled to the UE, the UE uses the already available TA towards the new serving node. This approach requires more uplink signaling, but removes the critical dependence on the old serving link once the measurement command has been issued.
  c3) Similar to c2), but the UE reports all the measurements back via the serving beam and via the best of the measured new beams. Then, only one TA estimation procedure should be conducted.

Eventually, the network may request the UE to apply a new configuration. There may be situations in which a reconfiguration could be transparent for the UE, e.g., in an intra-node beam switch. The reconfiguration then happens on the network side, a serving beam/node may be changed; however, the UE keeps the existing configuration. If a reconfiguration is needed, it can be configured before or after the switch.

In general, the MRS is only transmitted based on demand. The network decides which candidate beams, or neighbour beams, should be activated. Candidate beam selection can be based on, e.g., a beam relations lookup table. This neighbourhood lookup table is indexed by either UE position or radio fingerprint. The position can be the accurate position (e.g., Global Positioning System (GPS) info) or an approximate position (current serving beam info). Creating and maintaining the neighbourhood lookup tables is a generalization of the automatic neighbour relations (ANR) management process, handled by the SON functionality in the network. The tables can be used both for providing trigger criteria to initiate a measurement session towards a given UE and for determining the relevant candidate beams for measurements and a possible beam switch. The beam in this lookup table can be either a normal mobility beam or a 'sector' beam. The neighbour beam relationship table size can be reduced; both from the memory consumption and from the signaling consumption perspective, if the candidate beams are wide and the number of beams is lower. In some network deployments, e.g., deploying NR in LTE frequency bands or in a high load and frequent handover area, it may be preferable to configure the MRS to be always-on, so that potentially many UEs that are covered by the same mobility beams can continuously track the quality of neighbour beams.

To report MRS measurements to nodes other than the serving node, and to resume uplink data transmission towards a new serving node, the UE needs to apply correct timing advance, which typically differs from the TA for the current serving node. In a non-synched Network, the TA estimation always needs to be performed. USS transmission is then configured per-measurement in the MRS measurement command or statically by RRC. The same applies in synched macro NWs, where the ISD, Inter Site Distance, exceeds or is comparable to the CP length.

In a tightly synched Network with short ISDs (Inter Site Distances), on the other hand, the TA towards the old serving node may also work well for a new serving node. The UE can deduce whether that is the case from whether the old downlink timing sync works for the new node. It would be efficient not to do new TA estimation unless really necessary.

The network-controlled approach is that the network configures the UE to transmit the USS (or not) on a per-measurement basis in the MRS measurement command. TA is not estimated if the network estimates that the old and new nodes can share the same TA value, otherwise the UE is requested to send USS. Alternatively, in a UE-controlled approach, the UE can omit sending USS in the uplink if it determines that no re-sync was necessary to measure the new node's MRS. Here, the node still needs to reserve resources for USS reception.

If the TA is to be changed, this is conveyed using dPDCH or PCCH either over the old serving beam or from the new node (where the downlink is already "operational" since the UE has synched to the MRS).

In MRS reporting solution c1 above, the USS may be sent in the uplink and TA update in the downlink may be sent as part of the beam switch command and handshake.

In MRS reporting solutions c2 and c3 above, the UE sends the USS as part of the measurement report procedure towards an MRS-transmitting node, and receives a TA update as a separate message.

In some deployments, where the UE position may be determined with high accuracy, the required TA correction when switching from old serving beam to a new one may be retrieved from a previously collected database. The database is created based on previous TA measurements managed according to SON principles.

The mobility measurement sequences are essentially the same as in LTE. The mobility monitoring and triggering sequences are similar to those in LTE, but some details differ, e.g., the criteria of launching and the UE-specific signals available for mobility measurements. The MRS activation sequence where reference signals (MRS) are activated dynamically in a UE-specific candidate beam set is a new procedure in NR. Activating and deactivating MRS on request, and in a UE specific manner is critical for lean design. The main new challenge in NR is for the network to decide which candidate MRSs are activated, and when. The latter aspect may be especially critical at high frequencies due to shadow fading. Some preparations and signaling may be needed in the network when candidate beams are activated in several different nodes. Nevertheless, this procedure is transparent to the UE. The UE is only informed about the measurement configuration and the UE reports accordingly, without having associated the beams with specific nodes. The TA update sequences can also be measured and adjusted in target node after the switch command is first informed. Also, the additional reconfiguration is probably required.

The beam switch triggering procedure differs depending on how MRS is designed and transmitted. More specifically there are three typical cases:

The beam MRS is only activated when serving beam quality degradation is detected. MRS for all relevant candidate beams in the lookup table are activated, no matter if the beam is from the same node or from a neighbouring node. The table building can be part of the SON functions. The UE measures on all the MRSs and sends the measurement report.

Either all the sector MRSs in the lookup table or the sector MRS containing the serving beam for the active UE is configured and transmitted periodically. UE can also keep track of the quality of the transmitted sector MRS and report the quality periodically or in an event-based manner.

The serving mobility beam is adapted to continuously track the UE to maintain the maximum beam gain, which is similar to the CSI-RS procedures. The UE reports an error signal between the current serving beam direction and the estimated best beam direction, using additional beams in the neighbourhood of the serving beam.

Case 1 is more suitable for services without strict QoS requirements, while case 2 is more suitable for time critical service with additional overhead. (There are also hybrid options, e.g., activating all the MRSs in the lookup table for a given UE, with additional overhead.) In case 3, with UE specific reference symbols, any modification of beam shape within one node can be transparent to the UE—no signaling is required, unless RX analog beamforming is applied in the UE side.

It is also possible to use uplink measurements to select downlink beam. On a high level, it can be assumed that such measurements are performed on demand, when a beam switch is deemed necessary. Hence, the concept of a mobility event still applies, and some sort of trigger to start the event is relied upon.

Since the downlink beam is being updated, it is natural to still monitor the downlink performance, using any of the measurements described in the previous section. For instance, CQI measured on CSI-RS or MRS may be monitored.

Using uplink measurements to choose the access node used for downlink transmission usually works well, providing that different access nodes use the same transmit power and have the same antenna capabilities. Otherwise, this has to be compensated for.

To use uplink measurements to select downlink beam within one node, reciprocity between uplink and downlink is desirable. Passive antenna components and the propagation medium are physically reciprocal for TX and RX, but active components and radio-frequency (RF) filters in the RX and TX paths typically exhibit asymmetries and phase variations that do not yield automatic reciprocity in all cases. However, by introducing additional hardware design constraints and calibration procedures, any desirable degree of reciprocity may be provided.

To obtain the uplink measurement, the network requests the UE to send uplink reference signals to the network. One possible reference signal for mobility measurements is the USS. The USS can be detected not only by the serving node, but also by the neighbour nodes. The neighbour nodes should hold transmissions of UEs that they are serving, to clear the transmission resources where the USS will occur.

If the coverage situation is challenging, the UEs may need to use TX beamforming to transmit the USS. In this case, the UE is required to transmit the USS in all candidate directions, and different USS identities may be allocated to different uplink TX beams in the UE side so that the network can feed back the best UE TX beam identities. If the UE cannot transmit in more than one direction simultaneously, the beams transmissions may be time-multiplexed. The USS can be transmitted from the UE periodically or be event triggered (when the quality of the link beams degrades). Such beam sweep configuration is more complicated in the uplink than in the downlink, due to the irregular UE antenna array layout. Suitable sweep patterns may be determined in several ways using prior calibration or on-the-fly learning by the UE.

In the network, the candidate access node attempts to detect the USS in different beams, and selects the best beam. If analog beam forming is used by the network, the nodes cannot perform the measurement of a large number of beams in one USS period. The access node can scan the USS using different RX beams sequentially. Coordination of UE TX and access node RX beam sweep patterns is complicated. Relying on this combination should only be considered if really mandated by the coverage requirements.

There are some requirements on signaling between UE and network, which include, e.g., the number of USS used in UE and the repetition period for network scanning. It may be assumed that the same procedure is adopted as for MRS configuration: configure USS transmission parameters using RRC, and activate transmission using MAC.

There are several alternatives to perform downlink beam switching based on the uplink measurement:
  The narrow (link) beam can be selected directly based on the uplink measurement.
  The beam selection based on the uplink measurement decides the mobility beam, and the narrow (link) beam can be selected based on the complemented downlink measurement later.
  The mobility beam is first decided by the uplink measurement with a wider RX beam. After that, the narrow (link) beam can be further decided by uplink measurements with narrow RX beam. When deciding the narrow beam, the other RS might be measured in the narrow beams that are located within, or in the vicinity of, the selected RX beams in first part.

Figure 12:
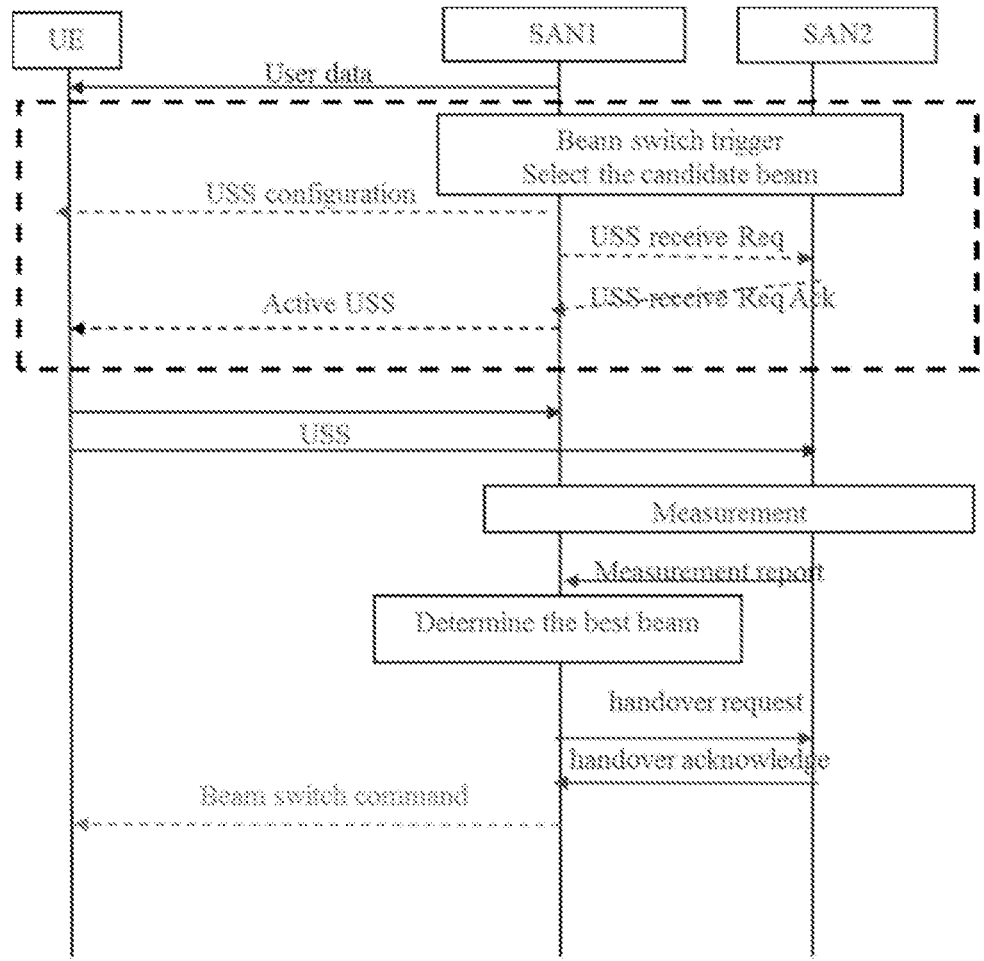
FIG. 12 is a signaling flow diagram illustrating beam selection based on uplink measurement.

In the three beam-switching alternatives listed immediately above, the beam-selection procedures (beam selection in the first alternative; wide beam selection in the second and third alternatives) are similar/ An example beam-selection procedure is illustrated in FIG. 12. The procedure of the beam selection based on the uplink measurement can briefly be expressed as follows:
  Trigger beam switch
  Activate USS reception between neighbour nodes in relevant beams
  Activate USS transmission in UE
  Perform USS measurement in network
  Determine the best beam based on the measurement report
  Prepare beam switch if needed
  Issue beam switch command if needed As said previously, the USS can be transmitted from the UE periodically, or in an event-triggered manner. If the USS is transmitted periodically according to the early configuration, steps 1-3 can be ignored. If a timing advance update is needed, the TA value can be obtained from the USS measurement and the new TA value can be informed to UE during beam switch command.

Figure 13:
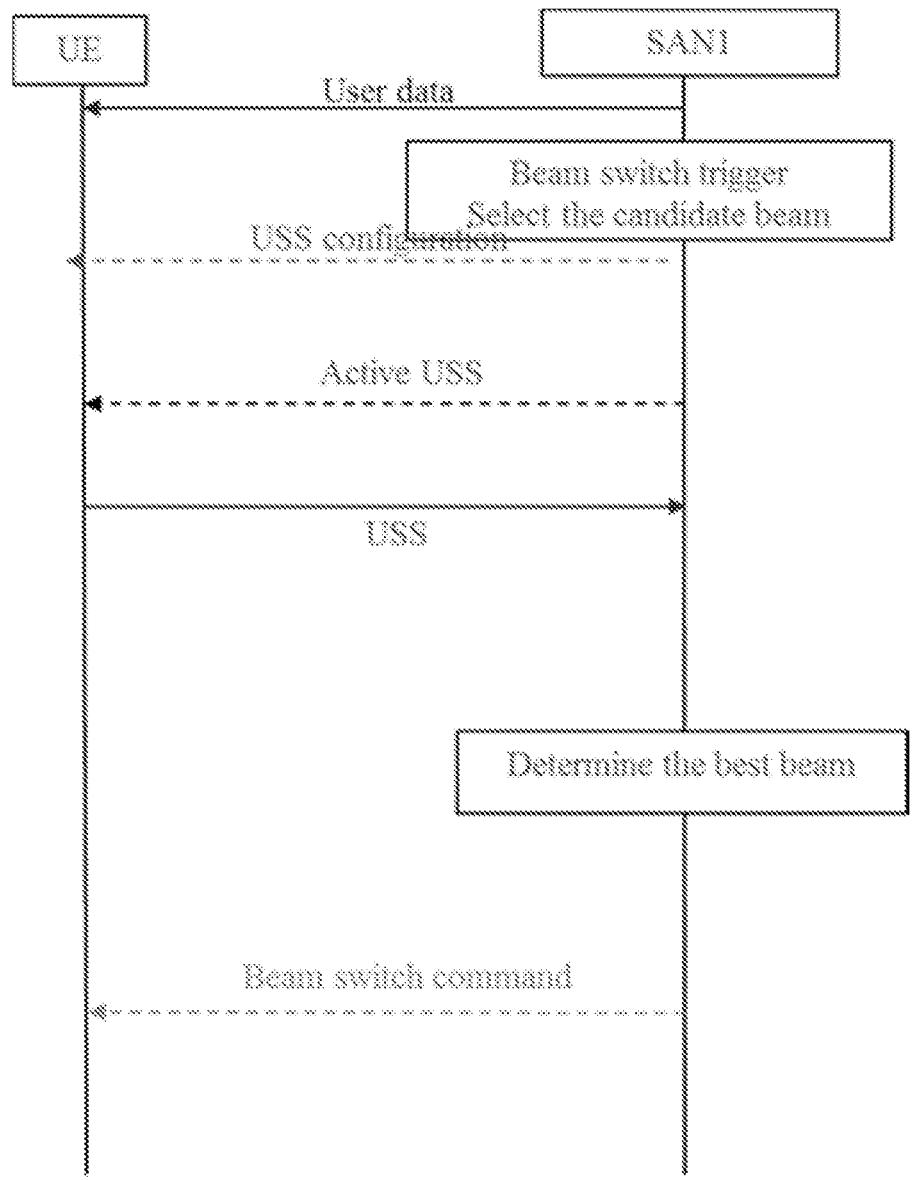
FIG. 13 is a signaling flow diagram illustrating intra-node beam selection based on uplink measurement.

For the narrow (link) beam selection that follows the mobility beam selection in the third downlink beam-switching alternative listed above, there is only one small difference, where the beams from neighbour node are not involved. It is a kind of intra-node beam selection, which is illustrated in FIG. 13. Here the "USS" could also be other type of reference, such as RRS. The complemented downlink measurement in the second alternative above is similar to the intra-Node beam switch in case 2 of downlink measurement based method.

Described in this section are several additional techniques that complement the techniques descried above. In various embodiments, any one or more of these additional techniques may be implemented along with any combination of the techniques described above.

In NR, the amount of CSI generally increases with the number of antennas/beams, meaning that the number of evaluations of beams/hypothesis performed by the UE can increase accordingly. This will in turn lead to an increase in UE power consumption.

One approach to address this, and to thus lower UE power consumption, is to have at least two reporting modes for CSI. One mode is a mode where the UE or other wireless device seeks the "best" transmission configuration. This may be regarded as a "default" or "legacy" mode. Another mode may be referred to as a "low-power mode," and is based on the use of a threshold for the quality of the reported CSI (e.g., PMI). In this mode, the UE reports (to the wireless network) the first CSI/PMI that meets a quality threshold requirement. Thus, rather than finding the absolute best possible transmission configuration, the UE instead finds one that is sufficient to meet the quality threshold requirement, and reports it, reducing UE power consumption by not necessarily seeking the absolute best possible transmission configuration. In certain embodiments, the UE may select the threshold for the quality of the reported CSI by itself, based on pre-programmed quality thresholds or other selection criteria. In alternative embodiments, the UE may receive a direction from the network as to the threshold for the quality of the reported CSI, and select the directed threshold.

In some embodiments, this low power mode may involve the UE only scanning a subset of the PMI, for example. This low power mode may also involve the UE turning off one or more receiver/transmitter chains or, more generally, switching one or more receiver and/or transmitter circuits to a low-power state while operating in the low power mode, such that the circuits consume less power in this low-power state relative to their power consumption in the default mode. This low-power mode allows the evaluations of beams to be discontinued once a sufficiently good beam is found, saving power consumption. An advantage of this approach is that for most signaling of small packets, the UEs can use a CSI reporting mode that saves a significant amount of energy.

In NR, a UE operating in dormant mode (e.g., RRC_CONNECTED DORMANT state) searches for synchronization signals and other system information, as was described in detail in sections above. In a system where beamforming is in use, the UE searches for these synchronization signals and other system information across an interval of possible resources, where that interval covers various combinations of time, frequency, and spatial beam. Note that this freedom with respect to resources does not exist in LTE.

A potential problem with this is that a dormant UE may need to stay awake for much longer periods to perform this searching, as compared to when operating in LTE. This can have a negative impact on power consumption by the UE.

This problem may be addressed, in some embodiments, by having the UE go (back) to sleep as soon as it has received sufficiently good system information and/or synchronization, where "sufficiently good" is determined by meeting a predetermined threshold or thresholds, without necessarily searching over an entire predetermined search interval. This approach allows the UE to realize power savings, especially in environments with good signals.

Figure 14:
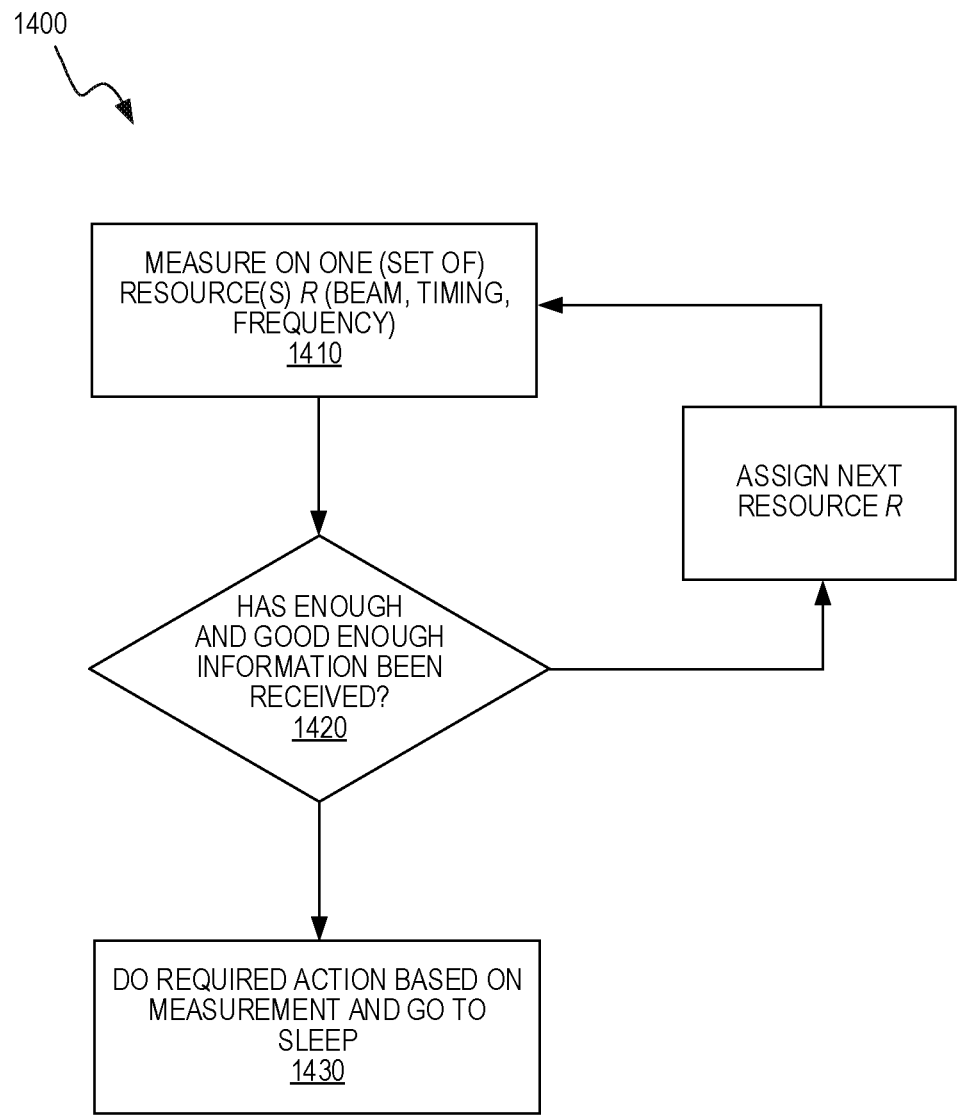
FIG. 14 is a process flow diagram illustrating an example method in a wireless device.

FIG. 14 is a process flow diagram illustrating an example method according to this approach. As shown at block 1410, the method begins with performing a measurement and/or demodulating/decoding, for synchronization and/or system information, on one of a predetermined set of resources, where the resources are defined by one or more of beam, timing, and frequency. As shown at block 1420, the method further includes determining whether sufficient synchronization and/or system information has been obtained, as a result of the measurement and/or demodulating/decoding on the current resource. If so, the method further includes, as shown at block 1430, performing one or more actions based on the measurement, if and to the extent that such an action is required, and going back to "sleep," where "sleep" refers to a lower-power mode of operation for the UE's circuitry, as compared to the operating mode in which the measurements are actively performed. If, on the other hand, it is determined that sufficient synchronization and/or information is not obtained, a next resource from the predetermined set of resources is assigned, as shown at block 1440, and the measuring and/or demodulating/decoding step shown in block 1410 is repeated.

An advantage of this technique is that UE power consumption in dormant mode may be reduced, in some cases to lower levels than achieved in conventional LTE operation. Note that "dormant mode" as used herein refers generally to a mode where a wireless device intermittently activates receiver circuitry to monitor and/or measure signals, deactivating at least parts of the receiver circuitry in between these monitoring/measuring intervals. These periods where some of the circuitry is deactivated may be referred to as "sleep" periods. In the discussion above, NR is described as having a dormant mode referred to as RRC_CONNECTED DORMANT state. However, it will be appreciated that there may be one or several dormant modes supported by any given network, with names that vary.

Figure 15:
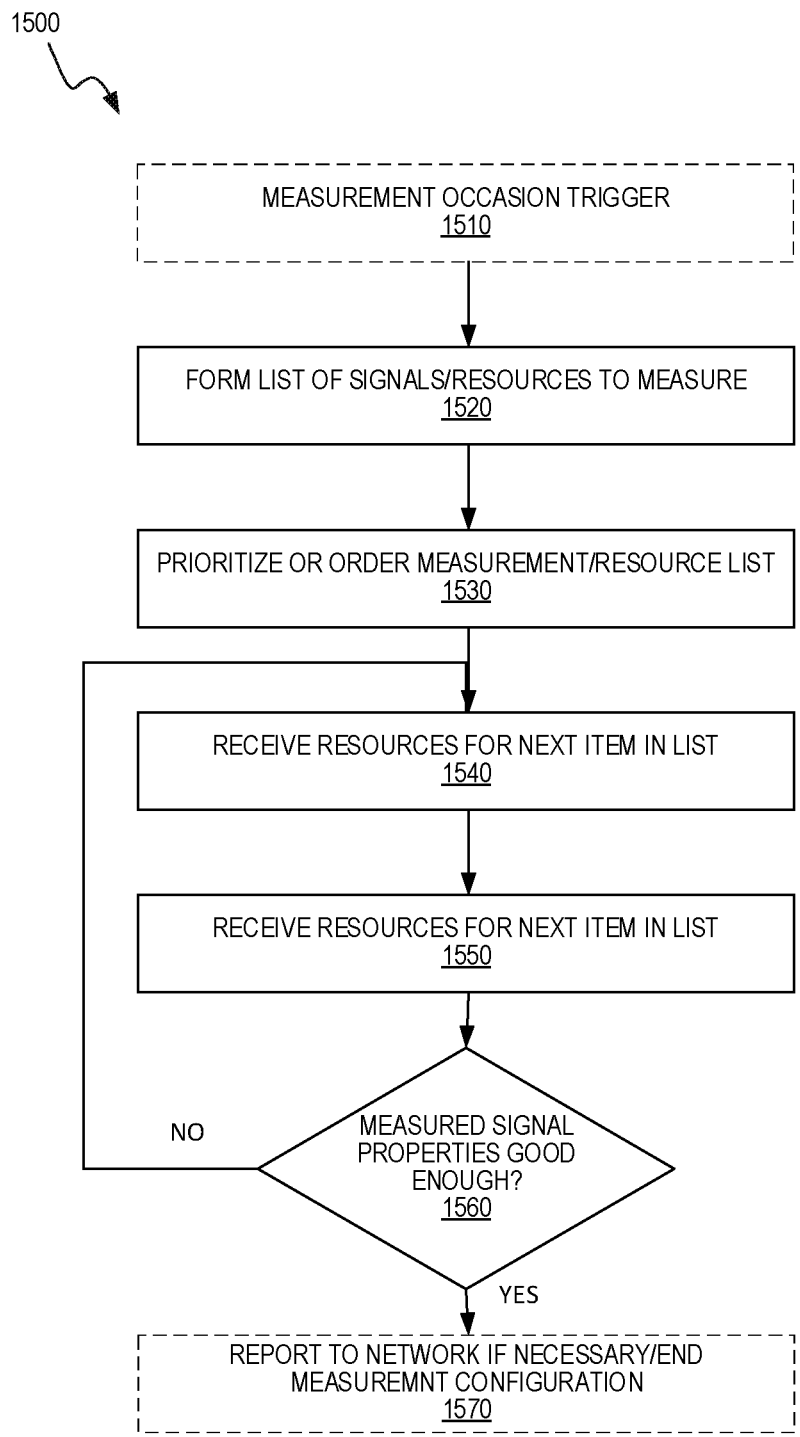
FIG. 15 is a process flow diagram illustrating another example method in a wireless device.

FIG. 15 illustrates another example process, involving a UE dormant mode measurement procedure where beamformed cell information signals are received and processed according. Below, the steps in the figure are explained in detail.

As shown at block 1510, a UE in dormant mode triggers a measurement occasion based on any of various triggers. For a typical cellular system, this may be periodic with a period on the order of 1 second.

As shown at block 1520, the UE forms a list of cell information signals and corresponding radio resources, where this list represents those signals and resources it is already aware of, or which it knows may be present. The radio resources can be beams, time intervals, and other radio resource groups (such as OFDM resource elements, for example) where the cell information signals may be present.

As shown at block 1530, the UE sorts the resource and signal list in an order based on for example (but not limited to):

Radio resource timing (first signals first etc.)
Known signal quality or measurement property from previous measurement occasions
Information of likelihood of usefulness from other sources, cell neighbour lists, other measurements, etc.

The sort order is so that the highest prioritized cell information signal (or resource) is first in the list.

As shown at block 1540, the UE uses its radio receiver to receive radio resources for the first item(s) in the list. While receiving this, the measurement signal processing of previously collected resource may still be ongoing.

As shown at block 1550, the UE measures the desured signal properties from the collected radio resources. These may include (but are not limited to) any one or more of:

Received signal power
Received signal SINR or SNR
Decodability of cell information
Decoded information such as paging information from the cellular network.

As shown at block 1560, the UE decides, based on one or more of the measured signal properties from 1550, whether the measurements collected so far are "good enough" to stop measuring and cell search activities. If not, the measurements continue, as shown at block 1540. "Good enough" generally refers to the satisfaction of one or more predetermined criterion, which may include one or more of:

The received power, SINR or SNR being above a certain threshold
That cell information can be properly decoded
That something in the cell information indicates that a change in mode is needed (for example a paging indication).

"Good enough" can furthermore be that a given number, e.g. 3, of the measured cells are detected to be "Good cells".

As shown at block 1570, determining that the measured signals are "good enough" leads to an end of the measurement occasion. The UE then reverts to its normal procedures, which may include reporting measurements, deactivating one or more receiver circuits, etc.

A key aspect of the solution illustrated in FIG. 15 is that a UE in a cellular system with beamformed cell information, and in dormant mode, collects measurements for each measurement occasion only up until a point where the collected information is "good enough". This allows the UE to save power by going back to sleep before doing an exhaustive search for all possible cell information signals.

Figure 16:
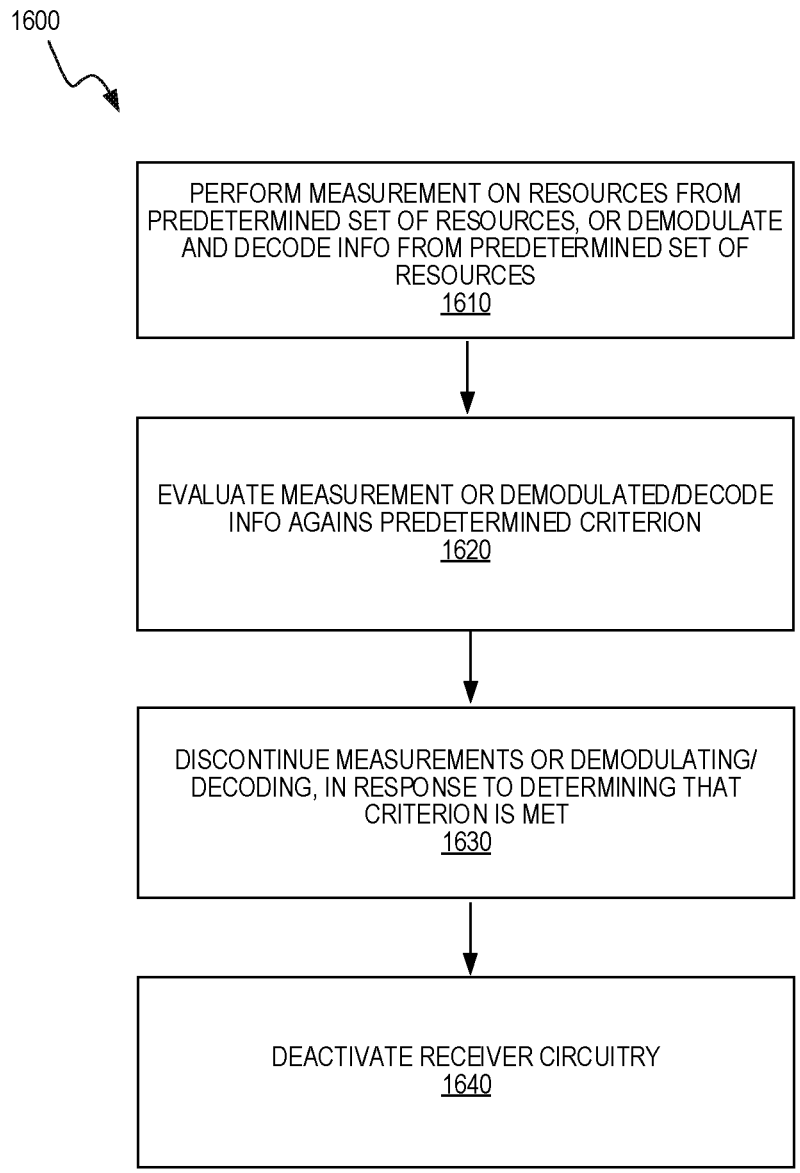
FIG. 16 is a process flow diagram illustrating still another example method in a wireless device.

FIG. 16 shows another example method, implemented by a UE or other wireless device, for operating in a wireless communications network. This method is similar, at least in some respects, to the previously illustrated methods—it will be appreciated that features of this method may be mixed and matched, as appropriate with features of the methods described above.

The method 1600 shown in FIG. 16 is carried out while the UE is operating in a dormant mode, wherein operating in the dormant mode comprises intermittently activating receiver circuitry to monitor and/or measure signals. This dormant mode may be, for example, the RRC_CONNECTED DORMANT state discussed earlier. The UE carries out the steps shown in FIG. 16 while in this dormant mode, and while the receiver circuitry is activated.

As shown at block 1610, the UE performs a measurement on each of a plurality of resources from a predetermined set of resources, or demodulates and decodes information from each of a plurality of resources from a predetermined set of resources, where the resources in the predetermined set of resources are each defined by one or more of a beam, a timing, and a frequency. In some embodiments, the resources in this predetermined set of resources are each defined as a beam. Each of these may represent a receiver beam (where the UE is "listening" in different directions using a particular combination of antennas and combining weights) or a particular transmitter beam as formed by an access node, or a combination of both.

As shown at block 1620, the method further includes evaluating the measurement or the demodulated and decoded information for each of the plurality of resources against a predetermined criterion. As shown at block 1630, the UE then discontinues the performing and evaluating of measurements, or discontinues the demodulating and decoding and evaluation of information, in response to determining that the predetermined criterion is met, such that one or more resources in the predetermined set of resources are neither measured nor demodulated and decoded. Finally, as shown at block 1640, the method further comprises deactivating the activated receiver circuitry, further in response to determining that the predetermined criterion is met. The steps in the figure may be repeated at the next occurrence of a triggering event that re-activates the receiver circuitry, in some embodiments, for example upon the periodic expiration of a dormant mode timer.

In some embodiments, the predetermined criterion comprises one or more of the following: that a received power level, or a measured signal-to-interference-plus-noise ratio (SINR), or a signal-to-noise ratio (SNR) is above a predetermined threshold, for one or for a predetermined number of resources; that cell information can be correctly decoded from one or for a predetermined number of resources; and that decoded information from one or for a predetermined number of resources instructs a change in operation for the wireless device.

In some embodiments, the discontinuing is performed in response to determining that the predetermined criterion is met for one of the resources. In some embodiments, the method further comprises, prior to said performing or demodulating and decoding, and prior to said evaluating, discontinuing, and deactivating, determining a priority order for the predetermined set of resources, from highest to lowest, wherein said performing or demodulating and decoding is according to the priority order, from highest to lowest. This determining the priority order for the predetermined set of resources may be based on one or more of any of the following, for example: radio resource timing for one or more of the resources; and measured signal qualities or measurement properties from previous measurements of one or more of the resources. In some embodiments, determining the priority order for the predetermined set of resources is based on information regarding likelihood of usefulness for one or more of the resources, the information being received from other sources or cell neighbour lists.

In this section, some of the many detailed techniques and procedures described above are generalized and applied to specific methods, network nodes, and wireless devices. Each of these methods, radio network equipment, and wireless devices, as well as the numerous variants of them that are described in the more detailed description above, may be regarded as an embodiment of the present invention. It should be understood that the particular groupings of these features described below are examples—other groupings and combinations are possible, as evidenced by the preceding detailed discussion.

Note that in the discussion that follows and in the claims appended hereto, the use of labels "first," "second," "third," etc., is meant simply to distinguish one item from another, and should not be understood to indicate a particular order or priority, unless the context clearly indicates otherwise.

As used herein, "wireless device" refers to a device capable, configured, arranged and/or operable to communicate wirelessly with network equipment and/or another wireless device. In the present context, communicating wirelessly involves transmitting and/or receiving wireless signals using electromagnetic signals. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user. It should also be appreciated that in the previous detailed discussion, the term "UE" is used, for convenience, even more generally, so as to include, in the context of the NR network, any type of wireless device that accesses and/or is served by the NR network, whether or not the UE is associated with a "user" per se. Thus, the term "UE" as used in the above detailed discussion includes machine-type-communication (MTC) devices (sometimes referred to as machine-to-machine, or M2M devices), for example, as well as handsets or wireless devices that may be associated with a "user."

Some wireless devices may support device-to-device (D2D) communication, for example by implementing a 3GPP standard for sidelink communication, and may in this case be referred to as D2D communication devices.

As yet another specific example, in an Internet of Things (IOT) scenario, a wireless device may represent a machine or other device that performs monitoring and/or measurements, and transmits the results of such monitoring and/or measurements to another wireless device and/or a network equipment. A wireless device may in this case be a machine-to-machine (M2M) device, which may in a 3GPP context be referred to as a machine-type communication (MTC) device. As one particular example, a wireless device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a wireless device may represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

Figure 17:
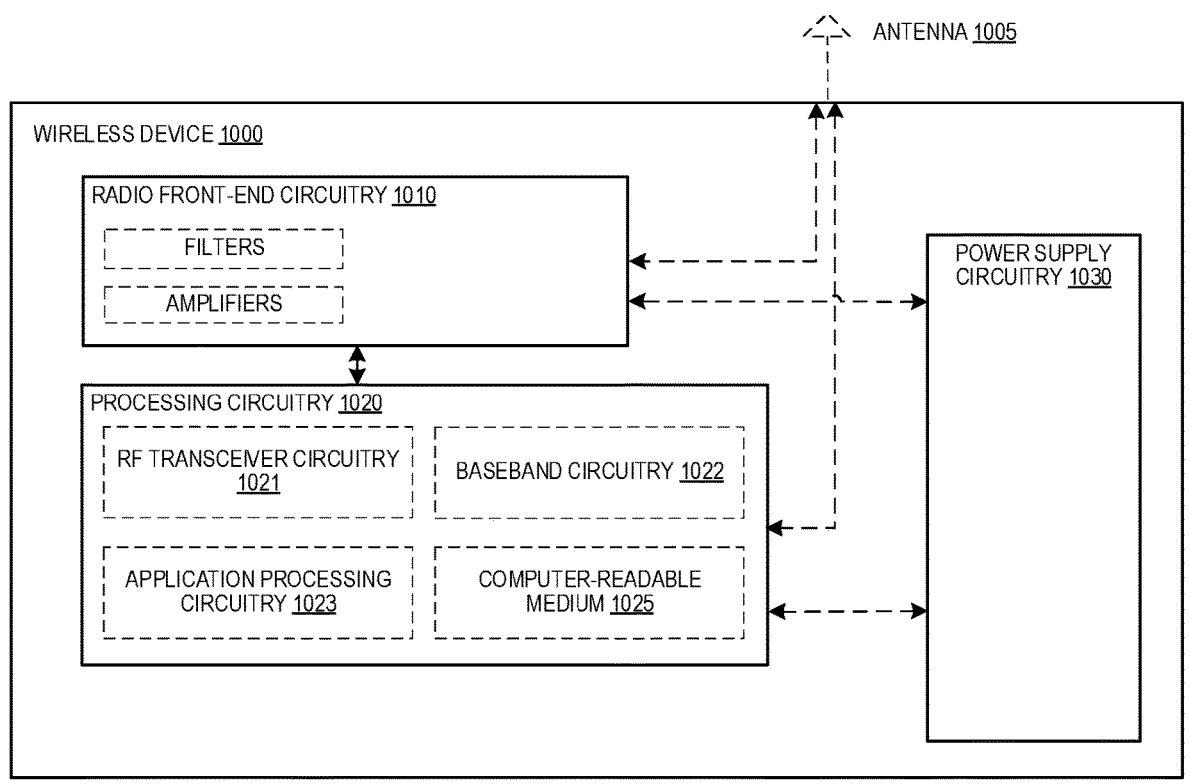
FIG. 17 is a block diagram illustrating an example wireless device.

Although it will be appreciated that specific embodiments of the wireless devices discussed herein may include any of various suitable combinations of hardware and/or software, a wireless device configured to operate in the wireless communications networks described herein and/or according to the various techniques described herein may, in particular embodiments, be represented by the example wireless device 1000 shown in FIG. 17.

As shown in FIG. 17, example wireless device 1000 includes an antenna 1005, radio front-end circuitry 1010, and processing circuitry 1020, which in the illustrated example includes a computer-readable storage medium 1025, e.g., one or more memory devices. Antenna 1005 may include one or more antennas or antenna arrays, and is configured to send and/or receive wireless signals, and is connected to radio front-end circuitry 1010. In certain alternative embodiments, wireless device 1000 may not include antenna 1005, and antenna 1005 may instead be separate from wireless device 1000 and be connectable to wireless device 1000 through an interface or port.

Radio front-end circuitry 1010, which may comprise various filters and amplifiers, for example, is connected to antenna 1005 and processing circuitry 1020 and is configured to condition signals communicated between antenna 1005 and processing circuitry 1020. In certain alternative embodiments, wireless device 1000 may not include radio front-end circuitry 1010, and processing circuitry 1020 may instead be connected to antenna 1005 without radio front-end circuitry 1010. In some embodiments, radio-frequency circuitry 1010 is configured to handle signals in multiple frequency bands, in some cases simultaneously.

Processing circuitry 1020 may include one or more of radio-frequency (RF) transceiver circuitry 1021, baseband processing circuitry 1022, and application processing circuitry 1023. In some embodiments, the RF transceiver circuitry 1021, baseband processing circuitry 1022, and application processing circuitry 1023 may be on separate chipsets. In alternative embodiments, part or all of the baseband processing circuitry 1022 and application processing circuitry 1023 may be combined into one chipset, and the RF transceiver circuitry 1021 may be on a separate chipset. In still alternative embodiments, part or all of the RF transceiver circuitry 1021 and baseband processing circuitry 1022 may be on the same chipset, and the application processing circuitry 1023 may be on a separate chipset. In yet other alternative embodiments, part or all of the RF transceiver circuitry 1021, baseband processing circuitry 1022, and application processing circuitry 1023 may be combined in the same chipset. Processing circuitry 1020 may include, for example, one or more central processing units (CPUs), one or more microprocessors, one or more application-specific integrated circuits (ASICs), and/or one or more field programmable gate arrays (FPGAs).

In particular embodiments, some or all of the functionality described herein as relevant to a user equipment, MTC device, or other wireless device may be embodied in a wireless device or, as an alternative, may be embodied by the processing circuitry 1020 executing instructions stored on a computer-readable storage medium 1025, as shown in FIG. 17. In alternative embodiments, some or all of the functionality may be provided by the processing circuitry 1020 without executing instructions stored on a computer-readable medium, such as in a hard-wired manner. In any of those particular embodiments, whether executing instructions stored on a computer-readable storage medium or not, the processing circuitry 1020 can be said to be configured to perform the described functionality. The benefits provided by such functionality are not limited to the processing circuitry 1020 alone or to other components of the wireless device, but are enjoyed by the wireless device as a whole, and/or by end users and the wireless network generally.

The processing circuitry 1020 may be configured to perform any determining operations described herein. Determining as performed by processing circuitry 1020 may include processing information obtained by the processing circuitry 1020 by, for example, converting the obtained information into other information, comparing the obtained information or converted information to information stored in the wireless device, and/or performing one or more operations based on the obtained information or converted information, and as a result of said processing making a determination.

Antenna 1005, radio front-end circuitry 1010, and/or processing circuitry 1020 may be configured to perform any transmitting operations described herein. Any information, data and/or signals may be transmitted to a network equipment and/or another wireless device. Likewise, antenna 1005, radio front-end circuitry 1010, and/or processing circuitry 1020 may be configured to perform any receiving operations described herein as being performed by a wireless device. Any information, data and/or signals may be received from a network equipment and/or another wireless device Computer-readable storage medium 1025 is generally operable to store instructions, such as a computer program, software, an application including one or more of logic, rules, code, tables, etc. and/or other instructions capable of being executed by a processor. Examples of computer-readable storage medium 1025 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 1020. In some embodiments, processing circuitry 1020 and computer-readable storage medium 1025 may be considered to be integrated.

Alternative embodiments of the wireless device 1000 may include additional components beyond those shown in FIG. 17 that may be responsible for providing certain aspects of the wireless device's functionality, including any of the functionality described herein and/or any functionality necessary to support the solution described above. As just one example, wireless device 1000 may include input interfaces, devices and circuits, and output interfaces, devices and circuits. Input interfaces, devices, and circuits are configured to allow input of information into wireless device 1000, and are connected to processing circuitry 1020 to allow processing circuitry 1020 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from wireless device 1000, and are connected to processing circuitry 1020 to allow processing circuitry 1020 to output information from wireless device 1000. For example, output interfaces, devices, or circuits may include a speaker, a display, vibrating circuitry, a USB port, a headphone interface, or other output elements. Using one or more input and output interfaces, devices, and circuits, wireless device 1000 may communicate with end users and/or the wireless network, and allow them to benefit from the functionality described herein.

As another example, wireless device 1000 may include power supply circuitry 1030. The power supply circuitry 1030 may comprise power management circuitry. The power supply circuitry may receive power from a power source, which may either be comprised in, or be external to, power supply circuitry 1030. For example, wireless device 1000 may comprise a power source in the form of a battery or battery pack which is connected to, or integrated in, power supply circuitry 1030. Other types of power sources, such as photovoltaic devices, may also be used.

As a further example, wireless device 1000 may be connectable to an external power source (such as an electricity outlet) via an input circuitry or interface such as an electrical cable, whereby the external power source supplies power to power supply circuitry 1030.

Power supply circuitry 1030 may be connected to radio front-end circuitry 1010, processing circuitry 1020, and/or computer-readable storage medium 1025 and be configured to supply wireless device 1000, including processing circuitry 1020, with power for performing the functionality described herein.

Wireless device 1000 may also include multiple sets of processing circuitry 1020, computer-readable storage medium 1025, radio circuitry 1010, and/or antenna 1005 for different wireless technologies integrated into wireless device 1000, such as, for example, GSM, WCDMA, LTE, NR, WiFi, or Bluetooth wireless technologies. These wireless technologies may be integrated into the same or different chipsets and other components within wireless device 1000.

Wireless device 1000, in various embodiments, is adapted to carry out any of a variety of combinations of the features and techniques described herein. In some embodiments, for example, processing circuitry 1020, e.g., using antenna 1005 and radio front-end circuitry 1010, is adapted to, while operating in dormant mode, and while receiver circuitry is activated, perform a measurement on each of a plurality of resources from a predetermined set of resources or demodulating and decoding information from each of a plurality of resources from a predetermined set of resources, where the resources in the predetermined set of resources are each defined by one or more of a beam, a timing, and a frequency. The processing circuitry 1020 may be further adapted to evaluate the measurement or the demodulated and decoded information for each of the plurality of resources against a predetermined criterion, and to then discontinue the performing and evaluating of measurements, or discontinue the demodulating and decoding and evaluation of information, in response to determining that the predetermined criterion is met, such that one or more resources in the predetermined set of resources are neither measured nor demodulated and decoded. The processing circuitry 1020 may be further adapted to deactivate the activated receiver circuitry, further in response to determining that the predetermined criterion is met.

Once again, the wireless devices adapted to operate in a dormant mode according to any of the several techniques described above may be further adapted to carry out one or more of the several other techniques described herein. Thus, for example, the resources in the predetermined set of resources may each be defined as a beam, in some embodiments, and in various embodiments the predetermined criterion may comprise one or more of the following: that a received power level, or a measured signal-to-interference-plus-noise ratio (SINR), or a signal-to-noise ratio (SNR) is above a predetermined threshold, for one or for a predetermined number of resources; that cell information can be correctly decoded from one or for a predetermined number of resources; that decoded information from one or for a predetermined number of resources instructs a change in operation for the wireless device.

In some embodiments, the wireless device is adapted to carry out said discontinuing in response to determining that the predetermined criterion is met for one of the resources. In some of these and in some other embodiments, the wireless device is further adapted to, prior to said performing or demodulating and decoding, and prior to said evaluating, discontinuing, and deactivating, determine a priority order for the predetermined set of resources, from highest to lowest, wherein the wireless device is adapted to carry out said performing or demodulating and decoding is according to the priority order, from highest to lowest. In some of these latter embodiments, the wireless device is adapted to determine the priority order for the predetermined set of resources based on one or more of: radio resource timing for one or more of the resources; and measured signal qualities or measurement properties from previous measurements of one or more of the resources. In some of these and in some other embodiments, the wireless device is adapted to determine the priority order for the predetermined set of resources based on information regarding likelihood of usefulness for one or more of the resources, said information being received from other sources or cell neighbour lists.

As used herein, the term "network equipment" refers to equipment capable, configured, arranged and/or operable to communicate directly or indirectly with a wireless device and/or with other equipment in the wireless communication network that enable and/or provide wireless access to the wireless device. Examples of network equipment include, but are not limited to, access points (APs), in particular radio access points. Network equipment may represent base stations (BSs), such as radio base stations. Particular examples of radio base stations include Node Bs, and evolved Node Bs (eNBs). Base stations may be categorized based on the amount of coverage they provide (or, stated differently, their transmit power levels) and may then also be referred to as femto base stations, pico base stations, micro base stations, or macro base stations. "Network equipment" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network equipment include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., Mobility Switching Centers or MSCs, Mobility Management Entities or MMEs), Operation and Maintenance (O&M) nodes, Operation and Support System (OSS) nodes, SON nodes, positioning nodes (e.g., E-SMLCs), and/or MDTs. More generally, however, network equipment may represent any suitable device (or group of devices) capable, configured, arranged, and/or operable to enable and/or provide a wireless device access to the wireless communication network or to provide some service to a wireless device that has accessed the wireless communication network.

As used herein, the term "radio network equipment" is used to refer to network equipment that includes radio capabilities. Thus, examples of radio network nodes are the radio base stations and radio access points discussed above. It will be appreciated that some radio network equipment may comprise equipment that is distributed—such as the distributed radio base stations (with RRHs and/or RRUs) discussed above. It will be appreciated that the various references herein to eNBs, eNodeBs, Node Bs, and the like are referring to examples of radio network equipment. It should also be understood that the term "radio network equipment" as used herein may refer to a single base station or a single radio node, in some cases, or to multiple base stations or nodes, e.g., at different locations. In some cases, this document may refer to an "instance" of radio network equipment, to more clearly describe certain scenarios where multiple distinct embodiments or installations of radio equipment are involved. However, the lack of reference to an "instance" in connection with a discussion of radio network equipment should not be understood to mean that only a single instance is being referred to. A given instance of radio network equipment may alternatively be referred to as a "radio network node," where the use of the word "node" denotes that the equipment referred to operate as a logical node in a network, but does not imply that all components are necessarily co-located.

Figure 18:
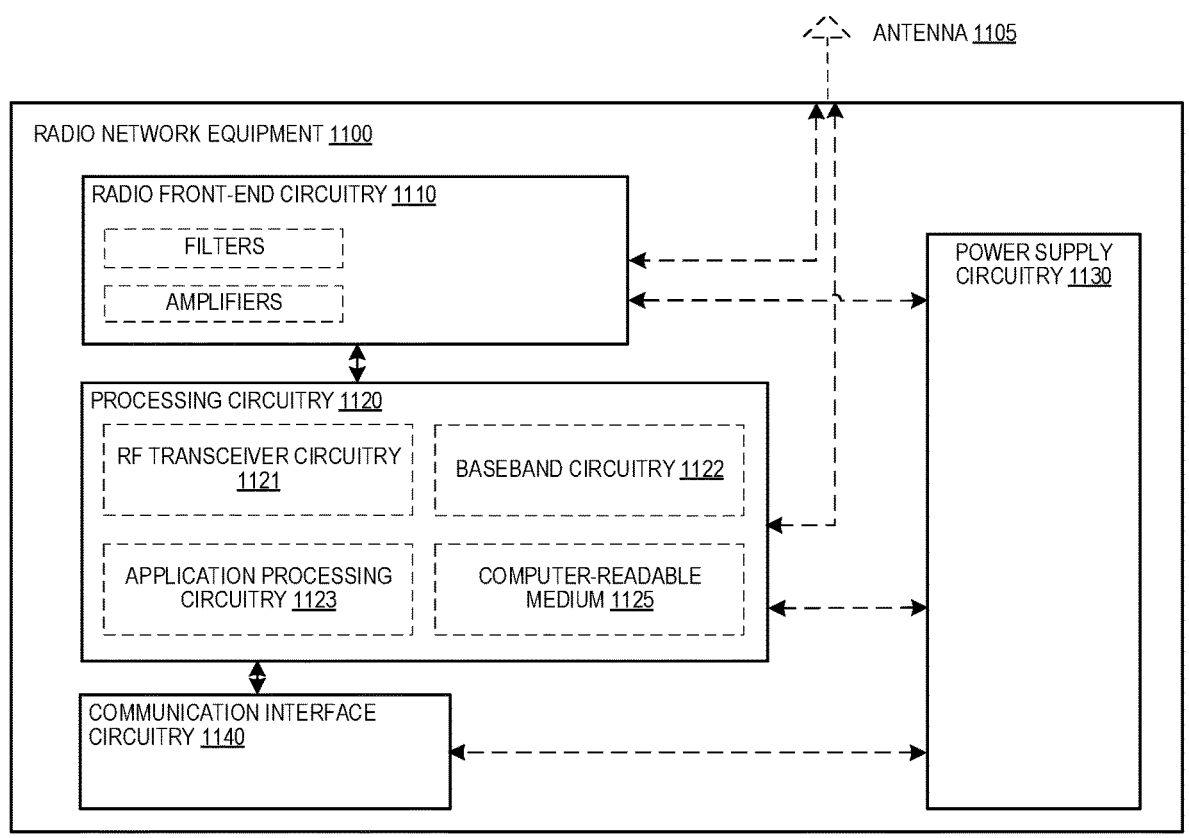
FIG. 18 is a block diagram illustrating example radio network equipment.

While radio network equipment may include any suitable combination of hardware and/or software, an example of an instance of radio network equipment 1100 is illustrated in greater detail by FIG. 18. As shown in FIG. 18, example radio network equipment 1100 includes an antenna 1105, radio front-end circuitry 1110, and processing circuitry 1120, which in the illustrated example includes a computer-readable storage medium 1025, e.g., one or more memory devices. Antenna 1105 may include one or more antennas or antenna arrays, and is configured to send and/or receive wireless signals, and is connected to radio front-end circuitry 1110. In certain alternative embodiments, radio network equipment 1100 may not include antenna 1005, and antenna 1005 may instead be separate from radio network equipment 1100 and be connectable to radio network equipment 1100 through an interface or port. In some embodiments, all or parts of radio front-end circuitry 1110 may be located at one or several locations apart from the processing circuitry 1120, e.g., in a RRH or RRU. Likewise, portions of processing circuitry 1120 may be physically separated from one another. Radio network equipment 1100 may also include communication interface circuitry 1140 for communicating with other network nodes, e.g., with other radio network equipment and with nodes in a core network.

Radio front-end circuitry 1110, which may comprise various filters and amplifiers, for example, is connected to antenna 1105 and processing circuitry 1120 and is configured to condition signals communicated between antenna 1105 and processing circuitry 1120. In certain alternative embodiments, radio network equipment 1100 may not include radio front-end circuitry 1110, and processing circuitry 1120 may instead be connected to antenna 1105 without radio front-end circuitry 1110. In some embodiments, radio-frequency circuitry 1110 is configured to handle signals in multiple frequency bands, in some cases simultaneously.

Processing circuitry 1120 may include one or more of RF transceiver circuitry 1121, baseband processing circuitry 1122, and application processing circuitry 1123. In some embodiments, the RF transceiver circuitry 1121, baseband processing circuitry 1122, and application processing circuitry 1123 may be on separate chipsets. In alternative embodiments, part or all of the baseband processing circuitry 1122 and application processing circuitry 1123 may be combined into one chipset, and the RF transceiver circuitry 1121 may be on a separate chipset. In still alternative embodiments, part or all of the RF transceiver circuitry 1121 and baseband processing circuitry 1122 may be on the same chipset, and the application processing circuitry 1123 may be on a separate chipset. In yet other alternative embodiments, part or all of the RF transceiver circuitry 1121, baseband processing circuitry 1122, and application processing circuitry 1123 may be combined in the same chipset. Processing circuitry 1120 may include, for example, one or more central CPUs, one or more microprocessors, one or more ASICs, and/or one or more field FPGAs.

In particular embodiments, some or all of the functionality described herein as being relevant to radio network equipment, radio base stations, eNBs, etc., may be embodied in radio network equipment or, as an alternative may be embodied by the processing circuitry 1120 executing instructions stored on a computer-readable storage medium 1125, as shown in FIG. 18. In alternative embodiments, some or all of the functionality may be provided by the processing circuitry 1120 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 1120 alone or to other components of the radio network equipment, but are enjoyed by the radio network equipment 1100 as a whole, and/or by end users and the wireless network generally.

The processing circuitry 1120 may be configured to perform any determining operations described herein. Determining as performed by processing circuitry 1120 may include processing information obtained by the processing circuitry 1120 by, for example, converting the obtained information into other information, comparing the obtained information or converted information to information stored in the radio network equipment, and/or performing one or more operations based on the obtained information or converted information, and as a result of said processing making a determination.

Antenna 1105, radio front-end circuitry 1110, and/or processing circuitry 1120 may be configured to perform any transmitting operations described herein. Any information, data and/or signals may be transmitted to any network equipment and/or a wireless device. Likewise, antenna 1105, radio front-end circuitry 1110, and/or processing circuitry 1120 may be configured to perform any receiving operations described herein as being performed by a radio network equipment. Any information, data and/or signals may be received from any network equipment and/or a wireless device.

Computer-readable storage medium 1125 is generally operable to store instructions, such as a computer program, software, an application including one or more of logic, rules, code, tables, etc. and/or other instructions capable of being executed by a processor. Examples of computer-readable storage medium 1125 include computer memory (for example, RAM or ROM), mass storage media (for example, a hard disk), removable storage media (for example, a CD or a DVD), and/or any other volatile or non-volatile, non-transitory computer-readable and/or computer-executable memory devices that store information, data, and/or instructions that may be used by processing circuitry 1120. In some embodiments, processing circuitry 1120 and computer-readable storage medium 1125 may be considered to be integrated.

Alternative embodiments of the radio network equipment 1100 may include additional components beyond those shown in FIG. 18 that may be responsible for providing certain aspects of the radio network equipment's functionality, including any of the functionality described herein and/or any functionality necessary to support the solution described above. As just one example, radio network equipment 1100 may include input interfaces, devices and circuits, and output interfaces, devices and circuits. Input interfaces, devices, and circuits are configured to allow input of information into radio network equipment 1100, and are connected to processing circuitry 1120 to allow processing circuitry 1120 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from radio network equipment 1100, and are connected to processing circuitry 1120 to allow processing circuitry 1120 to output information from radio network equipment 1100. For example, output interfaces, devices, or circuits may include a speaker, a display, a USB port, a headphone interface, or other output elements. Using one or more input and output interfaces, devices, and circuits, radio network equipment 1100 may communicate with end users and/or the wireless network, and allow them to benefit from the functionality described herein.

As another example, radio network equipment 1100 may include power supply circuitry 1130. The power supply circuitry 1130 may comprise power management circuitry. The power supply circuitry 1130 may receive power from a power source, which may either be comprised in, or be external to, power supply circuitry 1130. For example, radio network equipment 1100 may comprise a power source in the form of a battery or battery pack which is connected to, or integrated in, power supply circuitry 1130. Other types of power sources, such as photovoltaic devices, may also be used. As a further example, radio network equipment 1100 may be connectable to an external power source (such as an electricity outlet) via an input circuitry or interface such as an electrical cable, whereby the external power source supplies power to power supply circuitry 1130.

Power supply circuitry 1130 may be connected to radio front-end circuitry 1110, processing circuitry 1120, and/or computer-readable storage medium 1125 and be configured to supply radio network equipment 1100, including processing circuitry 1120, with power for performing the functionality described herein.

Radio network equipment 1100 may also include multiple sets of processing circuitry 1120, computer-readable storage medium 1125, radio circuitry 1110, antenna 1105 and/or communication interface circuitry 1140 for different wireless technologies integrated into radio network equipment 1100, such as, for example, GSM, WCDMA, LTE, NR, WiFi, or Bluetooth wireless technologies. These wireless technologies may be integrated into the same or different chipsets and other components within radio network equipment 1100.

One or more instances of the radio network equipment 1100 may be adapted to carry out some or all of the techniques described herein, in any of various combinations. It will be appreciated that in a given network implementation, multiple instances of radio network equipment 1100 will be in use. In some cases, several instances of radio network equipment 1100 at a time may be communicating with or transmitting signals to a given wireless device or group of wireless devices. Thus, it should be understood that while many of the techniques described herein may be carried out by a single instance of radio network equipment 1100, these techniques may be understood as carried out by a system of one or more instances of radio network equipment 1100, in some cases in a coordinated fashion. The radio network equipment 1100 shown in FIG. 18 is thus the simplest example of this system.

Figure 19:
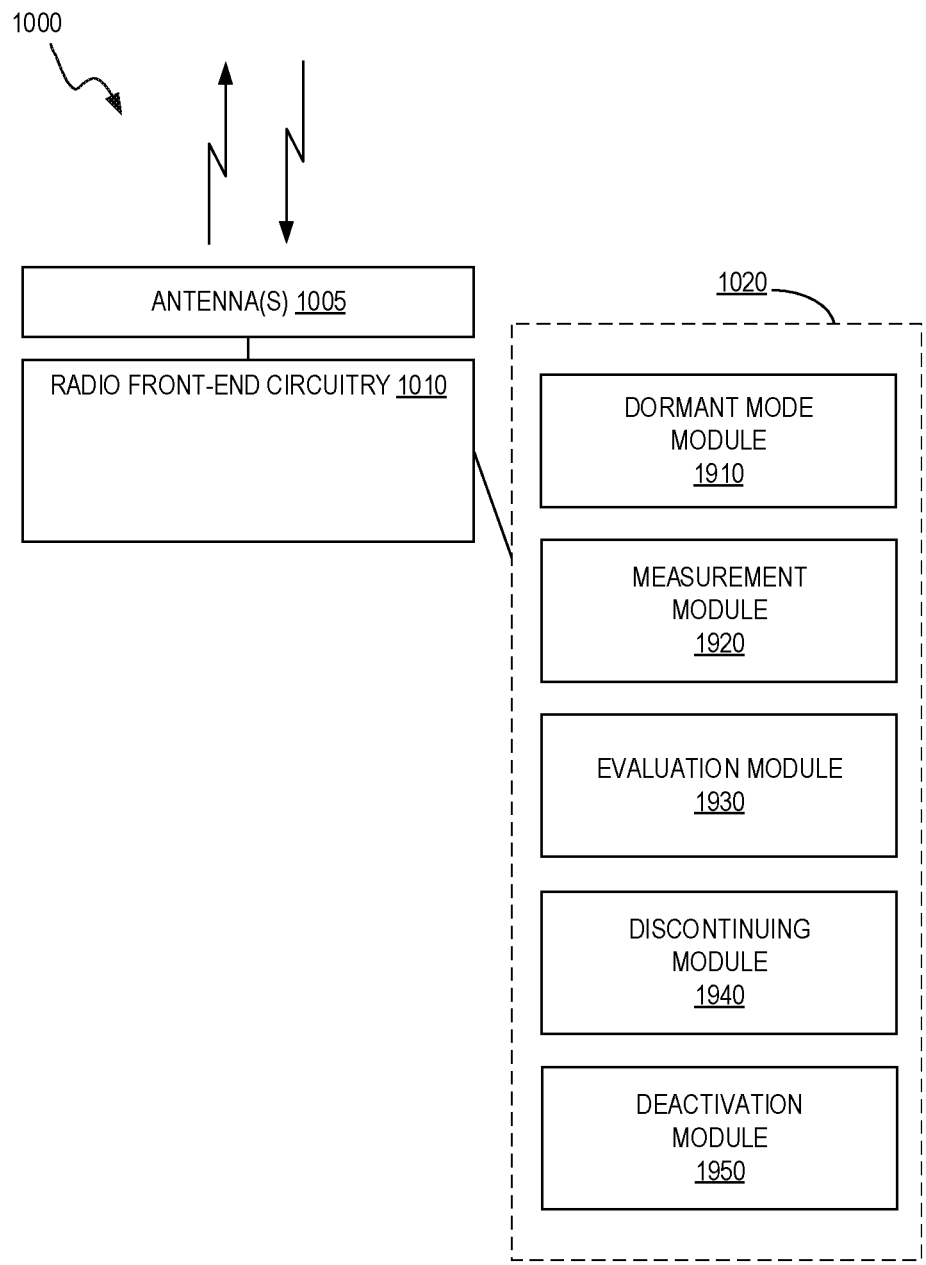
FIG. 19 is another block diagram illustrating an example wireless device.

FIG. 19 illustrates an example functional module or circuit architecture as may be implemented in a wireless device 1000, e.g., based on the processing circuitry 1020. The illustrated embodiment at least functionally includes a dormant mode module 1910 for controlling operation of the wireless device 1000 in a dormant mode, wherein operating in the dormant mode comprises intermittently activating receiver circuitry to monitor and/or measure signals. The embodiment further includes several other modules that operate while the wireless device 1000 is in dormant mode and while the receiver circuitry is activated, including a measurement module 1920 for performing a measurement on each of a plurality of resources from a predetermined set of resources or demodulating and decoding information from each of a plurality of resources from a predetermined set of resources, where the resources in the predetermined set of resources are each defined by one or more of a beam, a timing, and a frequency, and an evaluation module 1930 for evaluating the measurement or the demodulated and decoded information for each of the plurality of resources against a predetermined criterion.

The illustrated embodiment further includes a discontinuing module 1940 for discontinuing the performing and evaluating of measurements or discontinuing the demodulating and decoding and evaluation of information, in response to determining that the predetermined criterion is met, such that one or more resources in the predetermined set of resources are neither measured nor demodulated and decoded, and a deactivation module 1950 for deactivating the activated receiver circuitry, further in response to determining that the predetermined criterion is met.

In some embodiments of the wireless device 1000 as illustrated in FIG. 19, the resources in the predetermined set of resources are each defined as a beam. In some embodiments, the predetermined criterion comprises one or more of the following: that a received power level, or a measured signal-to-interference-plus-noise ratio (SINR), or a signal-to-noise ratio (SNR) is above a predetermined threshold, for one or for a predetermined number of resources; that cell information can be correctly decoded from one or for a predetermined number of resources; that decoded information from one or for a predetermined number of resources instructs a change in operation for the wireless device.

In some embodiments, discontinuing module 1940 is adapted to perform its discontinuing in response to determining that the predetermined criterion is met for one of the resources.

In some embodiments, the wireless device 1000 further comprises a determining module (not pictured) for determining, prior to the operations carried out by the measurement module 1920, evaluating module 1930, discontinuing module 1940, and deactivation module 1950, a priority order for the predetermined set of resources, from highest to lowest. In these embodiments, the operations carried out by the measurement module are carried out according to the priority order, from highest to lowest. In some of these embodiments, the determining of the priority order for the predetermined set of resources is based on one or more of: radio resource timing for one or more of the resources; and measured signal qualities or measurement properties from previous measurements of one or more of the resources. In some of these and in some other embodiments, the determining of the priority order for the predetermined set of resources is based on information regarding likelihood of usefulness for one or more of the resources, this information being received from other sources or cell neighbour lists.

What is claimed is:

1. A method, in a wireless device, for operating in a wireless communications network, the method comprising:
   operating in a dormant mode, wherein operating in the dormant mode comprises intermittently activating receiver circuitry to monitor and/or measure signals; and,
   while in dormant mode and while the receiver circuitry is activated:
      performing a measurement on each of a plurality of resources from a predetermined set of resources or demodulating and decoding information from each of a plurality of resources from a predetermined set of resources, where the resources in the predetermined set of resources are each defined by one or more of a beam, a timing, and a frequency;
      evaluating the measurement or the demodulated and decoded information for each of the plurality of resources against a predetermined criterion;
      discontinuing the performing and evaluating of measurements or discontinuing the demodulating and decoding and evaluation of information, in response to determining that the predetermined criterion is met, such that one or more resources in the predetermined set of resources are neither measured nor demodulated and decoded; and
      deactivating the activated receiver circuitry, further in response to determining that the predetermined criterion is met.

2. The method of claim 1, wherein the resources in the predetermined set of resources are each defined as a beam.

3. The method of claim 1, wherein the predetermined criterion comprises one or more of the following:
   that a received power level or a measured signal-to-interference-plus-noise ratio (SINR) or a signal-to-noise ratio (SNR) is above a predetermined threshold, for one or for a predetermined number of resources;
   that cell information can be correctly decoded from one or for a predetermined number of resources; and
   that decoded information from one or for a predetermined number of resources instructs a change in operation for the wireless device.

4. The method of claim 1, wherein said discontinuing is performed in response to determining that the predetermined criterion is met for one of the resources.

5. The method of claim 1, further comprising, prior to said performing or demodulating and decoding, and prior to said evaluating, discontinuing, and deactivating, determining a priority order for the predetermined set of resources, from highest to lowest, wherein said performing or demodulating and decoding is according to the priority order, from highest to lowest.

6. The method of claim 5, wherein determining the priority order for the predetermined set of resources is based on one or more of:
   radio resource timing for one or more of the resources; and
   measured signal qualities or measurement properties from previous measurements of one or more of the resources.

7. The method of claim 5, wherein determining the priority order for the predetermined set of resources is based on information regarding likelihood of usefulness for one or more of the resources, said information being received from other sources or cell neighbor lists.

8. A wireless device for operation in a wireless communications network, the wireless device comprising receiver circuitry and processing circuitry operatively coupled to the receiver circuitry and configured to:
   operate in a dormant mode, wherein operating in the dormant mode comprises intermittently activating the receiver circuitry to monitor and/or measure signals; and,
   while in dormant mode and while the receiver circuitry is activated:
      perform a measurement on each of a plurality of resources from a predetermined set of resources or demodulate and decode information from each of a plurality of resources from a predetermined set of resources, where the resources in the predetermined set of resources are each defined by one or more of a beam, a timing, and a frequency;
      evaluate the measurement or the demodulated and decoded information for each of the plurality of resources against a predetermined criterion;
      discontinue the performing and evaluating of measurements or discontinue the demodulating and decoding and evaluation of information, in response to determining that the predetermined criterion is met, such that one or more resources in the predetermined set of resources are neither measured nor demodulated and decoded; and
      deactivate the activated receiver circuitry, further in response to determining that the predetermined criterion is met.

9. The wireless device of claim 8, wherein the resources in the predetermined set of resources are each defined as a beam.

10. The wireless device of claim 9, wherein the predetermined criterion comprises one or more of the following:
    that a received power level or a measured signal-to-interference-plus-noise ratio (SINR) or a signal-to-noise ratio (SNR) is above a predetermined threshold, for one or for a predetermined number of resources;
    that cell information can be correctly decoded from one or for a predetermined number of resources;
    that decoded information from one or for a predetermined number of resources instructs a change in operation for the wireless device.

11. The wireless device of claim 8, wherein the processing circuitry is configured to carry out said discontinuing in response to determining that the predetermined criterion is met for one of the resources.

12. The wireless device of claim 8, wherein the processing circuitry is further configured to, prior to said performing or demodulating and decoding, and prior to said evaluating, discontinuing, and deactivating, determine a priority order for the predetermined set of resources, from highest to lowest, wherein the processing circuitry is configured to carry out said performing or demodulating and decoding is according to the priority order, from highest to lowest.

13. The wireless device of claim 12, wherein the processing circuitry is configured to determine the priority order for the predetermined set of resources based on one or more of:
    radio resource timing for one or more of the resources; and
    measured signal qualities or measurement properties from previous measurements of one or more of the resources.

14. The wireless device of claim 12, wherein the processing circuitry is configured to determine the priority order for the predetermined set of resources based on information regarding likelihood of usefulness for one or more of the resources, said information being received from other sources or cell neighbor lists.

\* \* \* \* \*